(12) United States Patent
Pietsch et al.

(10) Patent No.: US 8,743,864 B2
(45) Date of Patent: *Jun. 3, 2014

(54) SYSTEM AND METHOD FOR SUPPORTING HIGHER-LAYER PROTOCOL MESSAGING IN AN IN-BAND MODEM

(75) Inventors: Christian Pietsch, Nuremberg (DE); Christian Sgraja, Neu-Ulm (DE); Christoph A Joetten, Wadern (DE); Nikolai K. Leung, Takoma Park, MD (US); Marc W Werner, Nuremberg (DE); Wolfgang Granzow, Heroldsberg (DE)

(73) Assignee: QUALCOMM Incorporated, San Diego, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 12/816,197

(22) Filed: Jun. 15, 2010

(65) Prior Publication Data

US 2011/0142030 A1 Jun. 16, 2011

Related U.S. Application Data

(60) Provisional application No. 61/187,393, filed on Jun. 16, 2009, provisional application No. 61/325,732, filed on Apr. 19, 2010, provisional application No. 61/327,004, filed on Apr. 22, 2010.

(51) Int. Cl.
*H04J 3/06* (2006.01)

(52) U.S. Cl.
USPC .......................................... 370/350; 370/493

(58) Field of Classification Search
None
See application file for complete search history.

(56) References Cited

U.S. PATENT DOCUMENTS

| | | | |
|---|---|---|---|
| 3,742,197 A | 6/1973 | Pommerening | |
| 4,460,992 A | 7/1984 | Gutleber | |
| 4,779,274 A | 10/1988 | Takahashi et al. | |
| 5,043,736 A | 8/1991 | Darnell et al. | |
| 5,216,693 A | 6/1993 | Nakamura | |
| 5,218,618 A | 6/1993 | Sagey | |
| 5,239,497 A | 8/1993 | McKay et al. | |
| 5,341,177 A | 8/1994 | Roy et al. | |
| 5,422,816 A | 6/1995 | Sprague et al. | |
| 5,495,498 A | 2/1996 | Tominaga | |
| 5,519,403 A | 5/1996 | Bickley et al. | |
| 5,539,810 A | 7/1996 | Kennedy, III | |
| 5,550,848 A | 8/1996 | Doshi et al. | |

(Continued)

FOREIGN PATENT DOCUMENTS

| | | |
|---|---|---|
| CN | 1260658 A | 7/2000 |
| CN | 1277766 A | 12/2000 |

(Continued)

OTHER PUBLICATIONS

3GPP TR 22.967 V8.0.0 Technical Specification Group Services and System Aspects; Transferring of emergency call data. Chapter 7, p. 11-19.

(Continued)

*Primary Examiner* — Rhonda Murphy
(74) *Attorney, Agent, or Firm* — Heejong Yoo

(57) ABSTRACT

Acknowledging a source terminal data message from a destination terminal in an in-band communication system is disclosed. A first synchronization sequence followed by a low layer acknowledgement message and a second synchronization sequence followed by a high layer acknowledgement message is transmitted.

28 Claims, 30 Drawing Sheets

(56) References Cited

U.S. PATENT DOCUMENTS

| | | | |
|---|---|---|---|
| 5,555,286 A | 9/1996 | Tendler | |
| 5,640,444 A | 6/1997 | O'sullivan | |
| 5,712,899 A | 1/1998 | Pace, II | |
| 5,761,204 A | 6/1998 | Grob et al. | |
| 5,786,789 A | 7/1998 | Janky | |
| 5,802,079 A | 9/1998 | Wang | |
| 5,864,763 A | 1/1999 | Leung et al. | |
| 5,918,180 A | 6/1999 | Dimino | |
| 5,978,676 A | 11/1999 | Guridi et al. | |
| 6,044,257 A | 3/2000 | Boling et al. | |
| 6,058,110 A | 5/2000 | Bellenger et al. | |
| 6,058,150 A | 5/2000 | Ghosh | |
| 6,144,336 A | 11/2000 | Preston et al. | |
| 6,208,663 B1 | 3/2001 | Schramm et al. | |
| 6,208,959 B1 | 3/2001 | Jonsson et al. | |
| 6,226,529 B1 | 5/2001 | Bruno et al. | |
| 6,275,990 B1 | 8/2001 | Dapper et al. | |
| 6,345,251 B1 | 2/2002 | Jansson et al. | |
| 6,351,495 B1 | 2/2002 | Tarraf | |
| 6,363,339 B1* | 3/2002 | Rabipour et al. | 704/201 |
| 6,493,338 B1 | 12/2002 | Preston et al. | |
| 6,526,026 B1 | 2/2003 | Menon | |
| 6,574,211 B2 | 6/2003 | Padovani et al. | |
| 6,690,681 B1 | 2/2004 | Preston et al. | |
| 6,690,922 B1 | 2/2004 | Lindemann | |
| 6,744,747 B2 | 6/2004 | Shiu et al. | |
| 6,754,265 B1 | 6/2004 | Lindemann | |
| 6,947,490 B1 | 9/2005 | Edwards et al. | |
| 6,963,579 B2 | 11/2005 | Suri | |
| 6,993,101 B2 | 1/2006 | Trachewsky et al. | |
| 7,151,768 B2 | 12/2006 | Preston et al. | |
| 7,197,313 B1* | 3/2007 | Sohn | 455/450 |
| 7,215,965 B2 | 5/2007 | Fournier et al. | |
| 7,221,669 B2 | 5/2007 | Preston et al. | |
| 7,248,685 B2 | 7/2007 | Martin | |
| 7,286,522 B2 | 10/2007 | Preston et al. | |
| 7,394,790 B2 | 7/2008 | Kim et al. | |
| 7,505,417 B2 | 3/2009 | Huh et al. | |
| 7,548,520 B2 | 6/2009 | Kruys | |
| 7,747,281 B2 | 6/2010 | Preston et al. | |
| 7,768,965 B2 | 8/2010 | Kwon et al. | |
| 7,826,604 B2 | 11/2010 | Martin | |
| 7,864,717 B2 | 1/2011 | Dorr | |
| 7,864,745 B2 | 1/2011 | Cai et al. | |
| 7,904,055 B2 | 3/2011 | Lee et al. | |
| 7,912,149 B2 | 3/2011 | Chesnutt et al. | |
| 7,961,654 B2 | 6/2011 | Herring et al. | |
| 8,014,334 B2 | 9/2011 | Lee et al. | |
| 8,059,011 B2* | 11/2011 | Van Wyk et al. | 340/870.11 |
| 8,068,792 B2 | 11/2011 | Preston et al. | |
| 8,107,549 B2 | 1/2012 | Joetten et al. | |
| 8,111,734 B2 | 2/2012 | Wang et al. | |
| 8,150,686 B2 | 4/2012 | Pietsch et al. | |
| 2002/0004842 A1 | 1/2002 | Ghose et al. | |
| 2002/0176446 A1 | 11/2002 | Rasanen | |
| 2003/0072357 A1 | 4/2003 | Demir et al. | |
| 2004/0136344 A1 | 7/2004 | Kim et al. | |
| 2004/0174847 A1 | 9/2004 | Menon et al. | |
| 2004/0190663 A1 | 9/2004 | Carsello et al. | |
| 2005/0078660 A1 | 4/2005 | Wood | |
| 2005/0111383 A1 | 5/2005 | Grob et al. | |
| 2005/0169248 A1 | 8/2005 | Truesdale et al. | |
| 2005/0207370 A1 | 9/2005 | Harada | |
| 2006/0035594 A1 | 2/2006 | Murata et al. | |
| 2006/0133273 A1 | 6/2006 | Julian et al. | |
| 2007/0025301 A1 | 2/2007 | Petersson | |
| 2007/0030829 A1 | 2/2007 | Vimpari et al. | |
| 2007/0072604 A1 | 3/2007 | Wang | |
| 2007/0142028 A1 | 6/2007 | Ayoub et al. | |
| 2007/0168841 A1 | 7/2007 | Lakkis | |
| 2007/0177630 A1 | 8/2007 | Ranta et al. | |
| 2007/0217526 A1 | 9/2007 | Park et al. | |
| 2007/0241806 A1 | 10/2007 | Pedersen et al. | |
| 2008/0045255 A1 | 2/2008 | Revel et al. | |
| 2008/0082891 A1* | 4/2008 | Park et al. | 714/749 |
| 2008/0086669 A1 | 4/2008 | Cheng et al. | |
| 2008/0090517 A1 | 4/2008 | Cheng | |
| 2008/0108304 A1 | 5/2008 | Suga | |
| 2008/0165885 A1 | 7/2008 | Kondoz et al. | |
| 2008/0232301 A1 | 9/2008 | Cai et al. | |
| 2008/0310400 A1 | 12/2008 | Cai et al. | |
| 2009/0304057 A1 | 12/2009 | Werner et al. | |
| 2009/0304058 A1 | 12/2009 | Leung et al. | |
| 2009/0306970 A1 | 12/2009 | Sgraja et al. | |
| 2009/0306974 A1 | 12/2009 | Huang et al. | |
| 2009/0306975 A1 | 12/2009 | Pietsch et al. | |
| 2009/0306976 A1 | 12/2009 | Joetten et al. | |
| 2010/0318351 A1 | 12/2010 | Sgraja et al. | |
| 2011/0149847 A1 | 6/2011 | Pietsch et al. | |

FOREIGN PATENT DOCUMENTS

| | | |
|---|---|---|
| CN | 1443400 A | 9/2003 |
| CN | 1452845 A | 10/2003 |
| EA | 006007 B1 | 8/2005 |
| EP | 0358582 A2 | 3/1990 |
| EP | 0545783 | 6/1993 |
| EP | 1903747 A1 | 3/2008 |
| EP | 1959693 | 8/2008 |
| EP | 2023519 A1 | 2/2009 |
| JP | 01129628 | 5/1989 |
| JP | H0398344 A | 4/1991 |
| JP | 4347943 A | 12/1992 |
| JP | 5075572 A | 3/1993 |
| JP | 6006324 A | 1/1994 |
| JP | 6169279 A | 6/1994 |
| JP | 7046158 A | 2/1995 |
| JP | 7095189 | 4/1995 |
| JP | 7271487 A | 10/1995 |
| JP | 08046666 | 2/1996 |
| JP | 11196026 A | 7/1999 |
| JP | 2000253187 A | 9/2000 |
| JP | 2001051928 A | 2/2001 |
| JP | 2001519283 A | 10/2001 |
| JP | 2001326979 A | 11/2001 |
| JP | 2003506924 A | 2/2003 |
| JP | 2003188769 A | 7/2003 |
| JP | 2003521143 A | 7/2003 |
| JP | 2003533908 A | 11/2003 |
| JP | 2003536116 A | 12/2003 |
| JP | 2004088258 A | 3/2004 |
| JP | 2004120432 A | 4/2004 |
| JP | 2004260633 A | 9/2004 |
| JP | 2006086551 A | 3/2006 |
| JP | 2006157477 A | 6/2006 |
| JP | 2006520131 A | 8/2006 |
| JP | 2007110746 A | 4/2007 |
| JP | 2008160742 A | 7/2008 |
| JP | 2011523301 A | 8/2011 |
| JP | 2011523302 A | 8/2011 |
| JP | 2012502509 | 1/2012 |
| KR | 20050110715 | 11/2005 |
| RU | 2099893 C1 | 12/1997 |
| RU | 2154906 C1 | 8/2000 |
| RU | 20050117154 A | 2/2004 |
| RU | 2231924 C1 | 6/2004 |
| RU | 2003130463 A | 2/2005 |
| TW | 200713932 | 4/2007 |
| TW | I291099 B | 12/2007 |
| WO | WO8912835 | 12/1989 |
| WO | WO9912303 | 3/1999 |
| WO | WO9949677 | 9/1999 |
| WO | 0110102 A2 | 2/2001 |
| WO | 0143386 A1 | 6/2001 |
| WO | WO0172067 A1 | 9/2001 |
| WO | 0199295 A2 | 12/2001 |
| WO | WO0221757 | 3/2002 |
| WO | 02075986 A1 | 9/2002 |
| WO | 2004075523 A2 | 9/2004 |
| WO | 2004082305 A2 | 9/2004 |
| WO | 2004088914 A1 | 10/2004 |
| WO | 2005109729 A1 | 11/2005 |
| WO | WO2005109923 | 11/2005 |
| WO | 2005114895 A1 | 12/2005 |

(56) References Cited

FOREIGN PATENT DOCUMENTS

| WO | WO2007117892 A2 | 10/2007 |
|---|---|---|
| WO | 2007139145 A1 | 12/2007 |
| WO | 2007142492 A2 | 12/2007 |
| WO | WO2007143032 A2 | 12/2007 |
| WO | 2008032959 A2 | 3/2008 |
| WO | WO2008038248 A2 | 4/2008 |
| WO | 2009099370 | 8/2009 |
| WO | WO2009149352 | 12/2009 |

OTHER PUBLICATIONS

3GPP TS 26.226 V8.0.0 Technical Specification Group Services and System Aspects; Cellular text telephone modem; General description. Chapter 8, p. 10-17.
3GPP TS 26.267 V1.010 Technical Specification Group Services and System Aspects; eCall Data Transfer; In-band modem solution; General description.
3GPP: "3rd Generation Partnership Project;Technical Specification Group Services and System Aspects;eCall Data Transfer—in-band modem solution;(Release 8)" 3GPP Draft; S4-070702 Proposed Enhancements Based on TR 26967-110, 3rd Generation Partnership Project (3GPP), Mobile Competence Centre ; 650, Route Des Lucioles ; F-06921 Sophia-Antipolis Cedex ; France, vol. SA WG4, no. Sophia Antipolis, France; 20071031, Oct. 31, 2007, XP050289760 [retrieved on Oct. 31, 2007] p. 21-p. 24.
3GPP2 C.S0014-C Version 1.0 Enhanced Variable Rate Codec, Speech Service Options 3, 68, and 70 for Wideband Spread Spectrum Digital Systems. Chapter 4, p. 4-102-4-107.
3rd Generation Partnership Project; Technical Specification Group Services and System Aspects Service aspects; Service principles (Release 9) 3GPP Standard; 3GPP TS 22.101, 3rd Generation Partnership Project (3GPP), Mobile Competence Centre ; 650, Route Des Lucioles ; F-06921 Sophia-Antipolis Cedex ; France, No. 9.4.0, Jun. 1, 2009, pp. 1-55, XP050360890.
Andrea Cantini et al.: "Logic and foundations of mathematics" Aug. 1995, Kluwer Acadmic , XP002548457 p. 76-p. 78.
CEN TC278 WG15 (Road Traffic and Transport Telematics et al: "Ecall Application-Layer Acknowledgements Date: Jun. 21, 2009" 3GPP Draft; S1-093210, 3rd Generation Partnership Project (3GPP), Mobile Competence Centre ; 650, Route Des Lucioles ; F-06921 Sophia-Antipolis Cedex ; France, no. Roma; 20090723, Jul. 23, 2009, XP050355530.
Chochliouros I P et al: "Emergency Call (Ecall) Services Based on Approved E-112 Regulations and Infrastructures: A Solution to Improve Security and Release of Road Help" British Telecommunications Engineering, British Telecommunications Engineering. London, GB, vol. 4, No. 3, Jul. 1, 2005, pp. 76-84, XP001504554 ISSN: 0262-401X abstract.
Coleman A., et al., "Subjective Performance Evaluation of the RPE-LTP Codec for the Pan-European Cellular Digital Mobile Radio System, XP-002143130," GLOBECOM 1989 IEEE Global Telecommunications Conference and Exhibition, 1989, vol. 2, 1075.
"Digital cellular telecommunications system (Phase 2+); Universal Mobile Telecommunications System (UMTS); eCall data transfer; In-band modem solution; General description (3GPP TS 26.267 version 8.0.0 Release 8)" Technical Specification, European Telecommunications Standards Institute (ETSI), 650, Route Des Lucioles ; F-06921 Sophia-Antipolis ; France, No. V8.0.0, Apr. 21, 2009 , XP50370217.
Digital cellular telecommunications system (Phase 2+); Universal Mobile Telecommunications System (UMTS); eCall data transfer; In-band modem solution; General description (3GPP TS 26.267 version 8.1.0 Release 8) Technical Specification, European Telecommunications Standards Institute (ETSI), 650, Route Des Lucioles ; F-06921 Sophia-Antipolis ; France, No. V8.1.0, Jun. 1, 2009, XP014044645.
Elmir6hani J M H et al: "Frame synchronisation for optical fibre digital PPM" Singapore ICCS/ISOTA '92. "Communications on the Move" Singapore Nov. 16-20, 1992,New York, NY, USA,IEEE, US, Nov. 16, 1992, pp. 1018-1022, XP010067205 ISBN: 978-0-7803-0803-9 p. 1018, right-hand column, last paragraph—p. 1020, left-hand column, paragraph 1; figures 2,3,5,6.
Fan Yu et al: "Toward In-Band Self-Organziation in Energy-Efficient MAC Protocols for Sensor Networks," IEEE Transactions on Mobile Computing, IEEE Service Center, vol. 7, No. 2, Feb. 1, 2008, pp. 156-170.
Gutleber F S: "Spread Spectrum Multiplexed Noise Codes" MILCOM Conference Record, XX, XX, vol. 1, Oct. 17, 1982, pp. 15.1.1-15.1.10, XP000677820 p. 15.1.3, left-hand column, last paragraph—right-hand column, paragraph 1.
Intelligent transport systems a ESafety a ECall High level application protocols 3GPP Draft; W15-0180 HLAP PT Final 090710, 3rd Generation Partnership Project (3GPP), Mobile Competence Centre ; 650, Route Des Lucioles ; F-06921 Sophia-Antipolis Cedex ; France, no. Kista; 20090814, Aug. 14, 2009), XP050356954.
International Search Report and Written Opinion—PCT/US2010/038903, International Search Authority—European Patent Office—Sep. 20, 2010.
Lin D., et al., "Data Compression of Voiceband Modem Signals, XP000204133," IEEE, 40th IEEE Vehicular Technology Conference on the Move in the 90's, 1990, 323-325.
Mueller A. J., et al., "A DSP Implemented Dual 9600/7200 BPS TCM Modem for Mobile Communications Over FM Voice Radios, XP000852273," Proceedings of the 1997 6th IEEE Pacific RIM Conference on Communications, Computers and Signal Processing, 1997, vol. 2.
QUALCOMM Europe S A R L: "Clarification and test results for eCall transmission with IVS initiated signalling and higher-layer acknowledgement" 3GPP Draft; S4-090484 Clarification and Test Results for Ecall Transmission With IVS Initiated Signalling and Higher-Layer Acknowledgement, 3rd Generation Partnership Project (3GPP), Mobile Competence Centre ; 650, Route Des Lucioles ; F-06921 Sophia, no. Sweden; 20090617, Jun. 17, 2009), XP050356771.
QUALCOMM Europe S A R L: "Integration of higher-layer acknowledgement message" 3GPP Draft; S4-090470 CR 26.267-0002 Integration of Higher-Layer Acknowledgement Message (Release 8), 3rd Generation Partnership Project (3GPP), Mobile Competence Centre ; 650, Route Des Lucioles ; F-06921 Sophia-Antipolis Cedex ; France, no. Sweden; 20090617, Jun. 17, 2009, XP050356757.
QUALCOMM Europe S A R L: "Integration of higher-layer acknowledgement message" 3GPP Draft; S4-090538 CR 26.267-0002 REV 1 Integration of Higher-Layer Acknowledgement Message (Release 8), 3rd Generation Partnership Project (3GPP), Mobile Competence Centre ; 650, Route Des Lucioles ; F-06921 Sophia-Antipolis Cedex France, no. Sweden; 20090625, Jun. 25, 2009, XP050356816.
QUALCOMM Europe S A R L: "Integration of IVS-initiated signalling option" 3GPP Draft; S4-090472 CR 26.267-0003 Integration of IVS-Initiated Signalling Option (Release 8), 3rd Generation Partnership Project (3GPP), Mobile Competence Centre ; 650, Route Des Lucioles ; F-06921 Sophia-Antipolis Cedex ; France, no. Sweden; 20090617, Jun. 17, 2009, XP050356759.
QUALCOMM Europe: "eCall—PSAP acknowledgement to the IVS" 3GPP Draft; S1-091393, 3rd Generation Partnership Project (3GPP), Mobile Competence Centre ; 650, Route Des Lucioles ; F-06921 Sophia-Antipolis Cedex ; France, no. Chiba, Japan; 20090518, May 18, 2009, XP050344830.
Suehiro N et al: "Binary signal-design for approximately synchronized CDMA systems without detection sidelobe nor co-channel interference using auto- and cross-complementary codes" International Conference on Universal Personalcommunications, IEEE, New York, NY, US, vol. 2, Oct. 5, 1998, pp. 1097-1102, XP002173807 p. 1097, last paragraph—p. 1098.
Pang, et al., "Performance Improvement of 802.11 Wireless Access Network with TCP ACK Agent and Auto-Zoom Backoff Algorithm," IEEE, Sep. 2005.
CEN TC278 WG15 (Road Traffic and Transport Telematics: "Ecall Application-Layer Acknowledgements", 3GPP Draft; S4-090508 (Attachment) LS on Ecall Hlack, 3rd Generation Partnership Project (3GPP), Mobile Competence Centre; 650, Route Des Lucioles;

(56) References Cited

OTHER PUBLICATIONS

F-06921 Sophia-Anti Polis Cedex; France, Jun. 22, 2009, XP050638543, [retrieved on Jun. 22, 2009].

Zhukovsky A. P., et al., "Radio Receiving Devices", Moscow, Vysshaya Shkola, 1989, pp. 146-148. [online], [retrieved Jul. 3, 2012], retrieved online at: <URL: http://radioustrojstva.ru/book/radio_priem_ustroystva/radio_priem_ustroystva_1.html>.

3GPP: "3rd Generation Partnership Project; Technical Specification Group Services and System Aspects; eCall data transfer; In-band modem solution (Release 8)", 3GPP TR 26.967 V8.0.1, Dec. 31, 2007, pp. 1-27.

"3rd Generation Partnership Project; Technical Specification Group Services and System Aspects; eCall data transfer; In-band modem solution; General Description (Release 9)," 3GPP Standard; 3GPP TR 26.267, 3rd Generation Partnership Project (3GPP), Mobile Competence Centre, No. V9.0.0, Dec. 2009, pp. 1-36.

Taiwan Search Report—TW099119806—TIPO—Aug. 20, 2013.

\* cited by examiner

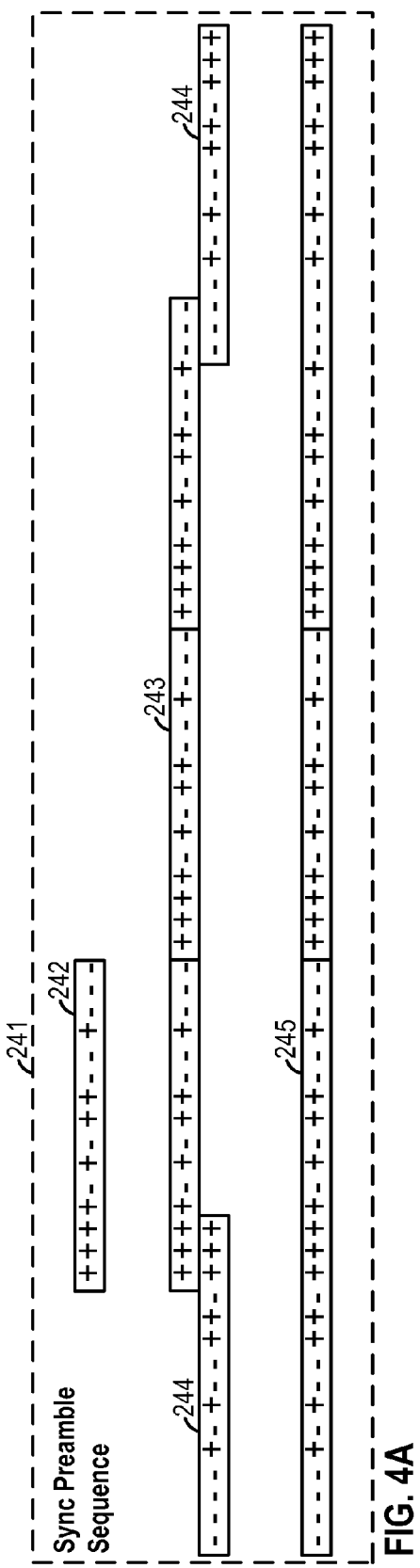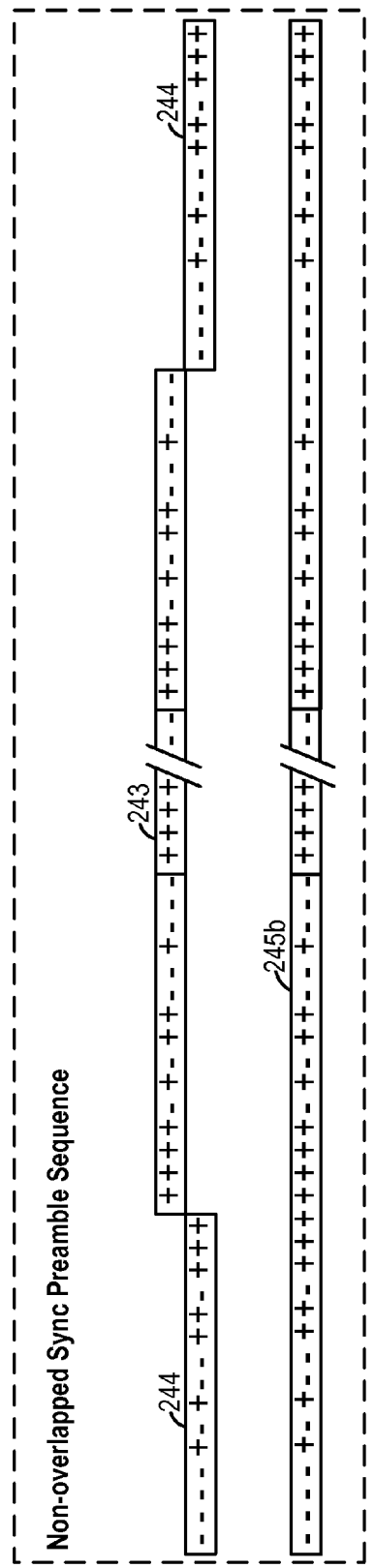

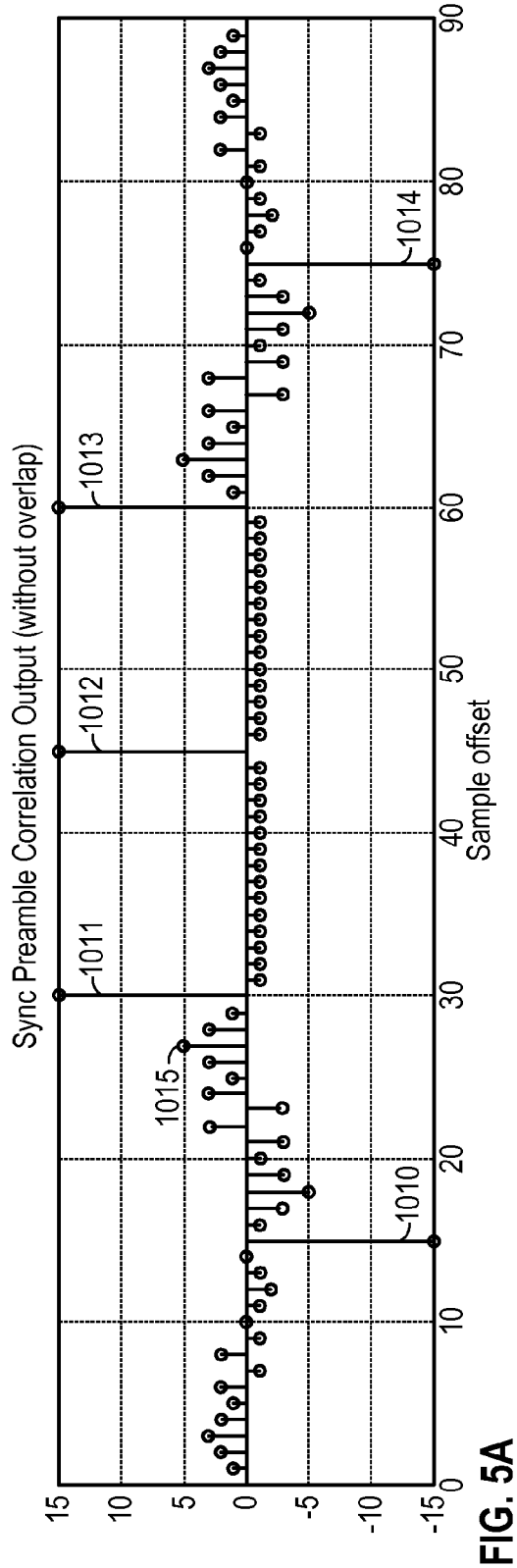
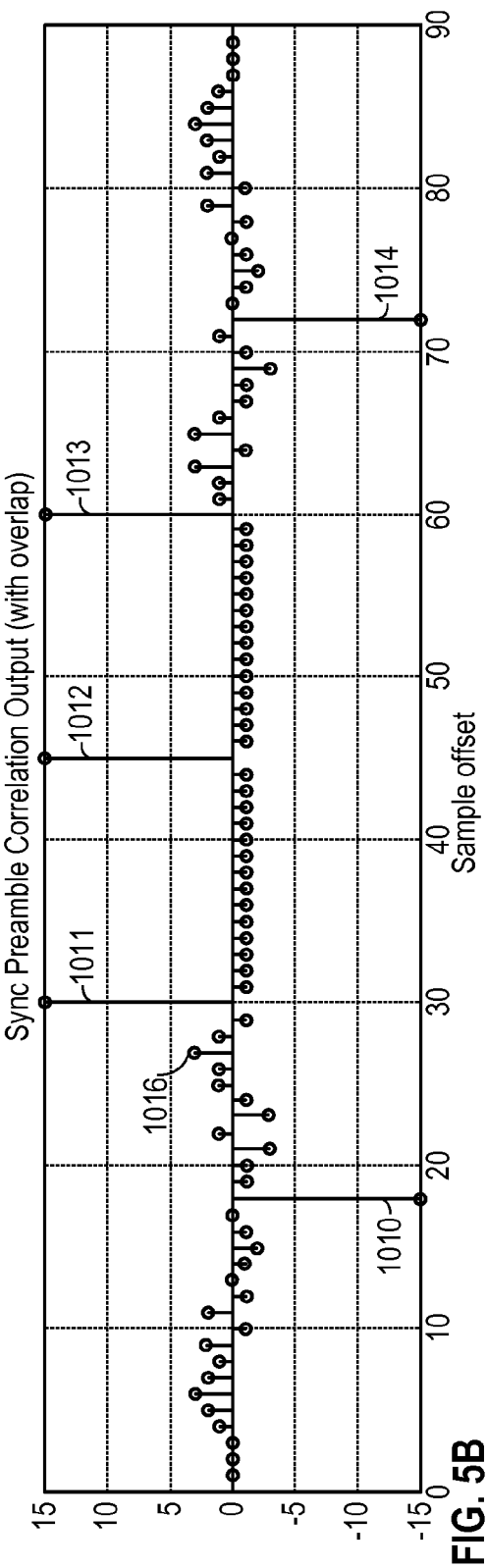
FIG. 5A
FIG. 5B

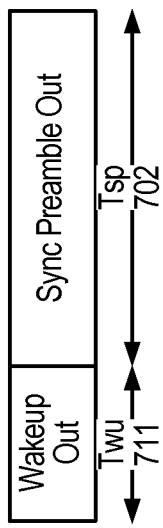 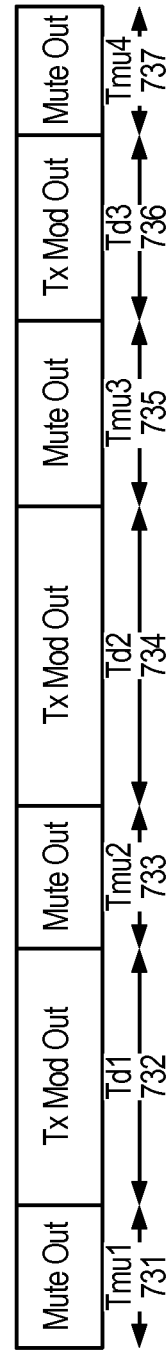 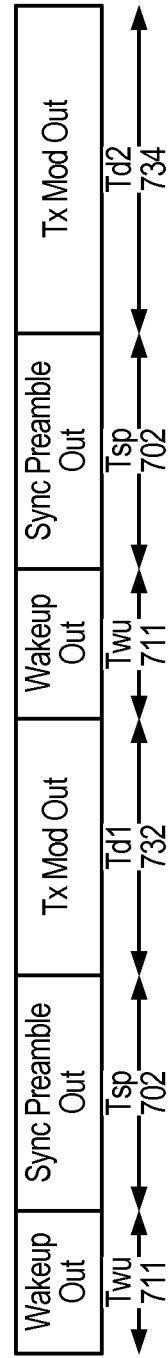

Inverted Sync Preamble Sequence

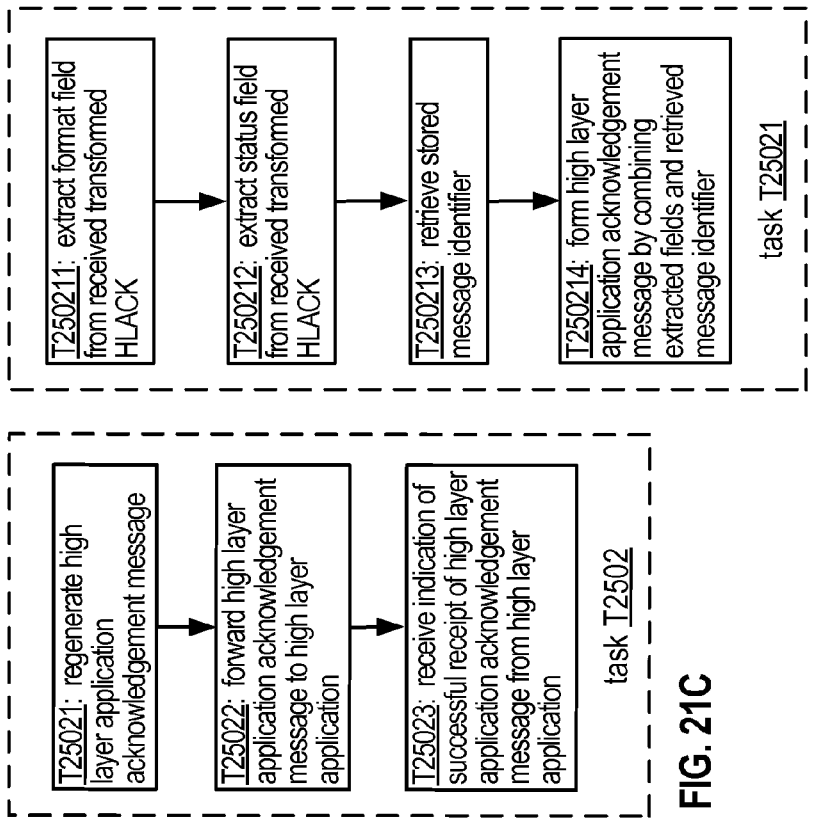
FIG. 21D
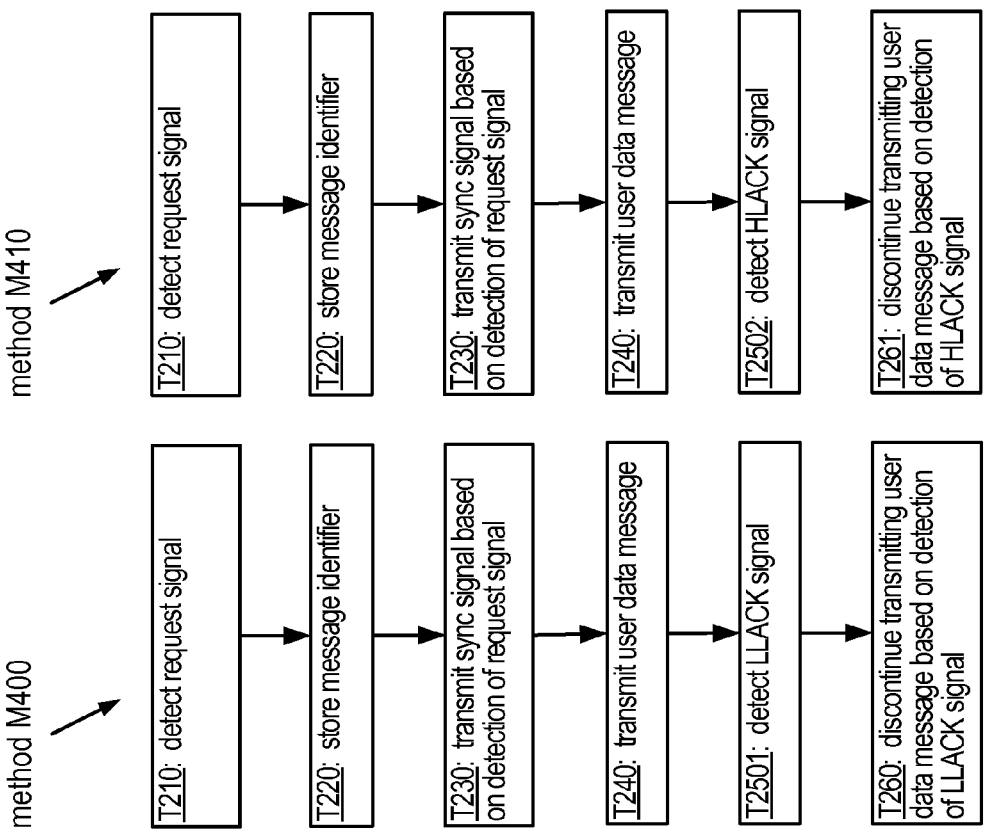
FIG. 21C
FIG. 21B
FIG. 21A

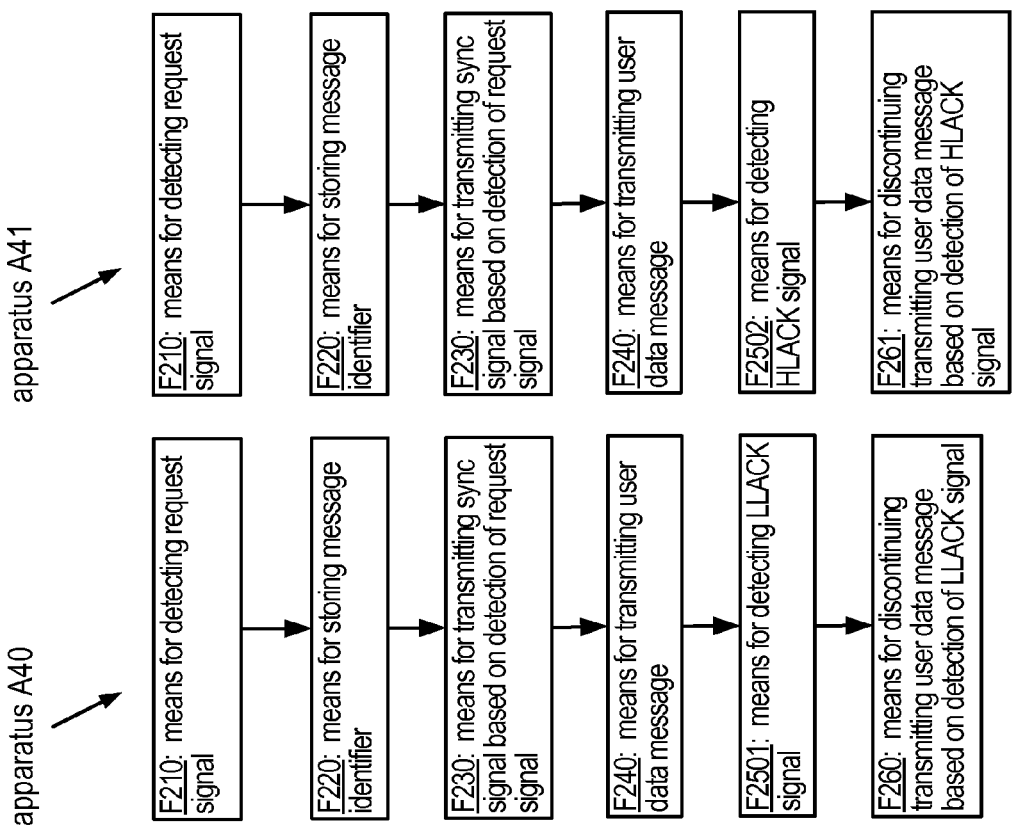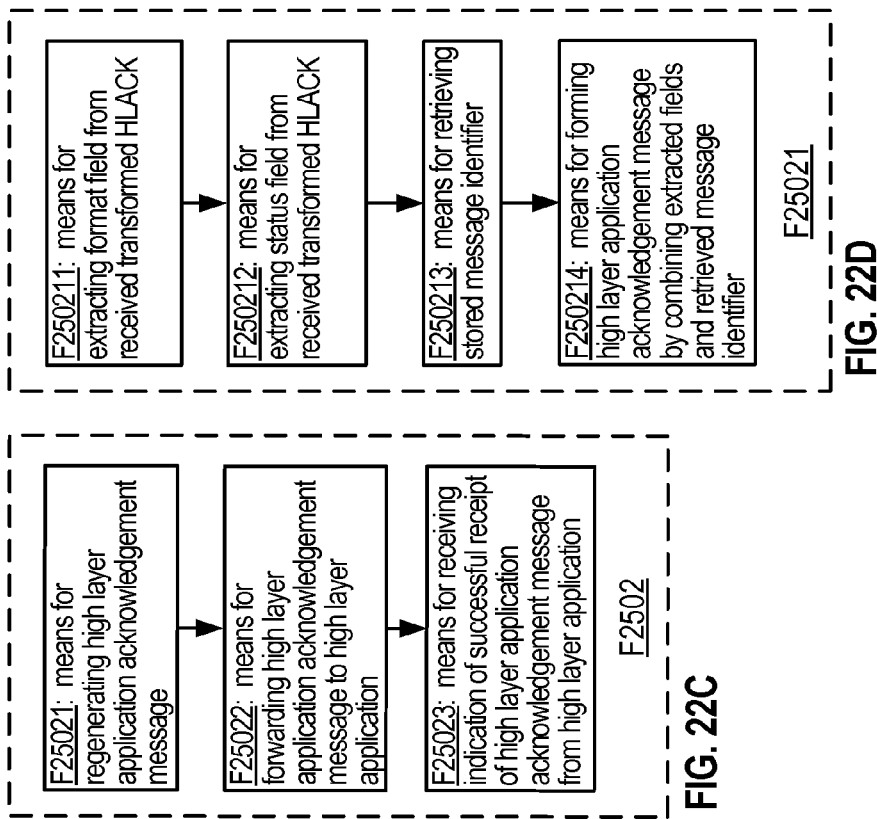
FIG. 22A
FIG. 22B
FIG. 22C
FIG. 22D

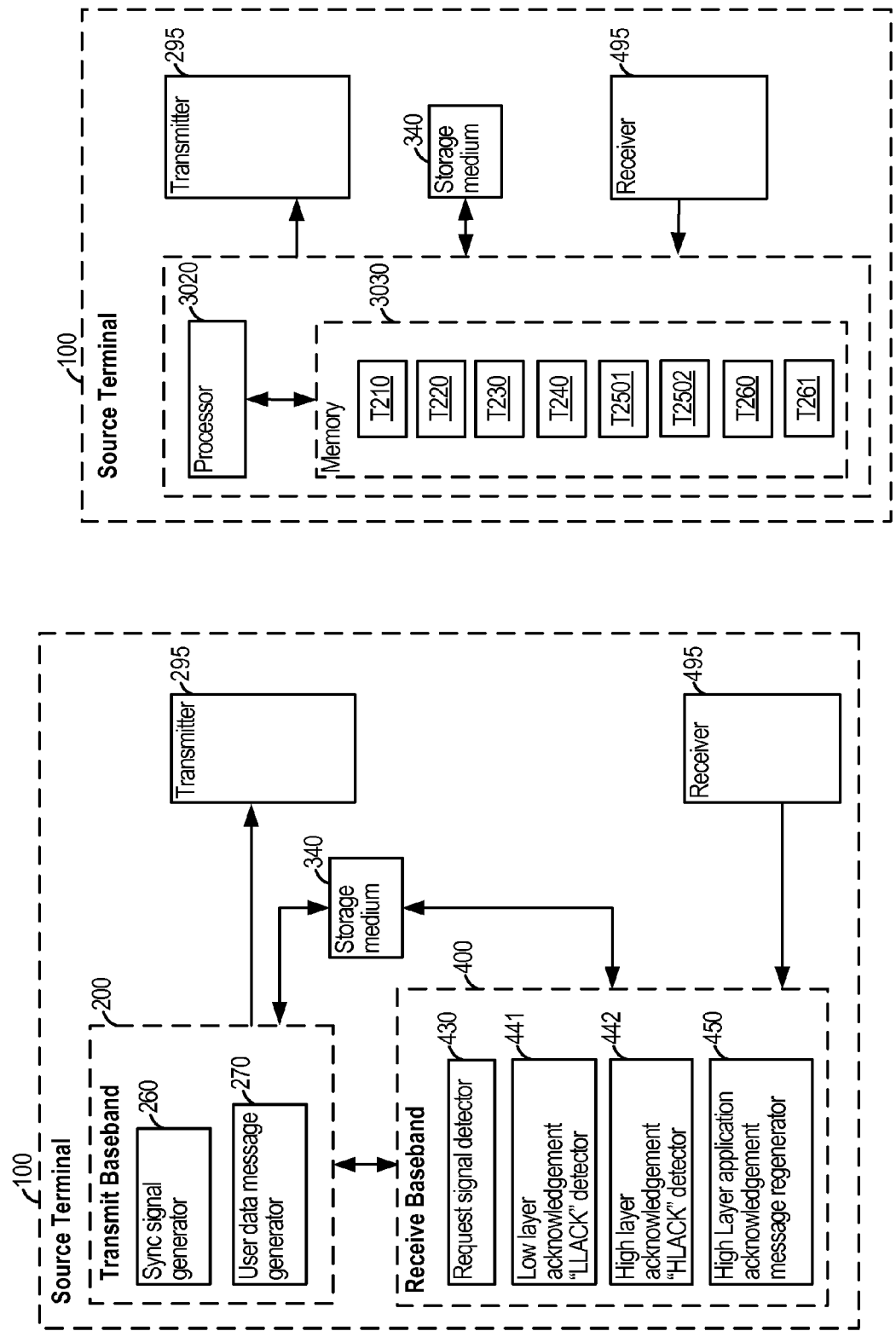

SYSTEM AND METHOD FOR SUPPORTING HIGHER-LAYER PROTOCOL MESSAGING IN AN IN-BAND MODEM

RELATED APPLICATIONS

I. Claim of Priority

A claim of priority is made to the following U.S. Provisional Applications:

No. 61/187,393 entitled "SYSTEM AND METHOD FOR SUPPORTING HIGHER-LAYER PROTOCOL MESSAGING IN AN IN-BAND MODEM" filed Jun. 16, 2009, and assigned to the assignee hereof and hereby expressly incorporated by reference herein.

No. 61/325,732 entitled "SYSTEM AND METHOD FOR ENHANCING THE SYNCHRONIZATION SIGNAL IN AN IN-BAND MODEM" filed Apr. 19, 2010, and assigned to the assignee hereof and hereby expressly incorporated by reference herein.

No. 61/327,004 entitled "SYSTEM AND METHOD FOR SUPPORTING HIGHER-LAYER PROTOCOL MESSAGING IN AN IN-BAND MODEM" filed Apr. 22, 2010, and assigned to the assignee hereof and hereby expressly incorporated by reference herein.

II. Reference to Co-Pending Applications for Patent

Related co-pending U.S. patent applications include:

Ser. No. 12/477,544 entitled "SYSTEM AND METHOD OF AN IN-BAND MODEM FOR DATA COMMUNICATIONS OVER DIGITAL WIRELESS COMMUNICATION NETWORKS" filed Jun. 3, 2009, and assigned to the assignee hereof and hereby expressly incorporated by reference herein.

Ser. No. 12/477,561 entitled "SYSTEM AND METHOD OF AN IN-BAND MODEM FOR DATA COMMUNICATIONS OVER DIGITAL WIRELESS COMMUNICATION NETWORKS" filed Jun. 3, 2009, and assigned to the assignee hereof and hereby expressly incorporated by reference herein.

Ser. No. 12/477,574 entitled "SYSTEM AND METHOD OF AN IN-BAND MODEM FOR DATA COMMUNICATIONS OVER DIGITAL WIRELESS COMMUNICATION NETWORKS" filed Jun. 3, 2009, and assigned to the assignee hereof and hereby expressly incorporated by reference herein.

Ser. No. 12/477,590 entitled "SYSTEM AND METHOD OF AN IN-BAND MODEM FOR DATA COMMUNICATIONS OVER DIGITAL WIRELESS COMMUNICATION NETWORKS" filed Jun. 3, 2009, and assigned to the assignee hereof and hereby expressly incorporated by reference herein.

Ser. No. 12/477,608 entitled "SYSTEM AND METHOD OF AN IN-BAND MODEM FOR DATA COMMUNICATIONS OVER DIGITAL WIRELESS COMMUNICATION NETWORKS" filed Jun. 3, 2009, and assigned to the assignee hereof and hereby expressly incorporated by reference herein.

Ser. No. 12/477,626 entitled "SYSTEM AND METHOD OF AN IN-BAND MODEM FOR DATA COMMUNICATIONS OVER DIGITAL WIRELESS COMMUNICATION NETWORKS" filed Jun. 3, 2009, and assigned to the assignee hereof and hereby expressly incorporated by reference herein.

BACKGROUND

I. Field

The present disclosure generally relates to data transmission over a speech channel. More specifically, the disclosure relates to a system and method for supporting higher layer protocol messaging through a speech codec (in-band) in a communication network.

II. Description of Related Art

Transmission of speech has been a mainstay in communications systems since the advent of the fixed line telephone and wireless radio. Advances in communications systems research and design have moved the industry toward digital based systems. One benefit of a digital communication system is the ability to reduce required transmission bandwidth by implementing compression on the data to be transferred. As a result, much research and development has gone into compression techniques, especially in the area of speech coding. A common speech compression apparatus is a "vocoder" and is also interchangeably referred to as a "speech codec" or "speech coder." The vocoder receives digitized speech samples and produces collections of data bits known as "speech packets". Several standardized vocoding algorithms exist in support of the different digital communication systems which require speech communication, and in fact speech support is a minimum and essential requirement in most communication systems today. The 3rd Generation Partnership Project 2 (3GPP2) is an example standardization organization which specifies the IS-95, CDMA2000 1×RTT (1×Radio Transmission Technology), CDMA2000 EV-DO (Evolution-Data Optimized), and CDMA2000 EV-DV (Evolution-Data/Voice) communication systems. The 3rd Generation Partnership Project (3GPP) is another example standardization organization which specifies the GSM (Global System for Mobile Communications), UMTS (Universal Mobile Telecommunications System), HSDPA (High-Speed Downlink Packet Access), HSUPA (High-Speed Uplink Packet Access), HSPA+ (High-Speed Packet Access Evolution), and LTE (Long Term Evolution). The VoIP (Voice over Internet Protocol) is an example protocol used in the communication systems defined in 3GPP and 3GPP2, as well as others. Examples of vocoders employed in such communication systems and protocols include ITU-T G.729 (International Telecommunications Union), AMR (Adaptive Multirate Speech Codec), and EVRC (Enhanced Variable Rate Codec Speech Service Options 3, 68, 70).

Information sharing is a primary goal of today's communication systems in support of the demand for instant and ubiquitous connectivity. Users of today's communication systems transfer speech, video, text messages, and other data to stay connected. New applications being developed tend to outpace the evolution of the networks and may require upgrades to the communication system modulation schemes and protocols. In some remote geographical areas only speech services may be available due to a lack of infrastructure support for advanced data services in the system. Alternatively, users may choose to only enable speech services on their communications device due to economic reasons. In some countries, public services support is mandated in the communication network, such as Emergency 911 (E911) or eCall. In these emergency application examples, fast data transfer is a priority but not always realistic especially when advanced data services are not available at the user terminal. Previous techniques have provided solutions to transmit data through a speech codec, but these solutions are only able to support low data rate transfers due to the coding inefficiencies incurred when trying to encode a non-speech signal with a vocoder.

Transmitting data through a speech codec is commonly referred to as transmitting data "in-band", wherein the data is incorporated into one or more speech packets output from the speech codec. Several techniques use audio tones at predetermined frequencies within the speech frequency band to represent the data. Using predetermined frequency tones to transfer data through speech codecs, especially at higher data rates, is unreliable due to the vocoders employed in the systems. The vocoders are designed to model speech signals using a limited number of parameters. The limited parameters are insufficient to effectively model the tone signals. The ability of the vocoders to model the tones is further degraded when attempting to increase the transmission data rate by changing the tones quickly. This affects the detection accuracy and results in the need to add complex schemes to minimize the data errors which in turn further reduces the overall data rate of the communication system. Therefore, a need arises to efficiently and effectively transmit data through a speech codec in a communication network.

An efficient in-band modem is described in detail in U.S. patent application Ser. No. 12/477,544 which is assigned to the assignee hereof and hereby expressly incorporated by reference herein. The in-band modem allows information such as emergency information in an eCall application to be sent from a source to a destination and for the destination to send a low layer acknowledgement at the in-band modem layer indicating proper receipt of the transmitted information.

In some cases, it is advantageous for a layer higher than the low layer (modem layer), such as the application layer, to send an acknowledgement in addition to the low layer acknowledgement. Sending acknowledgements from multiple layers allows for independence among the implemented layers. For example, acknowledgement messaging at a Radio Link Protocol (RLP) layer may exist in addition to acknowledgement messaging at a Transmission Control Protocol (TCP) layer. Sending acknowledgements from multiple layers also improves the reliability of the acknowledgment messaging by acting as a form of redundancy.

Multiple layer acknowledgement messaging increases the bandwidth requirements of typical systems in the art. Typical systems transmit additional identifier bits to distinguish a low layer message from a high layer message. For in-band modem systems, where the available bandwidth is limited by the speech codec, incorporating multiple layer acknowledgement systems presents a costly overhead in the additional bits required for the messages themselves as well as bits allocated to distinguish a low layer message from a high layer message. Compression schemes on the acknowledgement messages have been proposed to reduce the overhead. However, compression schemes do not distinguish different message types at the modem layer and thus still result in an overall increase in bandwidth requirements.

Accordingly it would be advantageous to provide an improved system for supporting higher layer protocol messaging through a speech codec in a communications network.

SUMMARY

Embodiments disclosed herein address the above stated needs by using an in-band modem to reliably transmit and receive higher layer protocol messages through a speech codec.

In one embodiment, a method of acknowledging a source terminal data message from a destination terminal in an in-band communication system comprises transmitting a low layer acknowledgement (LLACK) signal, wherein the LLACK signal is comprised of a first synchronization sequence followed by a LLACK message and transmitting a high layer application (HLMSG) signal, wherein the HLMSG signal is comprised of a second synchronization sequence followed by a transformed HLMSG message.

In another embodiment, an apparatus comprises a transmitter configured to transmit signals from a destination terminal, a receiver configured to receive signals from a source terminal at the destination terminal, a start signal generator coupled to the transmitter and configured to generate a start signal, a NACK signal generator coupled to the transmitter and configured to generate a NACK signal, a data message detector coupled to the receiver and configured to detect a source terminal data message, a LLACK signal generator coupled to the transmitter and configured to generate a first synchronization sequence followed by an LLACK message, and a HLACK signal generator coupled to the transmitter and configured to generate a second synchronization sequence followed by a transformed HLACK message.

In another embodiment, an apparatus comprises a processor, memory in electronic communication with the processor, and instructions stored in the memory, the instructions being capable of executing the steps of transmitting a low layer acknowledgement (LLACK) signal, wherein the LLACK signal is comprised of a first synchronization sequence followed by a LLACK message and transmitting a high layer application (HLMSG) signal, wherein the HLMSG signal is comprised of a second synchronization sequence followed by a transformed HLMSG message, wherein the transformed HLMSG message is a high layer acknowledgement (HLACK) message.

In another embodiment, an apparatus for acknowledging a source terminal data message from a destination terminal in an in-band communication system comprises means for transmitting a low layer acknowledgement (LLACK) signal, wherein the LLACK signal is comprised of a first synchronization sequence followed by a LLACK message and means for transmitting a high layer application (HLMSG) signal, wherein the HLMSG signal is comprised of a second synchronization sequence followed by a transformed HLMSG message, wherein the transformed HLMSG message is a high layer acknowledgement (HLACK) message.

In another embodiment, a processor readable medium for acknowledging a source terminal data message from a destination terminal in an in-band communication system, comprises instructions for transmitting a start signal from the destination terminal, whereby the source terminal is constrained to respond in a first predetermined manner, discontinuing transmission of the start signal upon detection of a first received signal, wherein the first received signal indicates a successful reception of the start signal from the source terminal, transmitting a negative acknowledgement (NACK) signal from the destination terminal, whereby the source terminal is constrained to respond in a second predetermined manner, discontinuing transmission of the NACK signal upon successful reception of the source terminal data message, transmitting a low layer acknowledgement (LLACK) signal, wherein the LLACK signal is comprised of a first synchronization sequence followed by a LLACK message, transmitting a high layer application (HLMSG) signal, wherein the HLMSG signal is comprised of a second synchronization sequence followed by a transformed HLMSG message, wherein the transformed HLMSG message is a high layer acknowledgement (HLACK) message, and discontinuing transmission of the LLACK signal upon detection of an uplink event In another embodiment, a method of controlling source terminal transmissions from a source terminal in an in-band communication system comprises detecting a request signal to transmit a user data message at the source terminal, storing a message identifier at the source terminal, transmitting a synchronization signal from the source terminal upon detection of the request signal, transmitting the user data message from the source terminal, and discontinuing transmission of the user data message upon detection of a low layer acknowledgement (LLACK) signal or a high layer application (HLMSG) signal, wherein the LLACK signal is comprised of a first synchronization sequence followed by a LLACK message, wherein the HLMSG signal is comprised of a second synchronization sequence followed by a transformed HLMSG message.

In another embodiment, an apparatus comprises a transmitter configured to transmit signals from a source terminal, a receiver configured to receive signals from a destination terminal at the source terminal, a request signal detector configured to detect a request to transmit a user data message, a synchronization signal generator coupled to the transmitter and configured to transmit a synchronization signal, a user data message generator coupled to the transmitter and configured to transmit the user data message, a low layer acknowledgement (LLACK) signal detector coupled to the receiver and configured to detect a first synchronization sequence followed by an LLACK message, a high layer acknowledgement (HLACK) signal detector coupled to the receiver and configured to detect a second synchronization sequence followed by a transformed HLACK message.

In another embodiment, an apparatus comprises a processor, memory in electronic communication with the processor, and instructions stored in the memory, the instructions being capable of executing the steps of detecting a request signal to transmit a user data message at a source terminal, storing a message identifier at the source terminal, transmitting a synchronization signal from the source terminal upon detection of the request signal, transmitting the user data message from the source terminal, and discontinuing transmission of the user data message upon detection of a low layer acknowledgement (LLACK) signal or a high layer application (HLMSG) signal, wherein the LLACK signal is comprised of a first synchronization sequence followed by a LLACK message, wherein the HLMSG signal is comprised of a second synchronization sequence followed by a transformed HLMSG message.

In another embodiment, an apparatus comprises means for detecting a request signal to transmit a user data message at a source terminal, means for storing a message identifier at the source terminal, means for transmitting a synchronization signal from the source terminal upon detection of the request signal, means for transmitting the user data message from the source terminal, means for detecting a low layer acknowledgement (LLACK) signal, wherein the LLACK signal is comprised of a first synchronization sequence followed by a LLACK message, means for detecting a high layer application (HLMSG) signal, wherein the HLMSG signal is comprised of a second synchronization sequence followed by a transformed HLMSG message, wherein the transformed HLMSG message is a high layer acknowledgement (HLACK) message, and means for discontinuing transmission of the user data message upon detection of the LLACK signal or HLMSG signal.

In another embodiment, a processor readable medium for controlling source terminal transmissions from a source terminal in an in-band communication system comprises instructions for detecting a request signal to transmit a user data message at the source terminal, storing a message identifier at the source terminal, transmitting a synchronization signal from the source terminal upon detection of the request signal, transmitting the user data message from the source terminal, discontinuing transmission of the user data message upon detection of a low layer acknowledgement (LLACK) signal or a high layer application (HLMSG) signal, wherein the LLACK signal is comprised of a first synchronization sequence followed by a LLACK message, wherein the HLMSG signal is comprised of a second synchronization sequence followed by a transformed HLMSG message.

BRIEF DESCRIPTION OF THE DRAWINGS

The aspects and the attendant advantages of the embodiments described herein will become more readily apparent by reference to the following detailed description when taken in conjunction with the accompanying drawings wherein:

FIG. 4A is a diagram of an embodiment of a synchronization preamble sequence.

FIG. 4B is a diagram of an embodiment of a synchronization preamble sequence with non-overlapping reference sequences.

FIG. 5A is a graph of a synchronization preamble correlation output where the preamble is comprised of non-overlapped reference sequences.

FIG. 5B is a graph of a synchronization preamble correlation output where the preamble is comprised of overlapped reference sequences.

FIG. 6 is a diagram of an embodiment of a synchronization message format.

FIG. 7 is a diagram of an embodiment of a transmit data message format.

FIG. 8 is a diagram of an embodiment of a composite synchronization and transmit data message format.

FIG. 21A is a flowchart of an embodiment of a method M400 of a Source Terminal signaling to a Destination Terminal.

FIG. 21B is a flowchart of an embodiment of a method M410 of a Source Terminal signaling to a Destination Terminal.

FIG. 21C is a flowchart of an embodiment of a first set of subtasks for method M410 of a Source Terminal signaling to a Destination Terminal.

FIG. 21D is a flowchart of an embodiment of a second set of subtasks for method M410 of a Source Terminal signaling to a Destination Terminal.

FIG. 22A is a block diagram of an embodiment of an apparatus A40.

FIG. 22B is a block diagram of an embodiment of an apparatus A41.

FIG. 22C is a block diagram of an embodiment of a second set of means of an apparatus A41.

FIG. 22D is a block diagram of an embodiment of a third set of means of an apparatus A41.

FIG. 23A is a block diagram of an implementation of apparatus A40 and A41 according to a first configuration.

FIG. 23B is a block diagram of an implementation of apparatus A40 and A41 according to a second configuration.

DETAILED DESCRIPTION

Figure 1A:
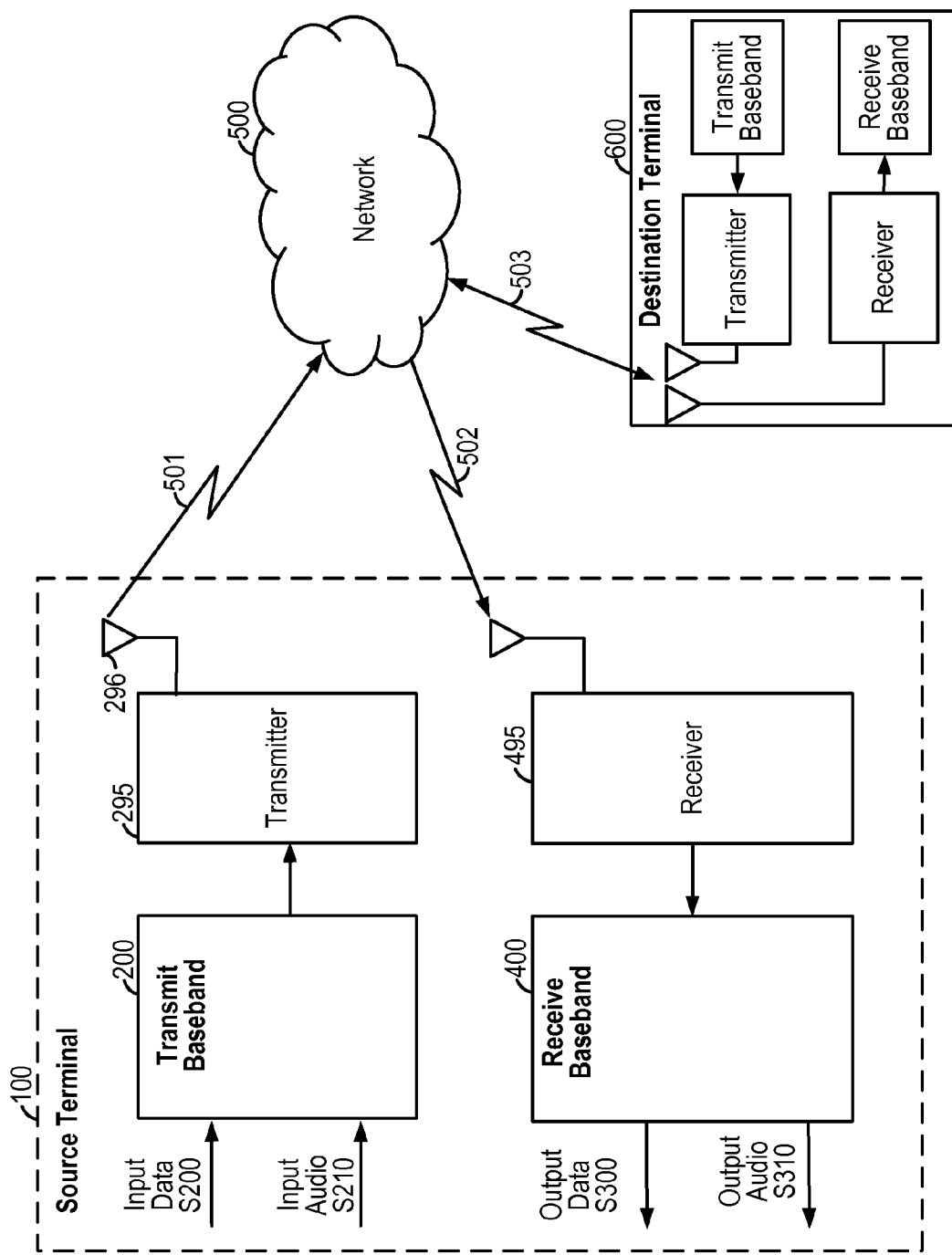
FIG. 1A is a diagram of an embodiment of source and destination terminals which use an in-band modem to transmit messages through a speech codec in a wireless communication network.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

In a typical application a system, method, or apparatus is used to control source terminal transmissions from a destination terminal in an in-band communication system. The system, method, or apparatus may include acknowledgement signals sent by the Destination terminal which may be comprised of a low layer acknowledgement message, a high layer acknowledgement message which is transformed into a transformed high layer acknowledgement message, or both low layer and high layer acknowledgement messages. The Destination terminal may distinguish the low layer acknowledgement message from the transformed high layer acknowledgement message without sending additional identifier information bits by unique synchronization sequences prepended to the acknowledgement messages. The acknowledgement messages may be distinguished by the Source terminal at the low layer by detecting the unique synchronization sequences. The Source terminal may reconstruct the high layer acknowledgement message from the transformed high layer acknowledgement message using a stored message identifier.

FIG. 1A shows an embodiment of an in-band data communication system as might be implemented within a wireless source terminal 100. The source terminal 100 communicates with the destination terminal 600 through the communication channels 501 and 502, network 500, and communication channel 503. Examples of suitable wireless communication systems include cellular telephone systems operating in accordance with Global System for Mobile Communication (GSM), Third Generation Partnership Project Universal Mobile Telecommunication System (3GPP UMTS), Third Generation Partnership Project 2 Code Division Multiple Access (3GPP2 CDMA), Time Division Synchronous Code Division Multiple Access (TD-SCDMA), and Worldwide Interoperability for Microwave Access (WiMAX) standards. One skilled in the art will recognize that the techniques described herein may be equally applied to an in-band data communication system that does not involve a wireless channel. The communication network 500 includes any combination of routing and/or switching equipment, communications links and other infrastructure suitable for establishing a communication link between the source terminal 100 and destination terminal 600. For example, communication channel 503 may not be a wireless link. The source terminal 100 normally functions as a voice communication device.

Transmitter

The transmit baseband 200 normally routes user speech through a vocoder, but is also capable of routing non-speech data through the vocoder in response to a request originating from the source terminal or the communication network. Routing non-speech data through the vocoder is advantageous since it eliminates the need for the source terminal to request and transmit the data over a separate communications channel. The non-speech data is formatted into messages. The message data, still in digital form, is converted into a noise-like signal comprised of pulses. The message data information is built into the pulse positions of the noise-like signal. The noise-like signal is encoded by the vocoder. The vocoder is not configured differently depending on whether the input is user speech or non-speech data so it is advantageous to convert the message data into a signal which can be effectively encoded by the transmission parameter set allocated to the vocoder. The encoded noise-like signal is transmitted in-band over the communication link. Because the transmitted information is built in the pulse positions of the noise-like signal, reliable detection depends on recovery of the timing of the pulses relative to the speech codec frame boundaries. To aid the receiver in detecting the in-band transmission, a predetermined synchronization signal is encoded by the vocoder prior to the transmission of message data. A protocol sequence of synchronization, control, and messages is transmitted to ensure reliable detection and demodulation of the non-speech data at the receiver.

Figure 1B:
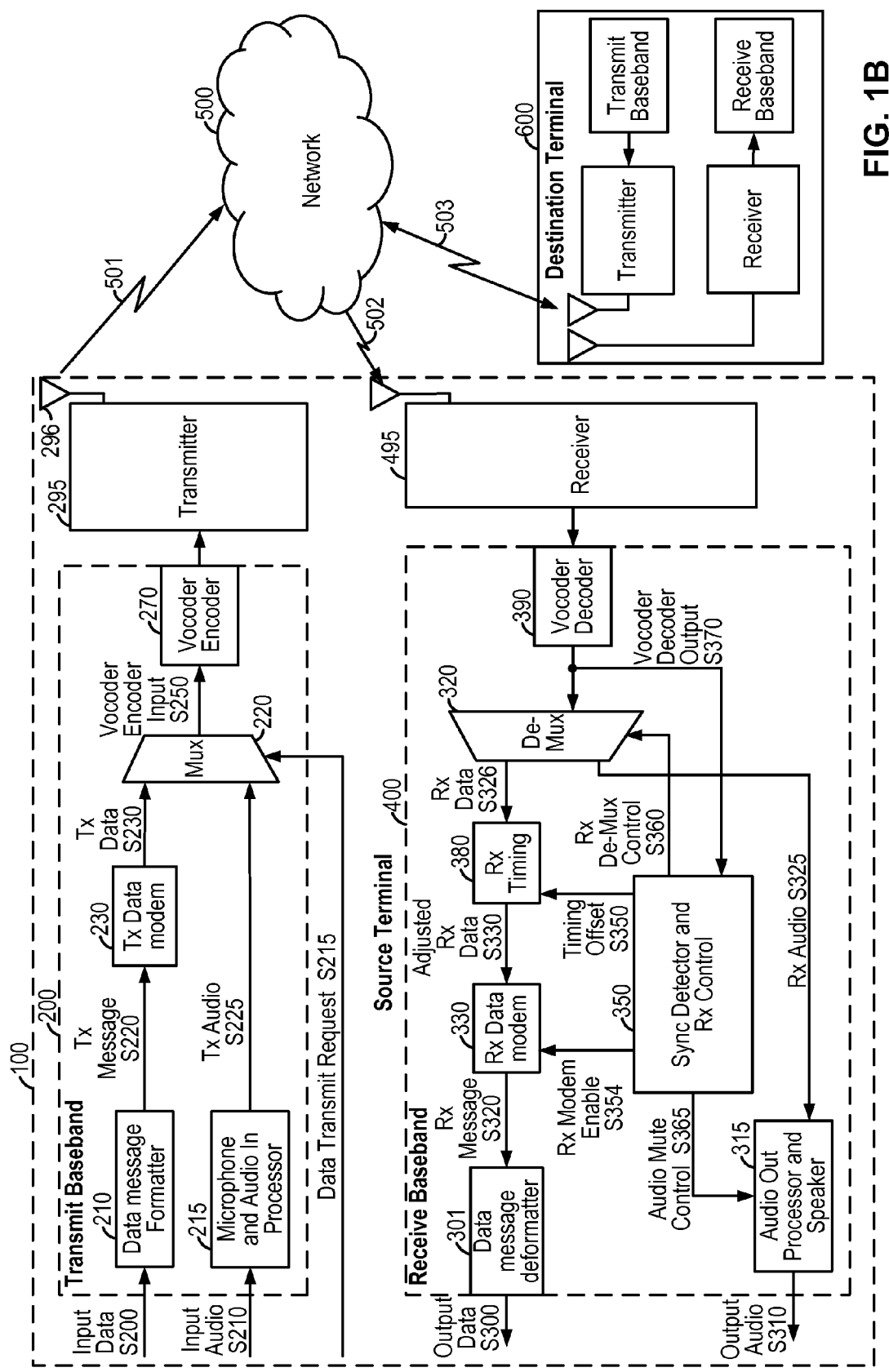
FIG. 1B is a diagram of another embodiment of source and destination terminals which use an in-band modem to transmit messages through a speech codec in a wireless communication network.

Referring to FIG. 1B, transmit baseband 200, the signal input audio 5210 is input to the microphone and audio input processor 215 and transferred through the mux 220 into the vocoder encoder 270 where compressed voiced packets are generated. A suitable audio input processor typically includes circuitry to convert the input signal into a digital signal and a signal conditioner such as a low-pass filter. Examples of suitable vocoders include, but are not limited to, those described by the following reference standards: GSM-FR, GSM-HR, GSM-EFR, EVRC, EVRC-B, SMV, QCELP13K, IS-54, AMR, G.723.1, G.728, G.729, G.729.1, G.729a, G.718, G.722.1, AMR-WB, EVRC-WB, VMR-WB. The vocoder encoder 270 supplies voice packets to the transmitter 295 and antenna 296 and the voice packets are transmitted over the communication channel 501.

A request for data transmission may be initiated by a user or sensor located near or within the source terminal or through the communications network. The data transmit request S215 disables the voice path through mux 220 and enables the transmit data path. The input data S200 is pre-processed by the data message formatter 210 and output as Tx Message S220 to the Tx Data Modem 230. Input data S200 may include user interface (UI) information, user position/location information, time stamps, equipment sensor information, or other suitable data. An example of a suitable data message formatter 210 includes circuitry to calculate and append cyclic redundancy check (CRC) bits to the input data, provide retransmission buffer memory, implement error control coding such as hybrid automatic repeat-request (HARQ), and interleave the input data. The Tx data modem 230 converts Tx Message S220 to data signal Tx Data S230 which is routed through mux 220 to the vocoder encoder 270. Once the data transmission is complete the voice path may be re-enabled through mux 220.

Figure 2:
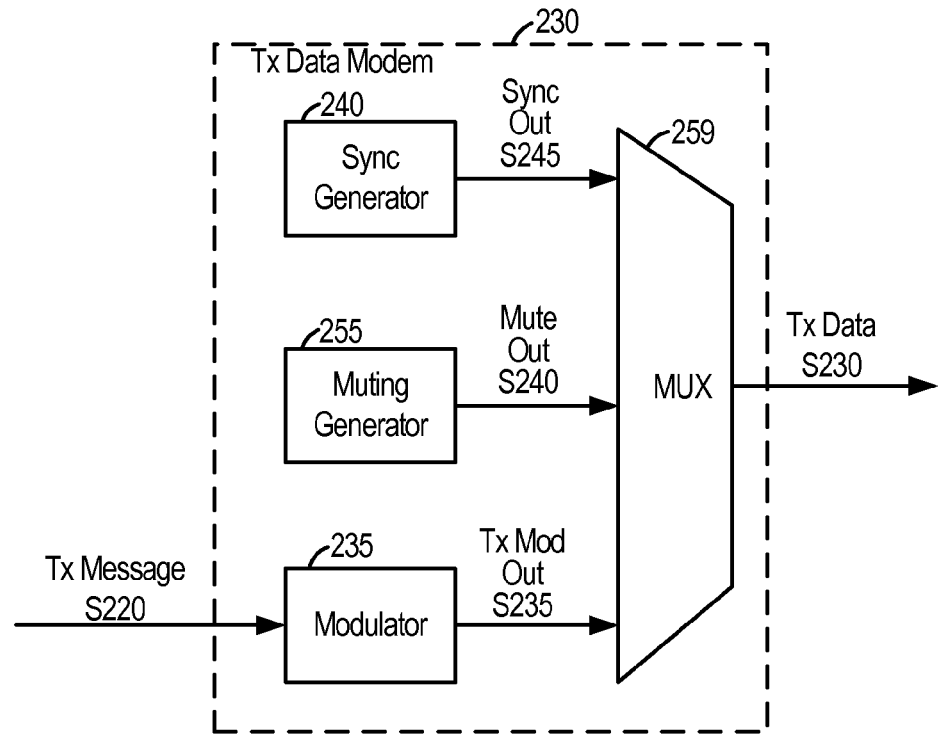
FIG. 2 is a diagram of an embodiment of a transmit data modem used in an in-band communication system.

FIG. 2 is a suitable example block diagram of the Tx data modem 230 shown in FIG. 1B. Three signals may be multiplexed in time through mux 259 onto the Tx data S230 output signal; Sync Out S245, Mute Out S240, and Tx Mod Out S235. It should be recognized that different orders and combinations of signals Sync Out S245, Mute Out S240, and Tx Mod Out S235 may be output onto Tx data S230. For example, Sync Out S245 may be sent prior to each Tx Mod Out S235 data segment. Or, Sync Out S245 may be sent once prior to a complete Tx Mod Out S235 with mute Out S240 sent between each Tx Mod Out S235 data segment.

Figure 3:
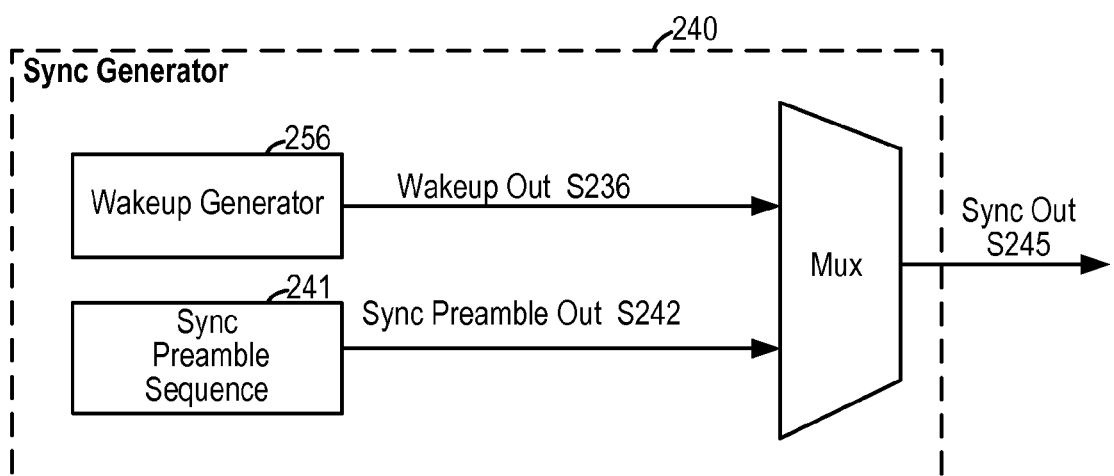
FIG. 3 is a diagram of an embodiment of a synchronization signal generator.

Sync Out S245 is a synchronization signal used to establish timing at the receiving terminal. Synchronization signals are required to establish timing for the transmitted in-band data since the data information is built in the pulse positions of the noise-like signal. FIG. 3 shows a suitable example block diagram of the Sync Generator 240 shown in FIG. 2. In a suitable example, FIG. 3 shows a Sync Generator 240 comprised of Wakeup Out S236 and Sync Preamble Out S242 multiplexed in time where Wakeup Out S236 may be sent prior to each Sync Preamble Out S242.

Sync Preamble Out S242 may be used to establish fine (sample based) timing at the receiver and is comprised of a predetermined data pattern known at the receiver. A suitable example of a Sync Preamble Out S242 predetermined data pattern is Sync Preamble Sequence 241 shown in FIG. 4A. The composite preamble sequence 245 is generated by concatenating several periods of a pseudorandom noise (PN) sequence 242 with an overlapped and added result of the PN sequence 242 and an inverted version of the PN sequence 244. The '+' symbols in the composite preamble sequence 245 may represent binary data +1 and the '−' symbols represent binary data −1. In a suitable example, the overlap and add of a '+' symbol with another '+' symbol yields a '+' symbol, and similarly the overlap and add of a '−' symbol with another '−' symbol yields a '−' symbol. Another suitable example inserts zero valued samples between the data bits of the PN sequence. This provides temporal distance between the data bits to account for "smearing" affects caused by the bandpass filter characteristics of the channel which tends to spread the energy of the data bit over several bit time intervals.

The previously described construction of the sync preamble using concatenated periods of a PN sequence with overlapped segments of inverted versions of the PN sequence provides advantages in reduced transmission time, improved correlation properties, and improved detection characteristics. The advantages result in a preamble which is robust to speech frame transmission errors.

By overlapping the PN segments, the resultant composite sync preamble consists of a smaller number of bits in the sequence compared to a non-overlapped version, thereby decreasing the total time required to transmit the composite preamble sequence 245.

To illustrate the improvements in the correlation properties of the overlapped sync preamble, FIG. 5A and FIG. 5B show a comparison between the correlation of PN sequence 242 with a non-overlapped composite preamble sequence 245*b*, shown in FIG. 4B and the correlation of PN sequence 242 with the overlapped composite sync preamble sequence 245, shown in FIG. 4A. FIG. 5A shows the main correlation peaks, both positive and negative, as well as the minor correlation peaks located between the main peaks for the non-overlapped composite sync preamble sequence 245*b*. The negative peak 1010 results from the correlation of the PN sequence 242 with the first inverted segment of the non-overlapped composite preamble sequence 245*b*. The positive correlation peaks 1011, 1012, 1013, result from the correlation of the PN sequence 242 with the three concatenated segments of PN sequence 242 which make up the middle section of the non-overlapped composite preamble sequence 245*b*. The negative peak 1014 results from the correlation of the PN sequence 242 with the second inverted segment of the non-overlapped composite preamble sequence 245*b*. In FIG. 5A, the minor correlation peak 1015, corresponding to an offset of 3 samples from the first positive correlation peak 1011, shows a magnitude of approximately 5 (⅓rd the magnitude of the main peaks). FIG. 5B shows several main correlation peaks, both positive and negative, as well as the minor correlation peaks between the main peaks for the overlapped composite sync preamble sequence 245. In FIG. 5B, the minor correlation peak 1016, corresponding to an offset of 3 samples from the first positive correlation peak 1011, shows a magnitude of approximately 3 (⅕th the magnitude of the main peaks). The smaller magnitude of the minor correlation peak 1016 for the overlapped preamble shown in FIG. 5B results in less false detections of the preamble main correlation peaks when compared to the non-overlapped minor peak 1015 example shown in FIG. 5A.

As shown in FIG. 5B, five major peaks are generated when correlating PN sequence 242 with the composite sync preamble sequence 245. The pattern shown (1 negative peak, 3 positive peaks, and 1 negative peak) allows for determining the frame timing based on any 3 detected peaks and the corresponding temporal distances between the peaks. The combination of 3 detected peaks with the corresponding temporal distance is always unique. A similar depiction of the correlation peak pattern is shown in Table 1, where the correlation peaks are referenced by a '−' for a negative peak and a '+' for a positive peak. The technique of using a unique correlation peak pattern is advantageous for in-band systems since the unique pattern compensates for possible speech frame losses, for example, due to poor channel conditions. Losing a speech frame may result in losing a correlation peak as well. By having a unique pattern of correlation peaks separated by predetermined temporal distances, a receiver can reliably detect the sync preamble even with lost speech frames which result in lost correlation peaks. Several examples are shown in Table 2 for the combinations of 3 detected peaks in the pattern (2 peaks are lost in each example). Each entry in Table 2, represents a unique pattern of peaks and temporal distances between the peaks. Example 1 in Table 2 shows detected peaks 3, 4, and 5 (peaks 1 and 2 were lost), resulting in the pattern '+ + −' with one predetermined distance between each peak. Examples 2 and 3 in Table 2 also show the pattern '+ + −', however the distances are different. Example 2 has two predetermined distances between detected peak 2 and 4, while Example 3 has two predetermined distances between detected peak 3 and 5. So Examples 1, 2 and 3 each represent a unique pattern from which the frame timing may be derived. It should be recognized that the detected peaks may extend across frame boundaries, but that the unique patterns and predetermined distances still apply.

TABLE 1

|  | Correlation Peak Number | | | | |
|---|---|---|---|---|---|
|  | 1 | 2 | 3 | 4 | 5 |
| Correlation Peak Polarity | − | + | + | + | − |

TABLE 2

|  |  | Correlation Peak Number | | | | |
|---|---|---|---|---|---|---|
|  |  | 1 | 2 | 3 | 4 | 5 |
| Detected Correlation Peaks | Example 1 |  |  | + | + | − |
|  | Example 2 |  | + |  | + | − |
|  | Example 3 |  | + | + |  | − |
|  | Example 4 |  | + | + | + |  |
|  | Example 5 | − |  |  | + |  |
|  | Example 6 | − |  | + |  |  |
|  | Example 7 | − |  |  | + | + |
|  | Example 8 | − | + |  |  | − |
|  | Example 9 | − | + |  | + |  |
|  | Example 10 | − | + | + |  |  |

One skilled in the art will recognize that a different preamble sequence resulting in a different correlation peak pattern to that shown in FIG. 5B and Table 1 may be used. One skilled in the art will also recognize that multiple correlation peak patterns may be used to identify different operational modes or transmit information bits. An example of an alternate correlation peak pattern is shown in Table 3. The correlation peak pattern shown in Table 3 maintains a unique pattern from which the frame timing may be derived, as described previously. Having multiple correlation peak patterns is advantageous for identifying different transmitter configurations at the receiver, such as message formats, message types, or modulation schemes.

TABLE 3

|  | Correlation Peak Number | | | | |
|---|---|---|---|---|---|
|  | 1 | 2 | 3 | 4 | 5 |
| Correlation Peak Polarity | + | − | − | − | + |

Referring again to FIG. 3, Wakeup Out S236 may be used to trigger the vocoder encoder 270 to wake up from a sleep state, low transmission rate state, or discontinuous transmission state. Wakeup Out S236 may also be used to prohibit the vocoder encoder 270 from entering the sleep, low transmission, or discontinuous transmission state. Wakeup Out S236 is generated by Wakeup Generator 256. Wakeup signals are advantageous when transmitting in-band data through vocoders which implement sleep, discontinuous transmit functions (DTX), or operate at a lower transmission rate during inactive voice segments to minimize the startup delay which may occur in transitioning from the voice inactive state to the voice active state. Wakeup signals may also be used to identify a characteristic of the transmission mode; for example, the type of modulation scheme employed. A first example of a suitable Wakeup Out S236 signal is a single sinusoidal signal of constant frequency in the voice band, such as 395 Hz. In this first example, the Wakeup signal prohibits the vocoder encoder 270 from entering the sleep, DTX, or low rate state. In this first example, the receiver ignores the transmitted Wakeup Out signal 5236. A second example of a suitable Wakeup Out S236 is a signal comprised of multiple sinusoidal signals with each signal identifying a specific data modulation scheme, for example 500 Hz for modulation scheme 1 and 800 Hz for modulation scheme 2. In this second example, the Wakeup signal prohibits the vocoder encoder 270 from entering the sleep, DTX, or low rate state. In this second example, the receiver uses the transmitted Wakeup Out signal S236 to identify the data modulation scheme.

An example of a composite Sync Out S245 signal is one comprised of a multiplexed Wakeup Out S236 and Sync Preamble Out S242 as shown in FIG. 6. Twu 711 and Tsp 702 represent the durations in time each signal is transmitted. An example of a suitable range for Twu is 10-60 milliseconds and Tsp is 40-200 milliseconds.

Referring back to FIG. 2, a suitable example of Tx Mod Out S235 is a signal generated by the Modulator 235 using pulse-position modulation (PPM) with special modulation pulses. This modulation technique results in low distortion when encoded and decoded by different types of vocoders. Additionally, this technique results in good autocorrelation properties and can be easily detected by a receiver matched to the waveform. Further, the pulses do not have a tonal structure; instead the signals appear noise-like in the frequency spectrum domain as well as retain a noise-like audible characteristic.

Referring again to FIG. 2, Mute Out S240 is a signal which may be used to separate the Tx message transmissions and is generated by the Muting Generator 255. An example of a suitable composite Tx Data S230 signal comprised of a multiplexed Tx Mod Out S235 and Mute Out S240 is shown in FIG. 7. Tmu1 731, Td1 732, Tmu2 733, Td2 734, Tmu3 735, Td3 736, and Tmu4 737 represent the durations in time each signal is transmitted. An example of a suitable range for Tmu1, Tmu2, Tmu3, and Tmu4 is 10-60 milliseconds and Td1, Td2, and Td3 is 300-320 milliseconds for normal operation and 600-640 milliseconds for robust operation. Examples of a suitable muting generator sequence may be an all-zero sequence signal or a sinusoidal frequency signal. Another suitable example of a signal used to separate the Tx message transmissions is shown in FIG. 8. In this example, the Wakeup Out S236 signal and Sync Preamble Out S242 precede each transmission of Tx Mod Out S235. One skilled in the art will recognize that different combinations of the Sync Preamble Out S242, Mute Out S240, and Tx Mod Out S235 may be equally applied. For example Tx Mod Out S235 in FIG. 8 may be preceded and followed by Mute Out S240.

Receiver

Referring to FIG. 1A, the receive baseband 400 normally routes decoded voice packets from the vocoder to an audio processor, but is also capable of routing the decoded packets through a data demodulator. If the non-speech data was converted to a noise-like signal and encoded by the vocoder at the transmitter as described herein, the receiver's vocoder is able to effectively decode the data with minimal distortion. The decoded packets are continually monitored for an in-band synchronization signal. If a synchronization signal is found, the frame timing is recovered and the decoded packet data is routed to a data demodulator. The decoded packet data is demodulated into messages. The messages are deformatted and output. A protocol sequence comprising synchronization, control, and messages ensures reliable detection and demodulation of the non-speech data.

Referring to FIG. 1B, voice packets are received over the communication channel 502 in the receiver 495 and input to the vocoder decoder 390 where decoded voice is generated then routed through the de-mux 320 to the audio out processor and speaker 315 generating output audio S310.

Once a synchronization signal is detected in Vocoder Decoder Output S370 by the Sync Detector 350, the Rx De-Mux Control S360 signal switches to the Rx data path in the Rx De-Mux 320. The vocoder packets are decoded by the vocoder decoder 390 and routed by the Rx De-Mux 320 to the Rx Timing 380 then the Rx data modem 330. The Rx data is demodulated by the Rx data modem 330 and forwarded to the data message deformatter 301 where output data S300 is made available to the user or interfaced equipment.

An example of a suitable data message deformatter 301 includes circuitry to deinterleave the Rx Message S320 data, implement error control decoding such as hybrid automatic repeat-request (HARQ), and calculate and check the cyclic redundancy check (CRC) bits. Suitable output data S300 may include user interface (UI) information, user position/location information, time stamps, equipment sensor information, or other suitable data.

Figure 9:
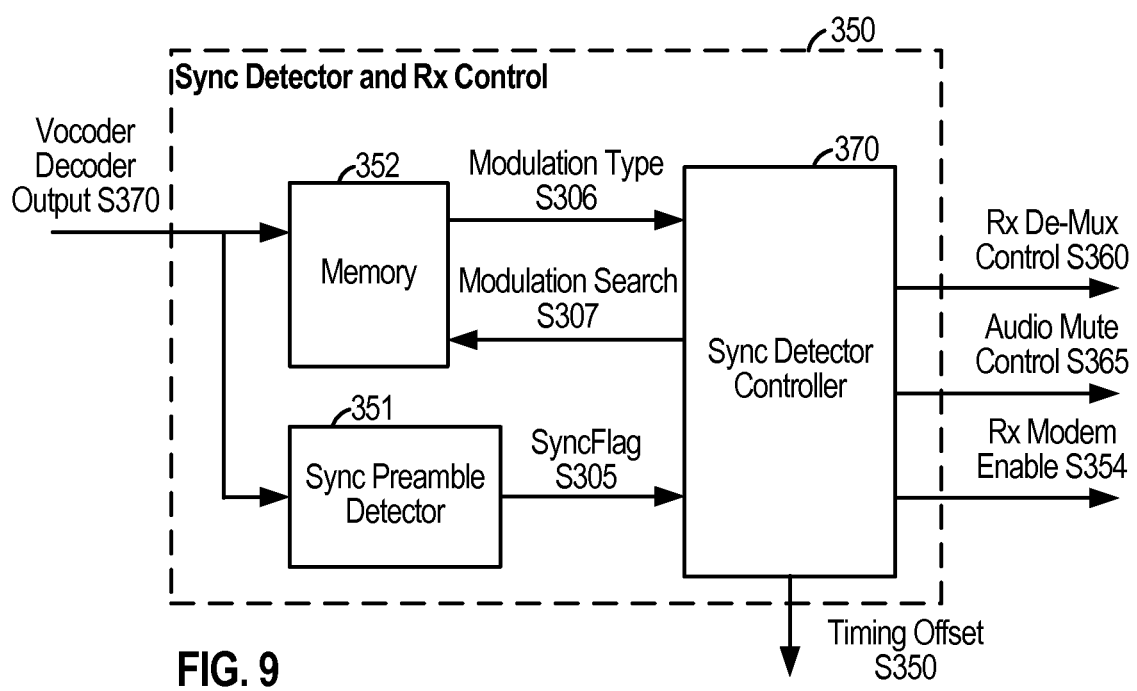
FIG. 9 is a diagram of an embodiment of a synchronization signal detector and receiver controller.

An example of a suitable Sync Detector 350 is shown in FIG. 9. Signal Vocoder Decoder Output S370 is input to a Memory 352 and a Sync Preamble Detector 351. The Memory 352 is used to store the latest Vocoder Decoder Output S370 samples which may include the received Wakeup Out signal. A suitable example of the Memory 352 is a First-In-First-Out (FIFO) or Random Access Memory (RAM). The Sync Preamble Detector 351 detects the transmitted Sync Preamble Out signal in the Vocoder Decoder Output S370 and outputs the SyncFlag S305 signal. Signals Modulation Type S306 and SyncFlag S305 are input to the Sync Detector Controller 370. The Sync Detector Controller 370 generates the Modulation Search S307 signal which may be used to access the Memory 352, find the received Wakeup Out signal based on the Timing Offset S350, and evaluate the Wakeup Out Signal to determine the type of modulation used in the transmission. The resulting detected modulation type may be output from the Memory 352 as Modulation Type S306. The Sync Detector Controller 370 also generates output signals Rx De-Mux Control S360 which controls routing of the Vocoder Decoder Output S370 to the data path or the audio path, Audio Mute Control S365 which enables or disables the output audio signal S310, and Timing Offset S350 which provides bit timing information to Rx Timing 380 to align the Rx Data S326 for demodulation.

Figure 10:
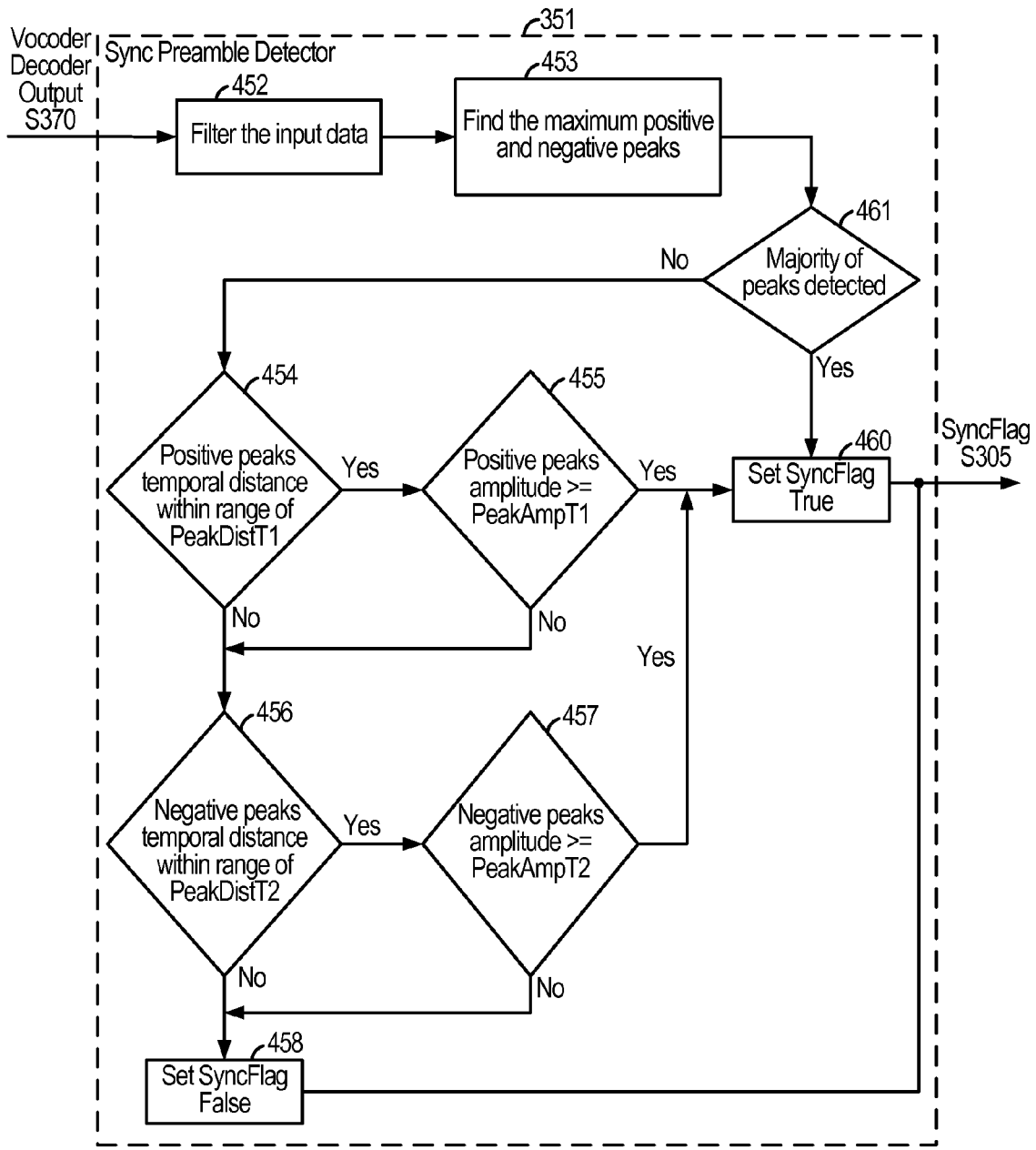
FIG. 10 is a flowchart of an embodiment of a synchronization preamble detector.

An example of a suitable Sync Preamble Detector 351 is shown in FIG. 10. Signal Vocoder Decoder Output S370 is processed by the filter in step 452. A suitable example of the filter in step 452 is a sparse filter with coefficients based on the band-pass filtered impulse response of the Sync Preamble Sequence. A sparse filter has a finite-impulse-response structure with some of the coefficients set to zero and results in a reduction in the computational complexity based on fewer required multipliers due to the zero coefficients. Sparse filters are well known in the art. In step 453 the filter output is searched for the maximum positive and negative correlation peaks which match an expected pattern based on the negative and positive correlation peak distance. For example, 5 peaks should be found in step 453 based on Sync Preamble Sequence 245, 3 positive peaks corresponding to correlation with the pseudorandom noise (PN) sequence 243 and 2 negative peaks corresponding to correlation with the inverted version of the PN sequence 244. In step 461, the number of peaks detected is counted and if a majority of peaks is detected, then a sync indicator flag is set True in step 460, indicating the preamble sync has been detected. A suitable example of a majority of peaks detected is 4 out of 5 peaks which match the expected pattern. If a majority of peaks is not detected then control passes to step 454, where the temporal distance between the positive peaks found in step 453 is compared against the expected distance, PeakDistT1. The PeakDistT1 is set to be a function of the period of the PN sequence 242 since filtering the received preamble against PN sequence 242 should yield a temporal distance between the correlation peaks which is equal to some multiple of the period. If the temporal distance between the positive peaks is found to be within a range of PeakDistT1, the positive peaks amplitudes are then checked against a threshold PeakAmpT1 in step 455. A suitable range for PeakDistT1 is plus or minus 2 samples. The PeakAmpT1 is a function of the amplitudes of the previous peaks found. In a suitable example, the PeakAmpT1 is set such that the peaks found in step 453 do not differ in amplitude by more than a factor of 3 and the average peak amplitude does not exceed half the maximum peak amplitude observed up to that point. If either the positive peak temporal distance check in step 454 or the amplitude check in step 455 fails then the negative peak temporal distance is checked in step 456. If the negative peak temporal distance is within a range of PeakDistT2 then the negative peak amplitudes are checked against a threshold PeakAmpT2 in step 457. A suitable range for PeakDistT2 is plus or minus 2 samples. PeakDistT2 is set to be a function of the period of the PN sequence 242 and the PeakAmpT2 is set to be a function of the amplitudes of the previous peaks found. If either the positive peak temporal distance check in step 454 and the positive peak amplitude check in step 455 or the negative peak temporal distance check in step 456 and the negative peak amplitude check in step 457 pass then a sync indicator flag is set True in step 460, indicating the preamble sync has been detected. If either the negative peak temporal distance check in step 456 or negative peak amplitude check in step 457 fails then the sync indicator flag is set False in step 458, indicating the preamble sync has not been detected. It should be recognized that different orders and combinations of the steps will achieve the same result. For example, detecting the majority of peaks in step 461 may be done after the positive peak check of steps 454 and 455.

System

The communication between the Source Terminal 100 and Destination Terminal 600 may be accomplished by implementing a protocol stack within each terminal. Protocol stacks serve to partition functional elements or to separate higher layers (such as a software application) from lower layers (such as a modem).

Figure 11:
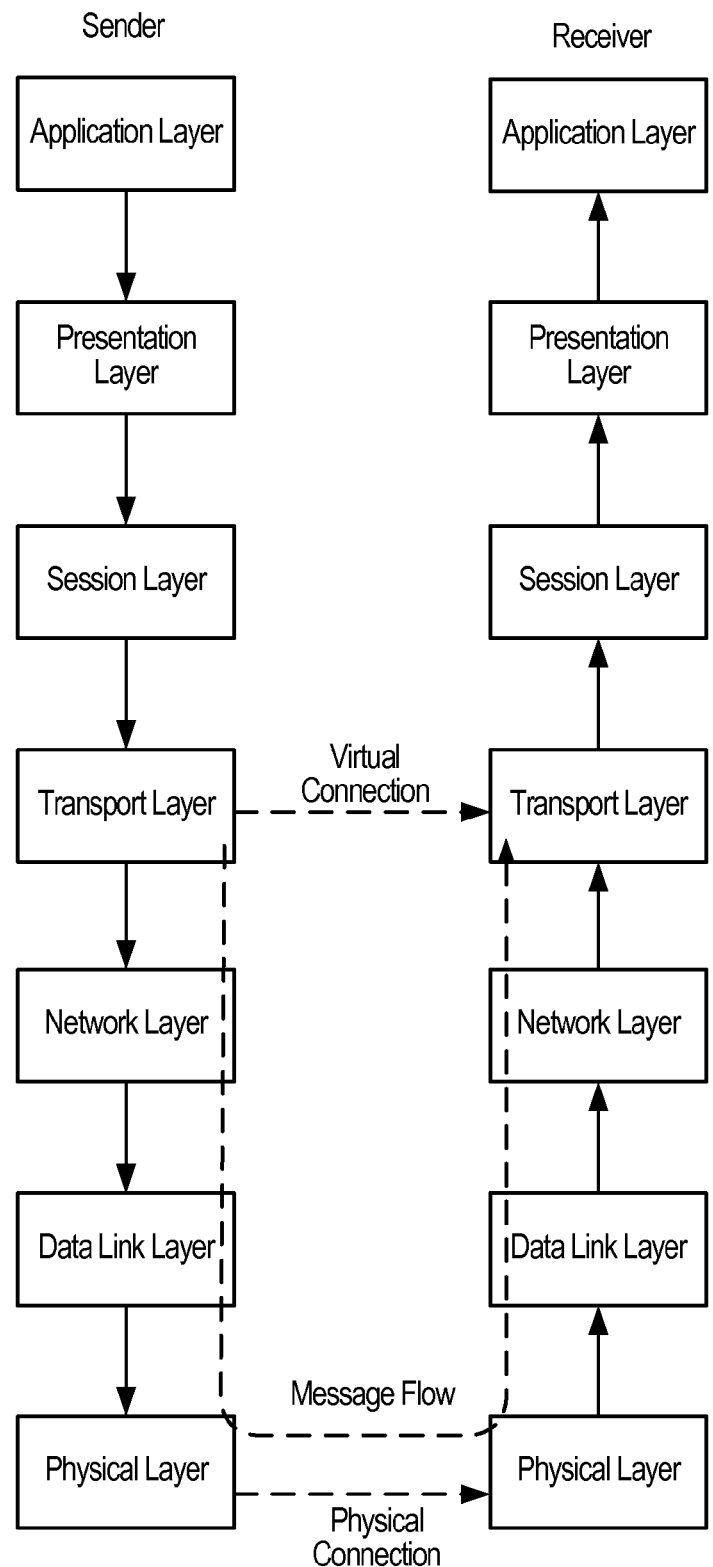
FIG. 11 is a diagram of the Open System Interconnection (OSI) reference model.

FIG. 11 shows a block diagram of the well known Open System Interconnection (OSI) reference model. The model shows the protocol stack; that is, the interconnection between the various layers for an individual Sender and Receiver as well as the physical connection and an example virtual connection between the Sender and Receiver. In the OSI model, an individual layer can support communication only to layers immediately above and below it. The actual (physical) connection between the Sender and Receiver is provided by the Physical Layer, while another higher layer may maintain a virtual connection by flowing messages through the lower layers. For example, a Sender Transport Layer message is sent to the Receiver Transport layer via the Sender Network, Data Link, and Physical Layers, across to the Receiver Physical Layer then up the Receiver Data Link, Network and Transport layers.

Figure 12A:
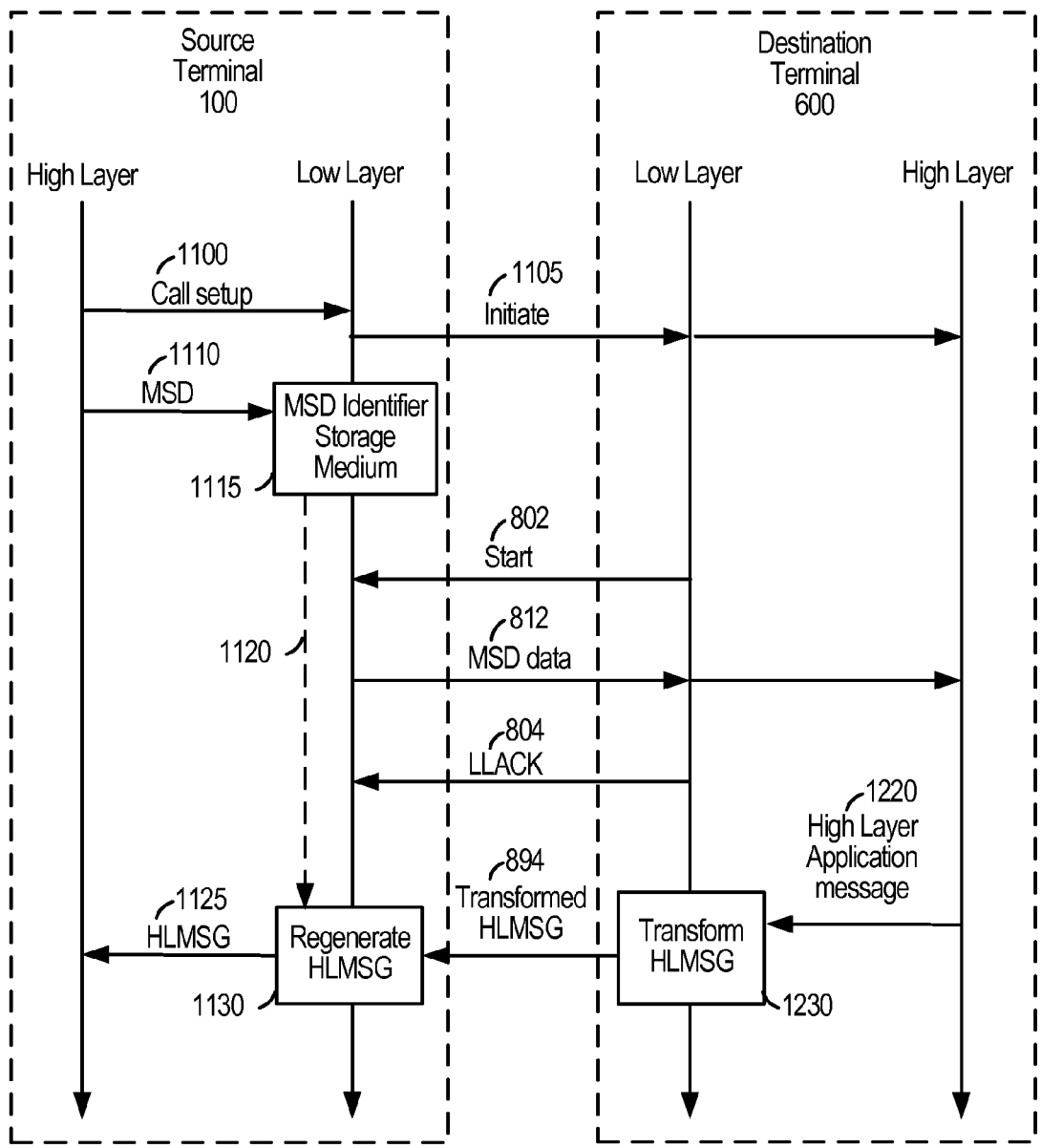
FIG. 12A is a diagram of an embodiment of the communication and message passing between a Source and Destination Terminal where the communication link is initiated by the Source Terminal and the data transfer link is initiated by the Destination Terminal.

FIG. 12A is an example interaction diagram of the communication and message passing between the Source Terminal 100 and the Destination Terminal 600, wherein the Source Terminal 100 and the Destination Terminal 600 protocol stack is comprised of a high layer and a low layer. In this example, the communication link is initiated by the Source Terminal 100 and the data transfer link is initiated by the Destination Terminal 600. A suitable example of a communication link is one which is defined by one of the standards organizations listed herein which incorporates a voice service option; that is, a vocoder. An element, for example a software application, in the Source Terminal 100 high layer sends a Call Setup 1100 message to an element, for example a modem, in the low layer. The Source Terminal 100 low layer initiates establishment of the communication link to the Destination Terminal 600 by sending an Initiate 1105 message. The Initiate 1105 message is received by the Destination Terminal 600 and the communication link is established per the recommendations described in the communication standard specifications listed herein. The high layer in the Source Terminal 100 sends the data to be transmitted to the low layer. A suitable example of data may include a minimum set of data or "MSD" message as described in an emergency telematics system such as eCall. The Source Terminal 100 low layer stores an identifier associated with the MSD in a local storage medium 1115. In a suitable example system, a single acknowledgement is sent by the Destination Terminal 600 low layer for each MSD message received; that is, a new MSD will not be sent by the Source Terminal 100 until it receives at least a low layer acknowledgement message for the current MSD. If an MSD identifier is stored by Source Terminal 100 in a local storage medium 1115, then the Destination Terminal 600 would not be required to return the MSD identifier in the low layer acknowledgement message since the identifier would already be accessible to the Source Terminal 100 low layer from the local storage medium 1115. Eliminating the need to transmit the MSD identifier in an acknowledgement message results in an advantageous bandwidth savings. The transfer of the MSD message is initiated by the Destination Terminal 600 low layer with the transmission of a Start 802 message to the Source Terminal 100. The Source Terminal 100 low layer responds to the received Start 802 message by sending the MSD message data 812. The Destination Terminal 600 low layer responds to the received MSD data 812 by verifying correct reception of the MSD, forwarding the MSD to the high layer, and sending a low layer acknowledgement (LLACK) signal comprised of a first synchronization sequence and an LLACK message. The Destination Terminal 600 low layer sends the LLACK 804 to the Source Terminal 100 in order to establish a first level of acknowledgement between the Source Terminal 100 and the Destination Terminal 600 low layers. The Destination Terminal 600 high layer may send a high layer application message 1220 to the low layer in response to the received MSD where it is transformed in the low layer by a Transform HLMSG 1230 element. The resultant Transformed HLMSG 894 is sent to the Source Terminal 100 preceded by a second synchronization sequence which is different from the first synchronization sequence sent with the LLACK. The Source Terminal 100 receives and identifies the Transformed HLMSG 894 by detecting the second synchronization sequence assigned to the Transformed HLMSG 894. The low layer retrieves the MSD identifier 1120 from the local storage medium 1115 then regenerates the HLMSG from the stored MSD identifier 1120 and the received Transformed HLMSG 894 and forwards the regenerated HLMSG 1125 to the high layer. The regenerated HLMSG 1125 establishes a second level of communication between the Source Terminal 100 and the Destination Terminal 600 high layers. In this example, the Destination Terminal 600 HLMSG 1220 message and the Source Terminal 100 regenerated HLMSG 1125 message are equivalent. In a suitable example, the HLMSG is comprised of a high layer acknowledgement message (HLACK). One skilled in the art will recognize that the interactions between the Source Terminal 100 and the Destination Terminal 600 may occur in a different order. For example, the Start 802 message may occur prior to the storage of the MSD identifier.

Figure 13:
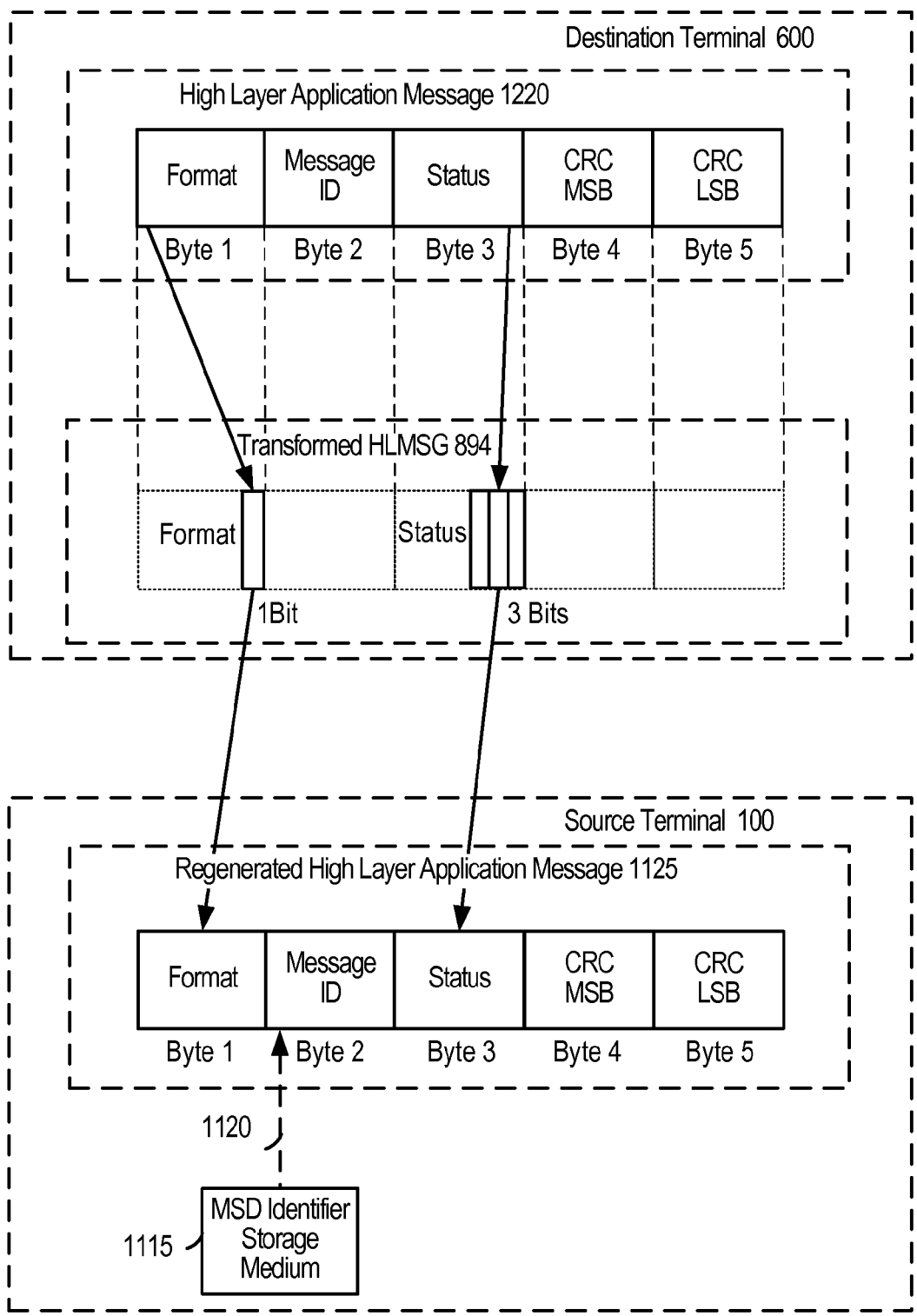
FIG. 13 is a diagram of an embodiment of a transformation and regeneration of a high layer application message between a Destination Terminal and a Source Terminal.

The Transform HLMSG 1230 element may modify the parameters in the high layer HLMSG 1220 message, reduce the number of parameters sent, or compress the parameters themselves. FIG. 13 is a diagram of an example transformation and regeneration of the HLMSG message between the Destination Terminal 600 and the Source Terminal 100. In this example, the Destination Terminal 600 HLMSG 1220 message is comprised of a format field, a message ID, a status field, and a CRC calculated over the format, message ID and status fields. The Transform HLMSG 1230 element may reduce the format field from 1 byte to 1 bit and the status field from 1 byte to 3 bits. The resultant Transformed HLMSG 894 is sent to the Source Terminal 100. The Source Terminal 100 regenerates the HLMSG 1125 message from the received Transformed HLMSG 894 format and status bits and the locally stored MSD 1120. The CRC in the regenerated HLACK 1125 message may be recalculated at the Source Terminal 100 low layer from the regenerated format, message ID, and status fields. One skilled in the art will recognize that the format and/or status fields may not be reduced as is described in the example herein, or that only a status field may be sent if, for example, the message formats are fixed between the Source Terminal 100 and Destination Terminal 600 low layers resulting in no need to specifically identify the message formats with a format field.

Figure 12B:
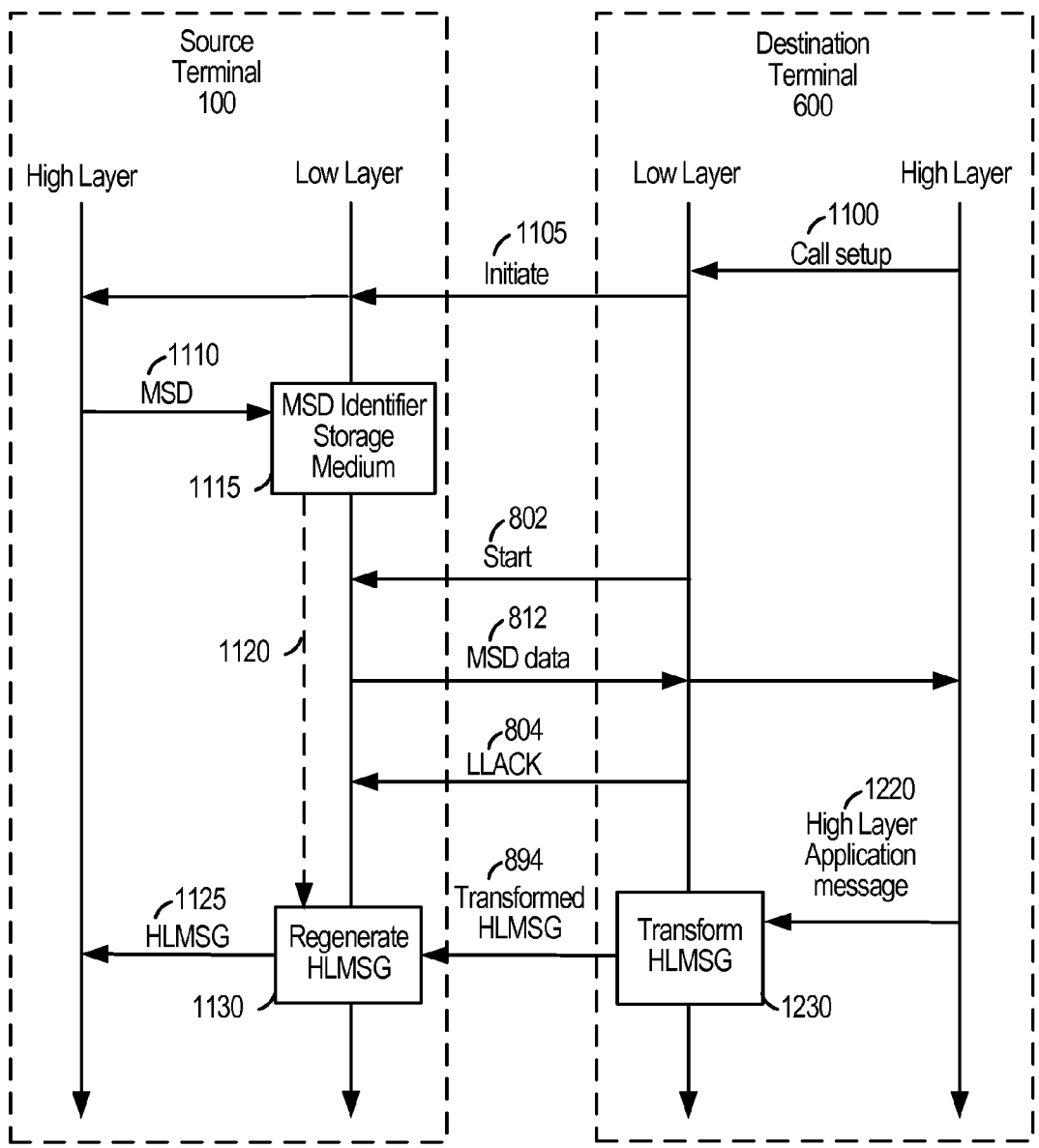
FIG. 12B is a diagram of an embodiment of the communication and message passing between a Source and Destination Terminal where the communication link is initiated by the Destination Terminal and the data transfer link is initiated by the Destination Terminal.

FIG. 12B is an example interaction diagram of the communication and message passing between the Source Terminal 100 and the Destination Terminal 600, wherein the communication link is initiated by the Destination Terminal 600 and the data transfer link is initiated by the Destination Terminal 600. The interactions are similar to those described for FIG. 12A except that an element in the Destination Terminal 600 high layer sends a Call Setup 1100 message to an element in the low layer. The Destination Terminal 600 low layer initiates establishment of the communication link to the Source Terminal 100 by sending an Initiate 1105 message.

Figure 12C:
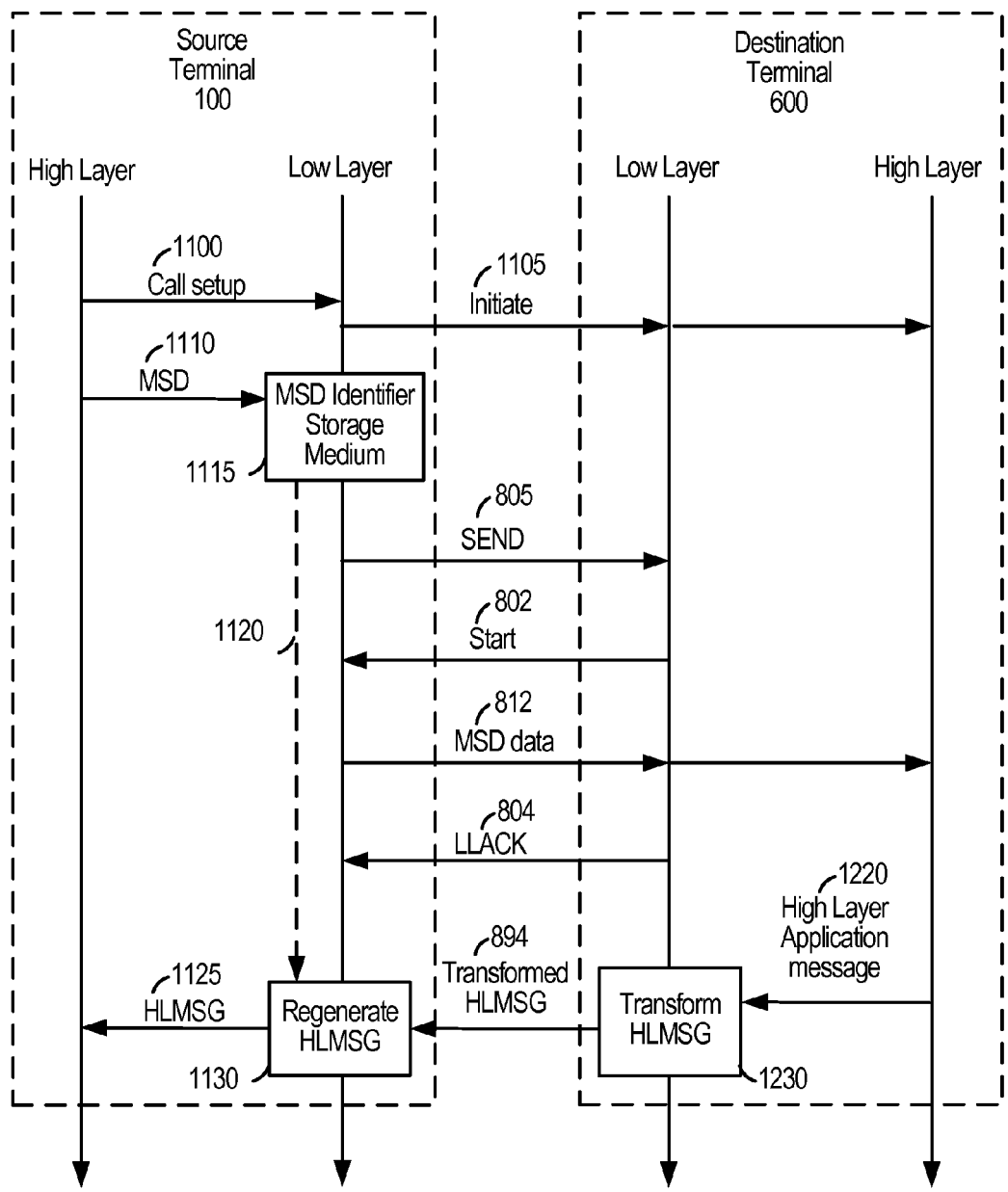
FIG. 12C is a diagram of an embodiment of the communication and message passing between a Source and Destination Terminal where the communication link is initiated by the Source Terminal and the data transfer link is initiated by the Source Terminal.

FIG. 12C is an example interaction diagram of the communication and message passing between the Source Terminal 100 and the Destination Terminal 600, wherein the communication link is initiated by the Source Terminal 100 and the data transfer link is initiated by the Source Terminal 100. The interactions are similar to those described for FIG. 12A except that the Source Terminal 100 initiates the data transfer link. The Source Terminal 100 high layer sends the MSD message to the low layer and an MSD identifier is stored in a local storage medium 1115. The Source Terminal 100 low layer initiates the MSD transfer by sending a SEND 805 message to the Destination Terminal 600. The Destination Terminal 600 responds to the SEND 805 message by sending the Start 802 message and the subsequent interactions occur as described for FIG. 12A.

Figure 12D:
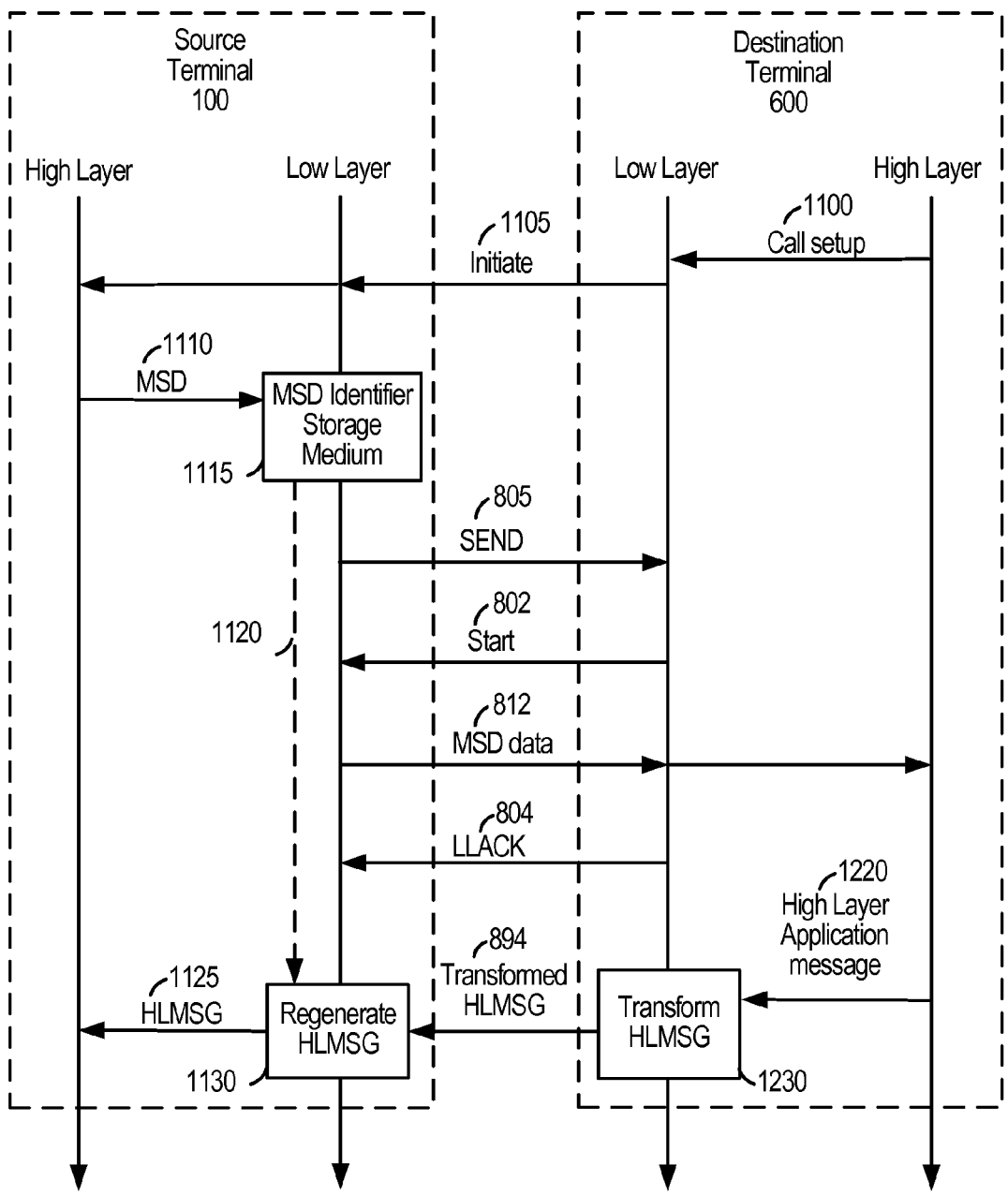
FIG. 12D is a diagram of an embodiment of the communication and message passing between a Source and Destination Terminal where the communication link is initiated by the Destination Terminal and the data transfer link is initiated by the Source Terminal.

FIG. 12D is an example interaction diagram of the communication and message passing between the Source Terminal 100 and the Destination Terminal 600, wherein the communication link is initiated by the Destination Terminal 600 and the data transfer link is initiated by the Source Terminal 100. The interactions are similar to those described for FIG. 12A except that the communication link is initiated as described for FIG. 12B and the data transfer link is initiated as described for FIG. 12C.

Figure 16A:
FIG. 16A is a diagram of a second embodiment of a synchronization preamble sequence.
Figure 16B:
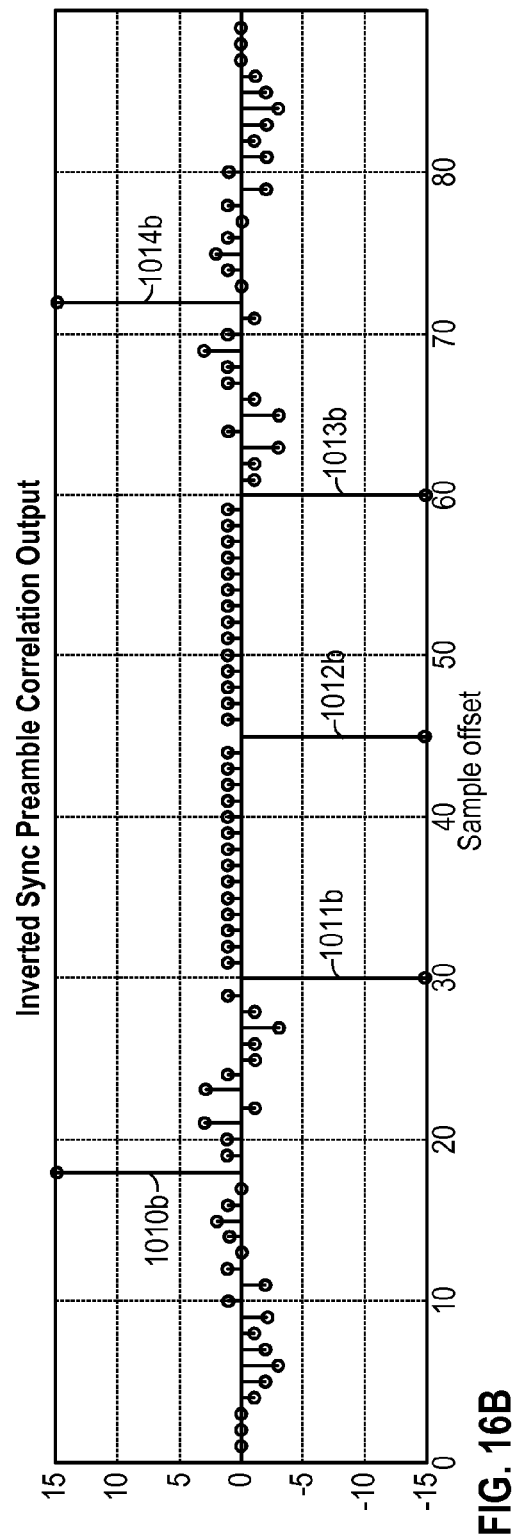
FIG. 16B is a graph of the correlation output for a second embodiment of a synchronization preamble sequence.

In receiving the LLACK and HLMSG messages, the Source Terminal 100 must be able to distinguish the two messages so that the HLMSG can be forwarded to the high layer. A typical system may transmit additional identifier bits to distinguish the two messages. In an in-band modem where the available bandwidth is limited, a mechanism to identify the two messages without increasing the bandwidth requirements is desirable and advantageous. Unique synchronization signals may be assigned to each of the messages which allows the sync detector to discriminate between the LLACK and the HLMSG message. For the low layer acknowledgement (LLACK) message, a first synchronization signal may be sent. FIG. 4A shows a suitable example of a first synchronization signal 245. For the high layer message (HLMSG), a second synchronization signal may be sent. A suitable example of a second synchronization signal is shown in FIG. 16A. The sync detector described herein discriminates the polarity of the correlation peak pattern shown in FIG. 5A resulting from the first synchronization signal 245 from the polarity of the correlation peak pattern shown in FIG. 16B resulting from the second synchronization signal shown in FIG. 16A. The Source Terminal 100, is thus able to distinguish the LLACK message from the HLMSG message without the need for the Destination Terminal 600 to transmit additional acknowledgement identifier bits. Eliminating the need to transmit additional bits to identify lower layer from higher layer messages results in an advantageous bandwidth savings.

In some cases a data sample inversion may occur in the network resulting in inverted polarity in the received synchronization preamble and data messages. In the previous case described, sample data (e.g. the second synchronization signal) may be purposely inverted in order to expand the message space without expending extra bits to identify additional messages. In the purposely inverted case, a new set of messages is defined with the "negative polarity" synchronization such that a receiver could identify the polarity and thus determine whether the message data refers to a low layer message or a high layer message. The correlation peaks are detected as previously described. If network induced inversion of the data occurs, then a detection logic mechanism to determine whether the inversion was intentional is desirable. The detector 351 shown in FIG. 10 may be carried out twice, once assuming the positive correlation peak pattern show in FIG. 5B and another time assuming the negative correlation peak pattern shown in FIG. 16B. The first run of the decision logic returns the original sync detection result whereas the second run returns the detection result assuming the signal was inverted. The decision logic then determines whether the first or second detection result is valid. If the second detection result is chosen, the received data samples are inverted before they are input to the demodulator. In some cases, both runs of the synchronization detection logic may return successful synchronization events, for example, due to the band pass characteristics of the speech channel. Therefore, additional decision logic may be used to make the final detection decision. This additional decision is amplitude based and also takes into account how many peaks have been detected. In the downlink (e.g. from Destination terminal 600 to Source terminal 100), treatment of the data messages following the sync may be dependent on the detected polarity. If the sync is detected with positive polarity then the receiver prepares to receive a low layer message. If the sync is detected with negative polarity then the receiver prepares to receive either a high layer message if the sync is not the first received or the receiver prepares to invert the subsequent data if the sync is the first received, indicating a polarity inversion in the system. In the uplink (e.g. from Source terminal 100 to Destination terminal 600), the detection of a negative polarity sync may be an indication of an inverted data stream (i.e. it may not indicate a high layer message) only, or may be an indication of an inverted data stream or high layer message.

Assigning unique synchronization sequences as described previously may not only be applied to a single terminal (e.g. for the first and second synchronization sequences of a Destination transmission), but also may enable a more robust transmission of data between a Source and Destination terminal through different cellular networks (e.g. a Source terminal may use a first synchronization sequence and a Destination terminal may use a synchronization sequence which is different from the sequence used at the Source terminal). Most cellular networks incorporate echo cancellers in the voice signal path which attempt to remove unwanted signals typically comprised of reflected versions of a transmitted signal. An uplink signal may be reflected on the downlink due to an impedance mismatch at the physical connection between a mobile telephone switching office and a backhaul, wherein the connection may comprise a two-wire to four-wire interface conversion known in the art as a hybrid. Backhauls are well known in the art and comprise intermediate communication links between the core network and smaller subnetworks at or towards the edge of a system. For an in-band communication system, the uplink signal may be reflected back on the downlink due to the hybrid. An echo canceller located at the cellular base station attempts to correlate a Far-end signal (e.g. the uplink transmission) with a Near-end signal (e.g. the downlink transmission or alternatively the reflected uplink signal) to determine if an echo exists and subtracts the estimated echo using adaptive filter techniques, such as the well known Least Means Square (LMS) algorithm. The echo canceller may also use non-linear processing elements such as frequency domain spectral subtraction to further reduce the echo. An in-band system may use a synchronization signal that is similar (e.g. correlated) for both the uplink and downlink. In this case, the system may experience cropping (losing the beginning and/or end of a transmission), dropouts (losing a middle section of a transmission), or distortions in the signal due to the adaptive filter and non-linear processing in the echo canceller. In other words, if a received Far-end signal is similar (e.g. correlated) to the received Near-end signal, the echo canceller may determine that the Near-end signal is a reflected version of the Far-end signal and attempt to cancel it resulting in cropping, dropouts, or distortions in the Near-end signal. Further, most typical echo cancellers disable part of the processing during a state when both uplink and downlink contain appreciable signal (e.g. speech) activity, known in the art as doubletalk. A doubletalk condition typically results in a controller in the echo canceller freezing the processing of the non-linear element and/or the coefficients of the adaptive filter which may result in less signal cropping, dropouts, or distortions of the Near-end signal. Accordingly, it is advantageous to construct synchronization sequences for an uplink and downlink in an in-band system which are dissimilar to minimize correlation properties between the sequences and/or provoke a doubletalk condition in an echo canceller so that cropping, dropouts, or distortions in the downlink signal does not occur, yet still exhibits a structure which is detectable by the sync detector disclosed herein.

Figure 17A:
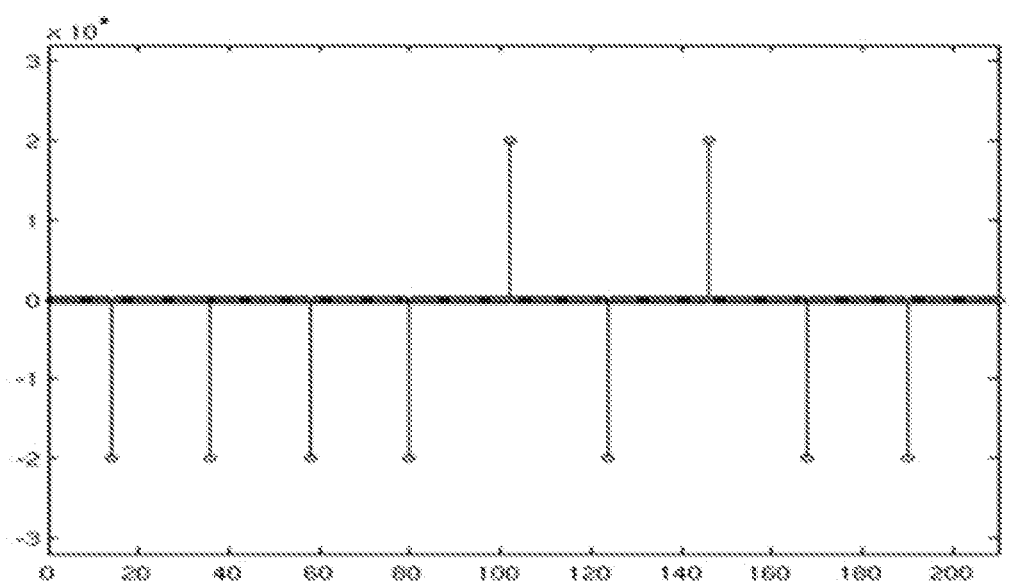
FIG. 17A is a graph of a segment of a synchronization preamble sequence, wherein zero samples are placed between non-zero pulse samples.
Figure 17B:
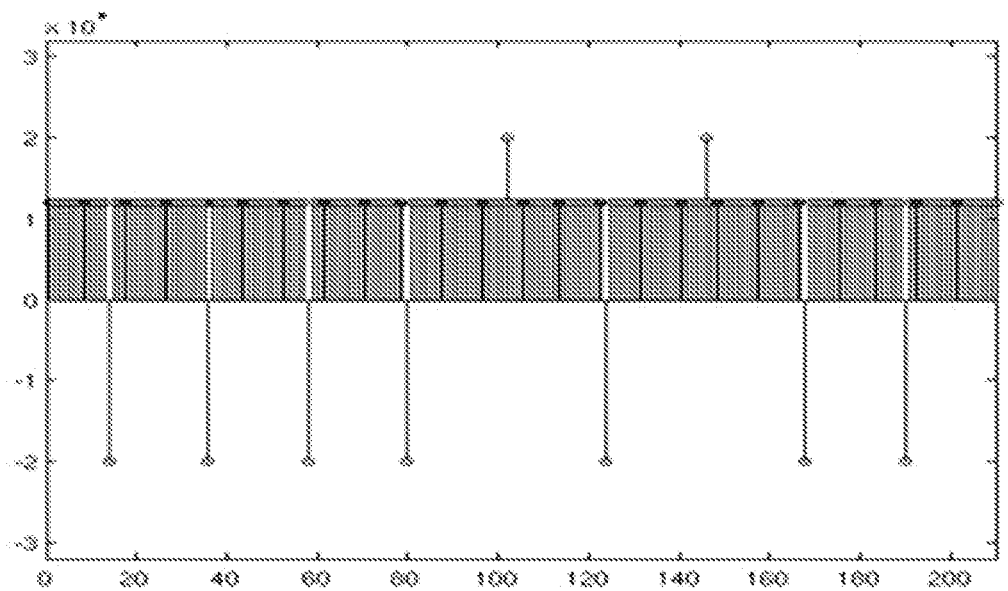
FIG. 17B is a graph of a segment of a synchronization preamble sequence, wherein the zero samples placed between the non-zero pulse samples are replaced with non-zero fixed amplitude samples.
Figure 17C:
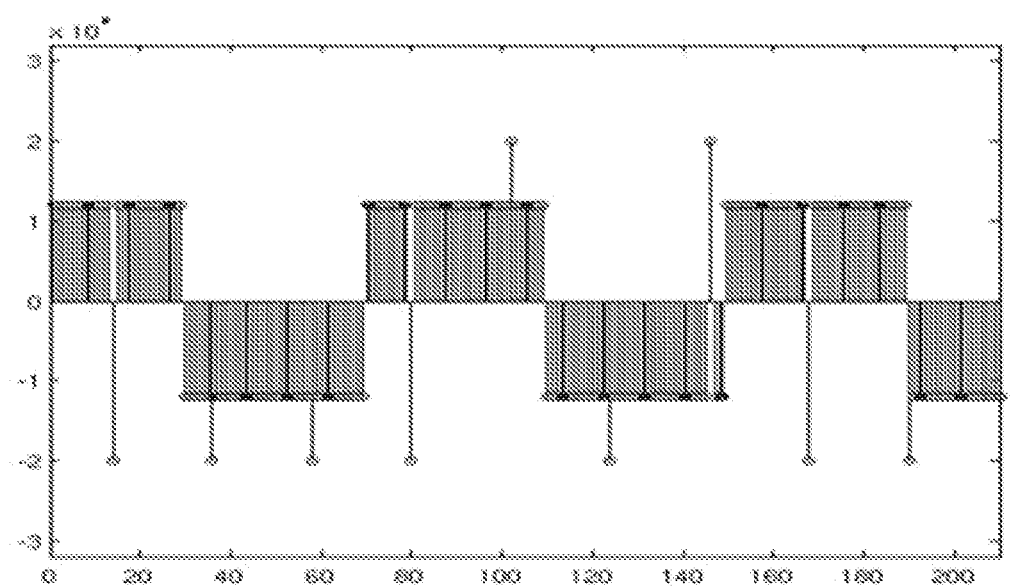
FIG. 17C is a graph of a segment of a synchronization preamble sequence, wherein the zero samples placed between the non-zero pulse samples are replaced with non-zero rectangular amplitude samples.
Figure 17D:
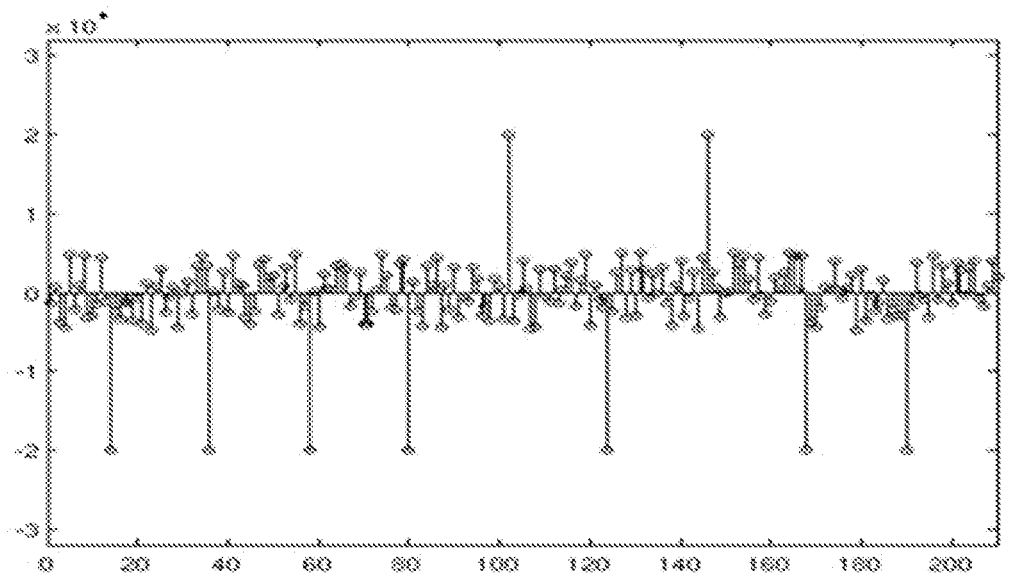
FIG. 17D is a graph of a segment of a synchronization preamble sequence, wherein the zero samples placed between the non-zero pulse samples are replaced with non-zero random noise-like amplitude samples.
Figure 17E:
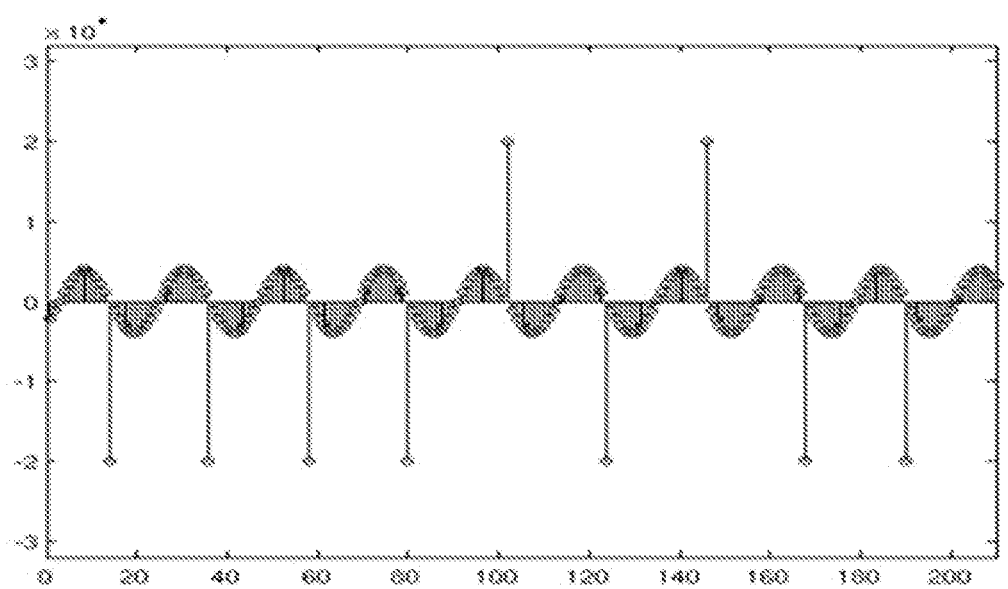
FIG. 17E is a graph of a segment of a synchronization preamble sequence, wherein the zero samples placed between the non-zero pulse samples are replaced with non-zero sinusoidal amplitude samples.
Figure 17F:
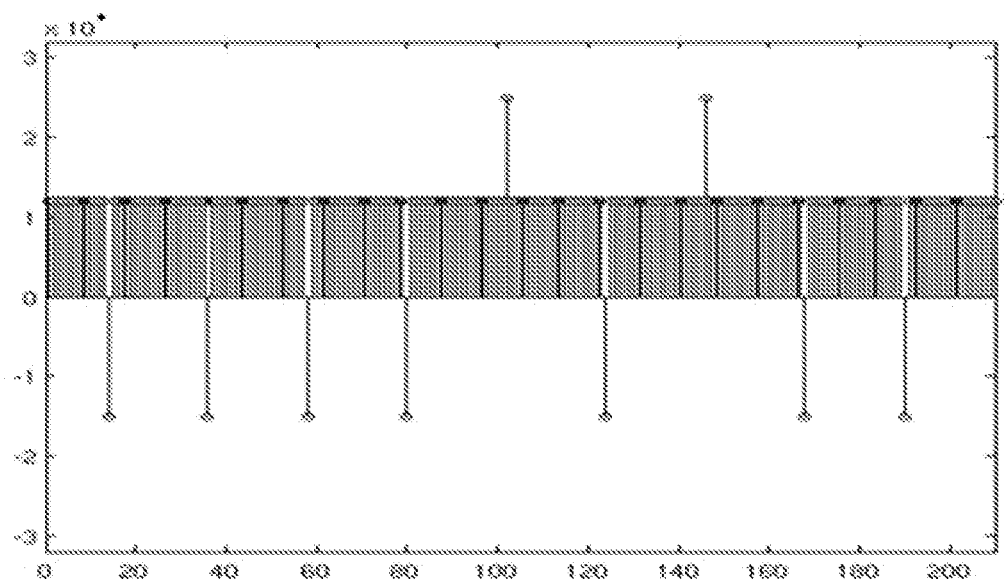
FIG. 17F is a graph of a segment of a synchronization preamble sequence, wherein the non-zero pulse samples are increased in amplitude and the zero samples are replaced with non-zero fixed amplitude samples.

Suitable examples of alternative synchronization sequences are shown in FIG. 17A, FIG. 17B, FIG. 17C, FIG. 17D, FIG. 17E, and FIG. 17F. A segment of the synchronization signal described in FIG. 4A is shown in FIG. 17A. In order to distinguish the synchronization sequences between the uplink and downlink, one of the synchronization sequences may be constructed such that the zero valued samples placed between the non-zero pulses are replaced by samples with non-zero values. The structure of the original synchronization sequence (i.e. the non-zero pulse sequence) is, however, left intact so that the sync detector described herein is still able to detect the signal. The replacing of zero samples with non-zero samples results in effectively adding more energy to the signal, and thereby reduces the correlation between the uplink and downlink synchronization signals such that an echo canceller will not erroneously identify the downlink signal as a reflected uplink signal. FIG. 17B shows a suitable example of a modified synchronization signal, wherein the zero valued samples are replaced by samples of fixed amplitude 12000. The actual fixed value of the amplitude may comprise a value different from 12000, but should not be too large in order for the original synchronization signal to remain observable, thus allowing the sync detector described herein to detect the sync signal. FIG. 17C shows another suitable example of a modified synchronization signal, wherein the zero valued samples are replaced by a rectangular signal. Again, different amplitudes may be chosen. FIG. 17D shows yet another suitable example of a modified synchronization signal, wherein the zero valued samples are replaced by a random noise-like signal. FIG. 17E shows yet another suitable example of a modified synchronization signal, wherein the zero valued samples are replaced by a sinusoidal signal. Finally, FIG. 17F shows yet another suitable example of a modified synchronization signal, wherein the pulses are also increased in amplitude.

Figure 14A:
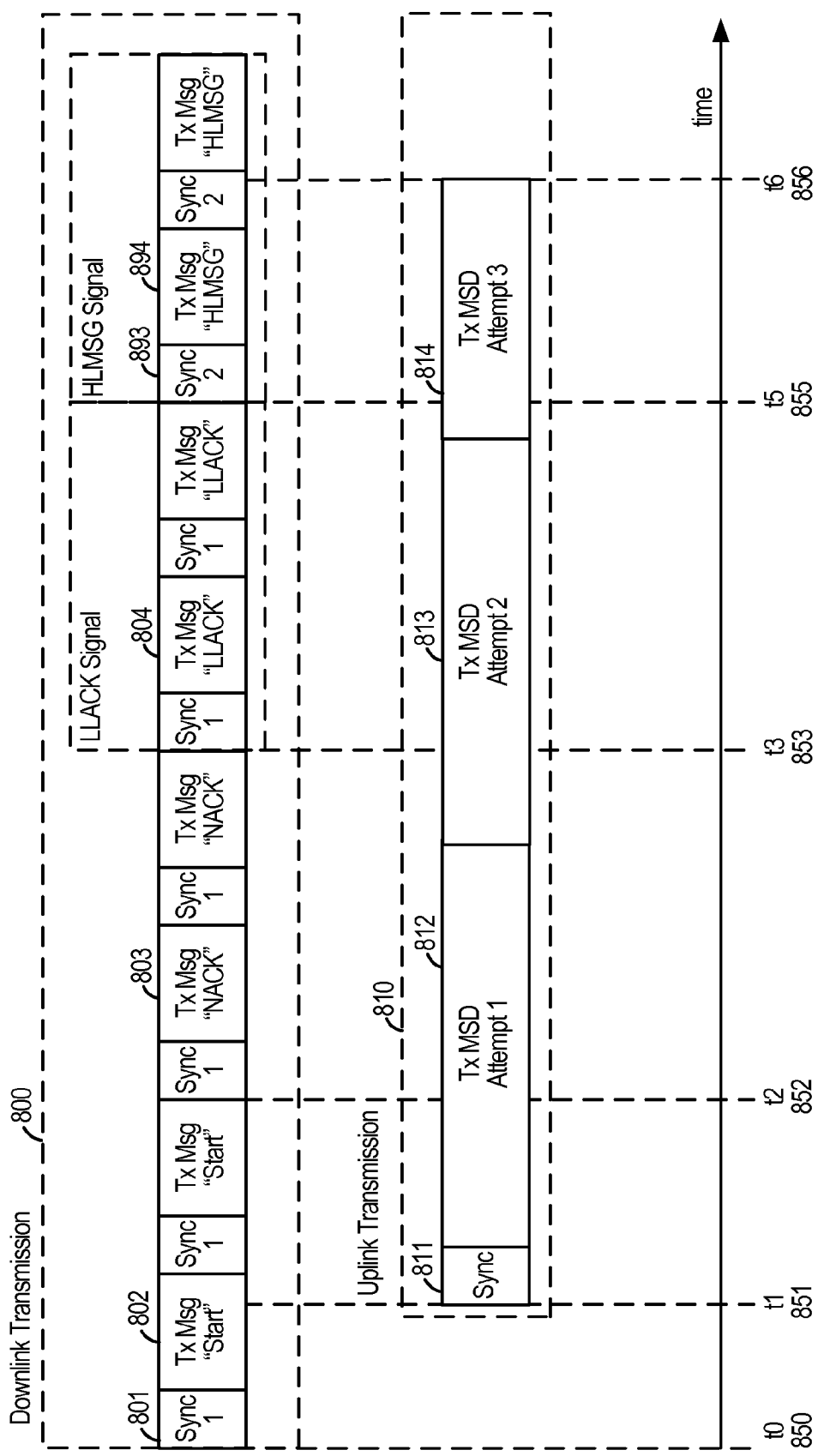
FIG. 14A is a diagram of an embodiment of an interaction of the data request sequence transmitted on a downlink in a destination communication terminal and the data response sequence transmitted on an uplink in a source communication terminal, with the interaction initiated by the destination terminal, wherein the downlink transmission is comprised of a low layer acknowledgement message and a high layer application message, and the uplink transmission is terminated based on the high layer application message.

FIG. 14A is an example interaction diagram of the synchronization and data transmission sequences between the Source Terminal 100 and the Destination Terminal 600. The Downlink Transmission sequence 800 represents the transmission of sync and data messages from the Destination Terminal 600 to the Source Terminal 100 and the Uplink Transmission sequence 810 represents the transmission of sync and data messages from the Source Terminal 100 to the Destination Terminal 600. In this example, the Uplink Transmission sequence 810 is initiated by the Destination Terminal 600. The Downlink Transmission sequence 800 is initiated at time t0 850 by the Destination Terminal 600 with a first sync sequence 801. A suitable example of the first sync sequence 801 is described in FIG. 6 with Sync Preamble Out as shown in FIG. 4A. Another suitable example of the first sync sequence 801 is described in FIG. 6 with Sync Preamble Out as shown in FIG. 17A, FIG. 17B, FIG. 17C, FIG. 17D, FIG. 17E, or FIG. 17F. Following the first sync sequence 801, the Destination Terminal 600 transmits a "Start" message 802 to command the Source Terminal 100 to begin transmitting its Uplink Transmission 810 sequence. The Destination Terminal 600 continues to transmit an alternating first sync 801 and "Start" message 802 and waits for a response from the Source Terminal 100. At time t1 851 the Source Terminal 100, having received the "Start" message 802 from the Destination Terminal 600, begins transmitting its own sync sequence 811. A suitable example of the sync sequence 811 is described in FIG. 6 with Sync Preamble Out as shown in FIG. 4A, but may also comprise a Sync Preamble Out which is different from that which is transmitted on the downlink. Following the sync sequence 811, the Source Terminal 100 transmits a minimum set of data or "MSD" message 812 to the Destination Terminal 600. A suitable example of data comprising the MSD message 812 includes user data formatted by a data message formatter 210. At time t2 852 the Destination Terminal 600, having received the sync message 811 from the Source Terminal 100, begins transmitting a negative acknowledgement or "NACK" message 803 to the Source Terminal 100. The Destination Terminal 600 continues to transmit an alternating first sync 801 and "NACK" message 803 until it successfully receives the MSD message 812 from the Source Terminal 100. A suitable example of successfully receiving the MSD message 812 includes verifying a cyclic redundancy check performed on the MSD message 812. At time t3 853, the Destination Terminal 600, having successfully received the MSD message, begins transmitting a low layer acknowledgement or "LLACK signal" comprised of a first sync 801 and low layer acknowledgement "LLACK" message 804. At time t5 855, the Destination Terminal 600 begins transmitting a high layer message or "HLMSG signal" comprised of a second sync 893 and high layer message HLMSG 894. A suitable example of a second sync signal 893 is an inverted sequence to that shown in 245 ('+' and '−' polarity bits swapped) as shown in FIG. 16A which results in the alternate correlation peak pattern shown in FIG. 16B and Table 3. Another suitable example of a second sync signal 893 is an inverted sequence to that shown in 245 ('+' and '−' polarity bits swapped) with zero samples replaced by non-zero samples as shown in FIG. 17A, FIG. 17B, FIG. 17C, FIG. 17D, FIG. 17E, or FIG. 17F. The Source Terminal 100 may attempt to send the MSD message 812 multiple times (813, 814) until it receives the LLACK message. In alternate embodiments, the Source Terminal 100 may attempt to send the MSD message 812 multiple times (813, 814) until it receives an HLMSG message, or both LLACK and HLMSG messages. In a suitable example, if the Source Terminal 100 attempts to send the MSD message more than eight times wherein each attempt is a different redundancy version, it switches to a more robust modulation scheme identified by the Wakeup signal 5236. At time t6 856 the Source Terminal 100 having received the HLMSG signal from the Destination Terminal 600 discontinues transmission of the MSD message. In a suitable example, a retransmission is requested by the Destination Terminal 600 via transmitting the start messages 802 again after a predetermined number of HLMSG signals have been sent by the Destination Terminal 600. In a suitable example, the predetermined number of HLMSG signals sent by the Destination Terminal 600 is five. In a suitable example, the interaction of FIG. 14A may contain an HLMSG signal comprising second sync 893 and high layer message HLMSG 894, but not LLACK Signal (i.e. the HLMSG Signal is detected without a preceding LLACK signal).

Figure 14B:
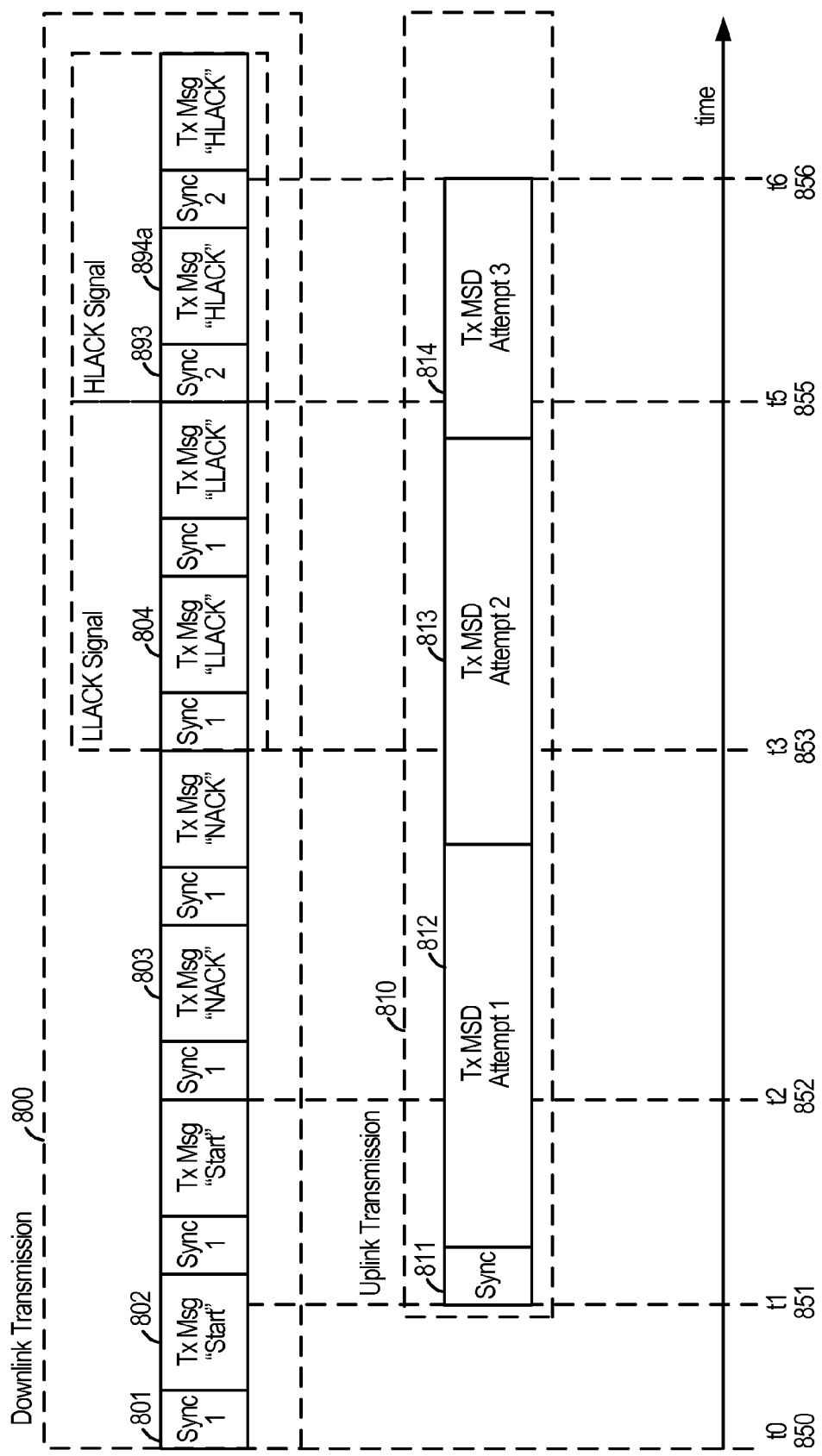
FIG. 14B is a diagram of an embodiment of an interaction of the data request sequence transmitted on a downlink in a destination communication terminal and the data response sequence transmitted on an uplink in a source communication terminal, with the interaction initiated by the destination terminal, wherein the downlink transmission is comprised of a low layer acknowledgement message and a high layer acknowledgement message, and the uplink transmission is terminated based on the high layer acknowledgement message.

FIG. 14B is another example interaction diagram of the synchronization and data transmission sequences between the Source Terminal 100 and the Destination Terminal 600. This example follows the interactions of FIG. 14A, with the exception that the HLMSG 894 is a high layer acknowledge (HLACK) message 894a. In an exemplary use case, the Source Terminal 100 may not detect the LLACK signal so continues transmitting the MSD message 812 multiple times (813, 814). At time t6 856 the Source Terminal 100 having successfully received the HLACK signal from the Destination Terminal 600 discontinues transmission of the MSD message. The HLACK transmission serves to enhance the reliability of the communication between Source Terminal 100 and Destination Terminal 600 as a redundant acknowledge to the LLACK message. For example, if the Source Terminal 100 is unable to detect the LLACK, it may detect the HLMSG resulting in an acknowledged data transmission without having actually detected the LLACK. In an alternate embodiment, the HLMSG may be a different message such as a call tear-down message.

Figure 14C:
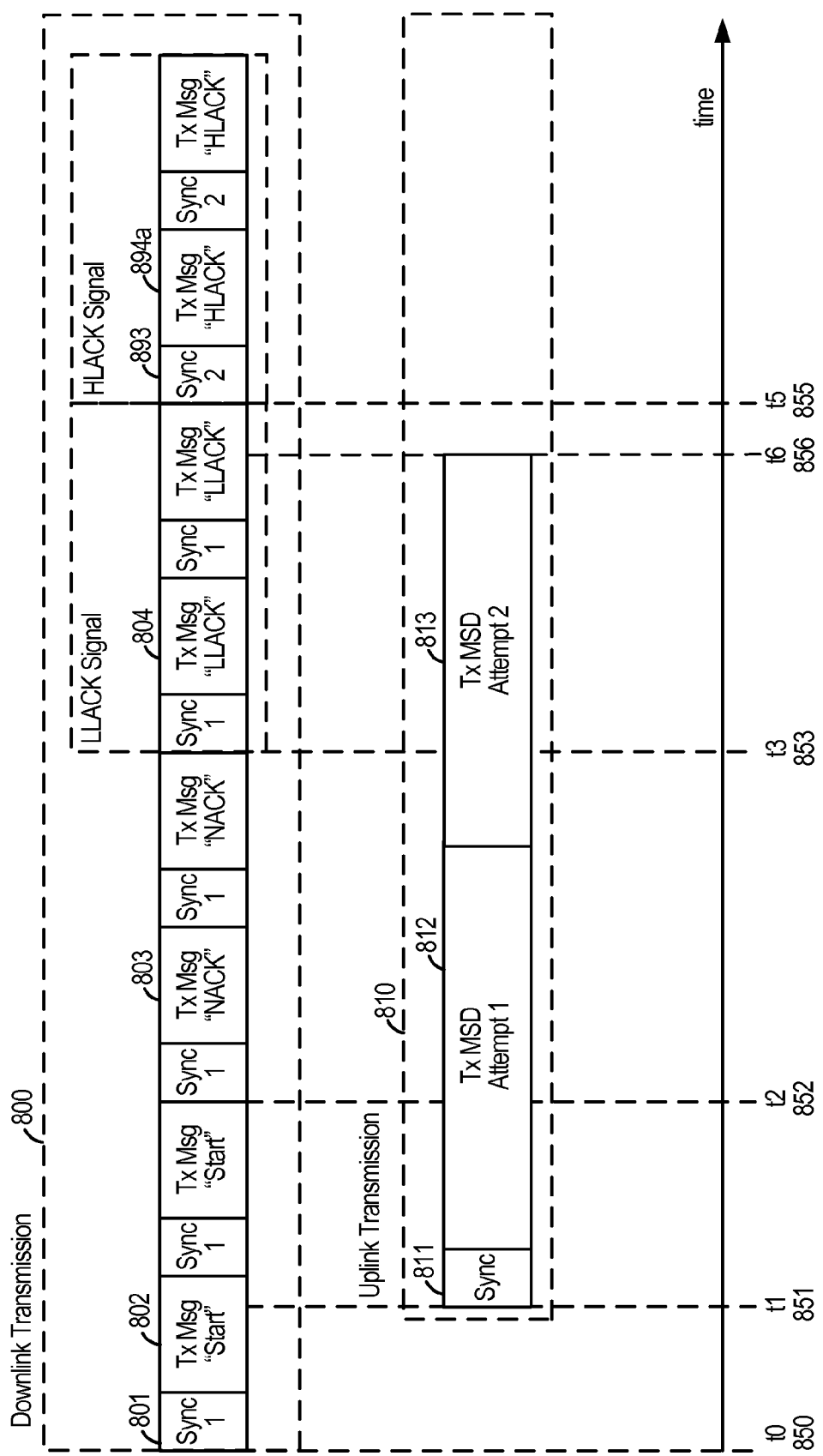
FIG. 14C is a diagram of an embodiment of an interaction of the data request sequence transmitted on a downlink in a destination communication terminal and the data response sequence transmitted on an uplink in a source communication terminal, with the interaction initiated by the destination terminal, wherein the downlink transmission is comprised of a low layer acknowledgement message and a high layer acknowledgement message, and the uplink transmission is terminated based on the low layer acknowledgement message.

FIG. 14C is another example interaction diagram of the synchronization and data transmission sequences between the Source Terminal 100 and the Destination Terminal 600. This example follows the interactions of FIG. 14A, with the exception that the HLMSG 894 is a high layer acknowledge (HLACK) message 894a. In an exemplary use case, the Source Terminal 100 detects the LLACK signal and at time t6 856 the Source Terminal 100 having successfully received the LLACK signal from the Destination Terminal 600 discontinues transmission of the MSD message.

Figure 15:
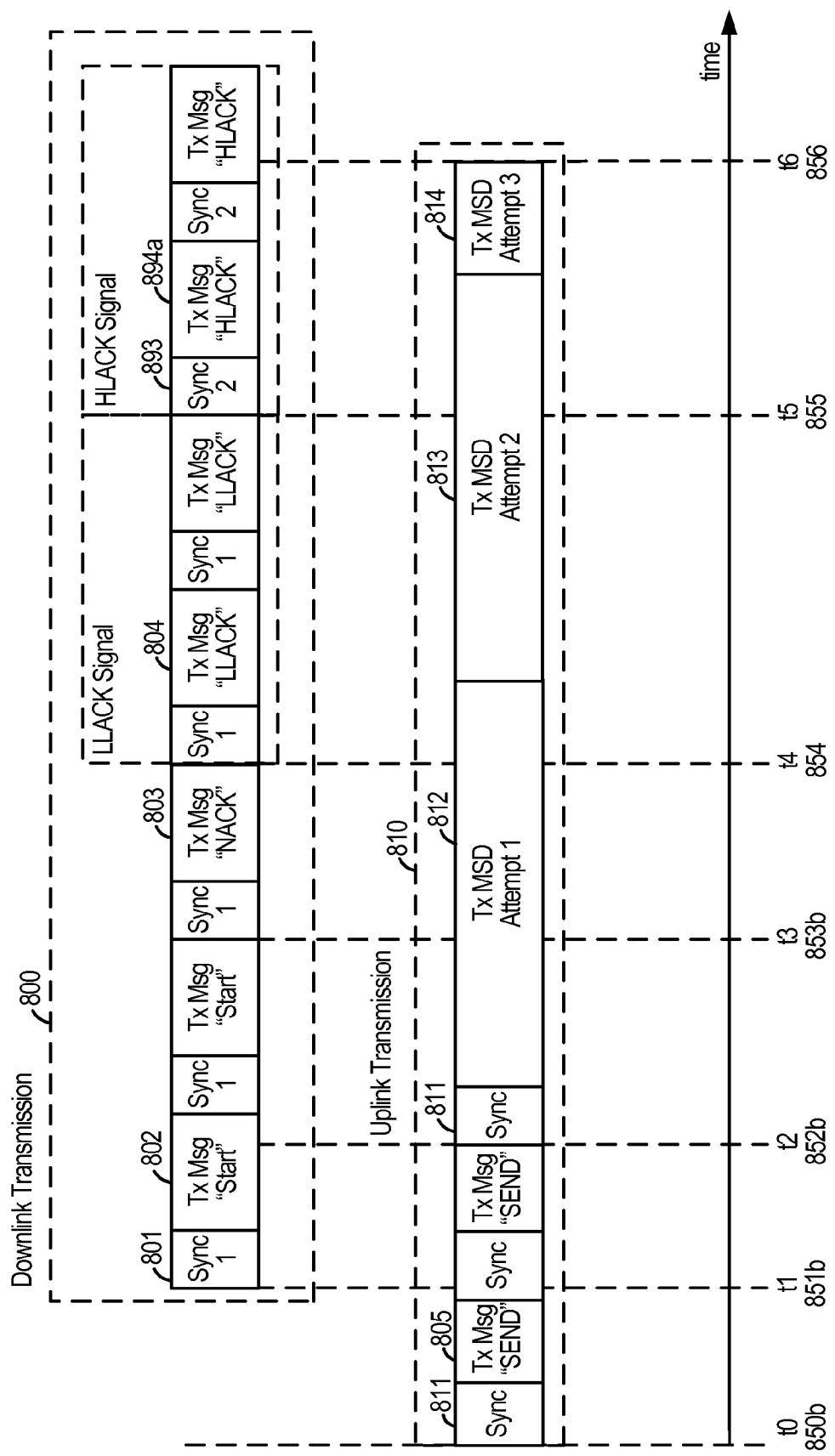
FIG. 15 is a diagram of an embodiment of an interaction of the data request sequence transmitted on a downlink in a destination communication terminal and the data response sequence transmitted on an uplink in a source communication terminal, with the interaction initiated by the source terminal, wherein the downlink transmission is comprised of a low layer acknowledgement message and a high layer acknowledgement message, and the uplink transmission is terminated based on the high layer acknowledgement message.

FIG. 15 is another example interaction diagram of the synchronization and data transmission sequences between the Source Terminal 100 and the Destination Terminal 600. In this case, the Uplink Transmission sequence 810 is initiated by the Source Terminal 100 and the HLMSG 894 is a high layer acknowledge (HLACK) message 894a. To initiate the transmission, the Source Terminal 100 transmits an alternating sync 811 and "SEND" message 805 at time t0 850b. At time t1 851b the Destination Terminal 600, having received the SEND message 805 from the Source Terminal 100, transmits an alternating first sync 801 and "Start" message 802. At time t2 852b the Source Terminal 100, having received the "Start" message 802 from the Destination Terminal 600, transmits a sync sequence 811 followed by an MSD message 812 to the Destination Terminal 600. At time t3 853b the Destination Terminal 600, having received the sync message 811 from the Source Terminal 100, transmits an alternating first sync 801 and "NACK" message 803 to the Source Terminal 100. At time t4 854, the Destination Terminal 600, having successfully received the MSD message, begins transmitting a low layer acknowledgement or "LLACK signal" comprised of a first sync 801 and low layer acknowledgement "LLACK" message 804. At time t5 855, the Destination Terminal 600 begins transmitting a high layer acknowledge or "HLACK signal" comprised of a second sync 893 and high layer acknowledge message HLACK 894. At time t6 856 the Source Terminal 100 having received the HLACK signal from the Destination Terminal 600 discontinues transmission of the MSD message. In alternate embodiments, the Source Terminal 100 may discontinue transmission of the MSD message based on receiving the LLACK message, or both LLACK and HLMSG messages.

Figure 18A:
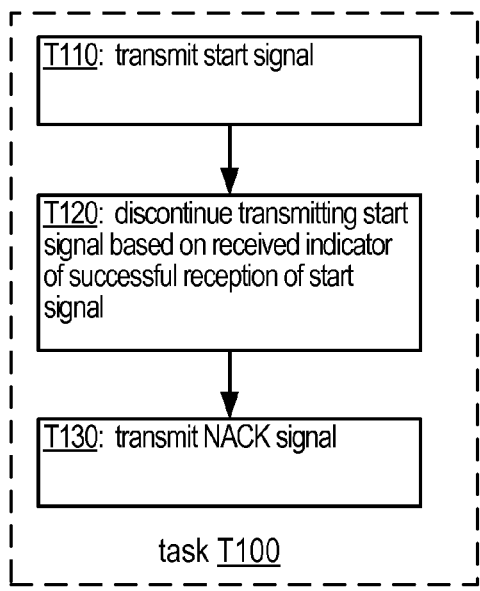
FIG. 18A is a flowchart of an embodiment of a first set of subtasks in a method for a Destination Terminal signaling to a Source Terminal.
Figure 18B:
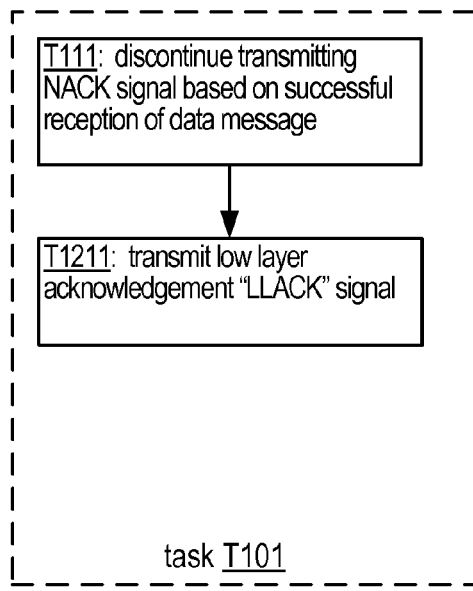
FIG. 18B is a flowchart of an embodiment of a second set of subtasks in a method for a Destination Terminal signaling to a Source Terminal.
Figure 18C:
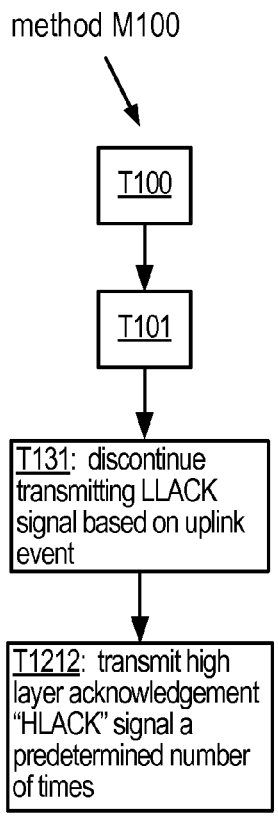
FIG. 18C is a flowchart of an embodiment of a method M100 of a Destination Terminal signaling to a Source Terminal.

FIG. 18C shows a flowchart for a method M100 of a Destination Terminal 600 signaling to a Source Terminal 100 according to a first configuration. Method M100 includes tasks T100, T101, T131, and T1212. Task T100 is shown in FIG. 18A and consists of subtasks that transmit a start signal T110, discontinues transmitting the start signal based on receiving an indicator of a successful reception of the start signal T120, and transmits a negative acknowledgement (NACK) signal T130. Task T101 is shown in FIG. 18B and consists of subtasks that discontinue transmitting the NACK signal based on successful reception of a data message T111, and transmits a low layer acknowledgement (LLACK) signal T1211. Task T131 discontinues transmitting the LLACK signal when the Destination Terminal 600 receives an event on the uplink An uplink event may include a discontinued data message transmission from the Source Terminal 100. An uplink event may alternatively include an indication of a poor uplink channel condition. Task T1212 then transmits a high layer acknowledgement (HLACK) signal a predetermined number of times. A suitable example of a predetermined number of HLACK transmissions is five.

Figure 18D:
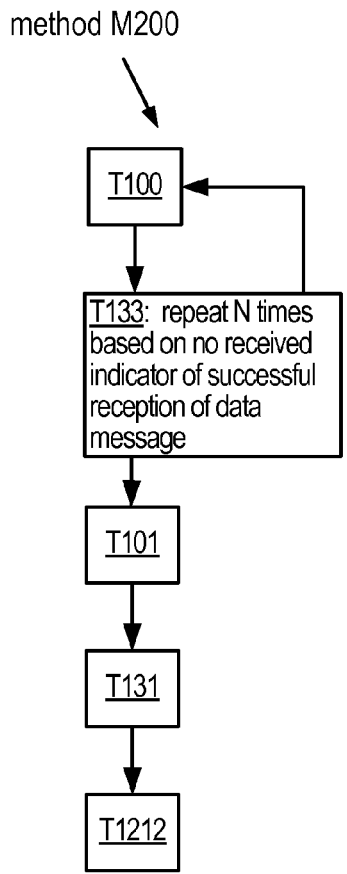
FIG. 18D is a flowchart of an embodiment of a method M200 of a Destination Terminal signaling to a Source Terminal.

FIG. 18D shows a flowchart for a method M200 of a Destination Terminal 600 signaling to a Source Terminal 100 according to a second configuration. Method M200 includes tasks that transmit a start signal T110, discontinue transmitting the start signal based on receiving an indicator of a successful reception of the start signal T120, transmits a negative acknowledgement (NACK) signal T130, and repeat the tasks T110, T120, and T130 a predetermined number of times if the Destination Terminal 600 fails to successfully receive a source terminal data message. An example predetermined number of repeats may include five times. If the Destination Terminal 600 successfully receives the source terminal data message before the predetermined number of repeats, Method M200 continues with tasks that discontinue transmitting the NACK signal based on successful reception of the source terminal data message T111, transmits an LLACK signal T1211, discontinues transmitting the LLACK signal based on an uplink event T131, and transmits a high layer acknowledgement (HLACK) signal a predetermined number of times T1212.

Figure 18E:
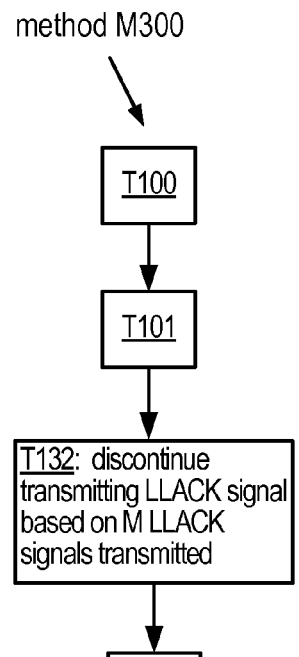
FIG. 18E is a flowchart of an embodiment of a method M300 of a Destination Terminal signaling to a Source Terminal.

FIG. 18E shows a flowchart for a method M300 of a Destination Terminal 600 signaling to a Source Terminal 100 according to a third configuration. Method M300 includes tasks that transmit a start signal T110, discontinues transmitting the start signal based on receiving an indicator of a successful reception of the start signal T120, transmits a negative acknowledgement (NACK) signal T130, discontinues transmitting the NACK signal based on successful reception of a source terminal data message T111, transmits an LLACK signal T1211, discontinues transmitting the LLACK signal if a predetermined number of LLACK signals have been transmitted T132, and transmits a high layer acknowledgement (HLACK) signal a predetermined number of times T1212.

Figure 19A:
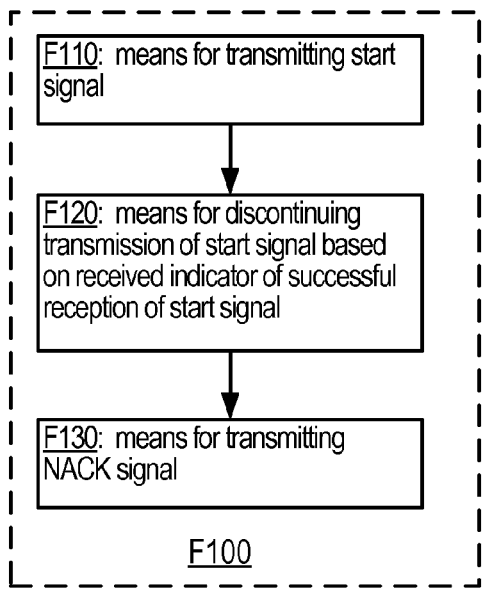
FIG. 19A is a block diagram of an embodiment of a first set of means of an apparatus according to a first configuration.
Figure 19B:
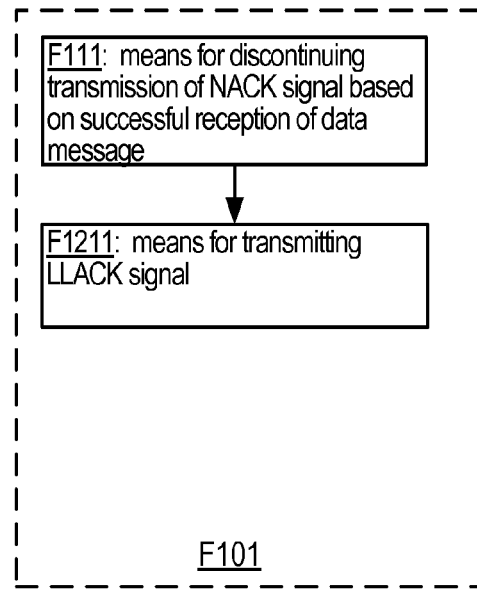
FIG. 19B is a block diagram of an embodiment of a second set of means of an apparatus according to a first configuration.
Figure 19C:
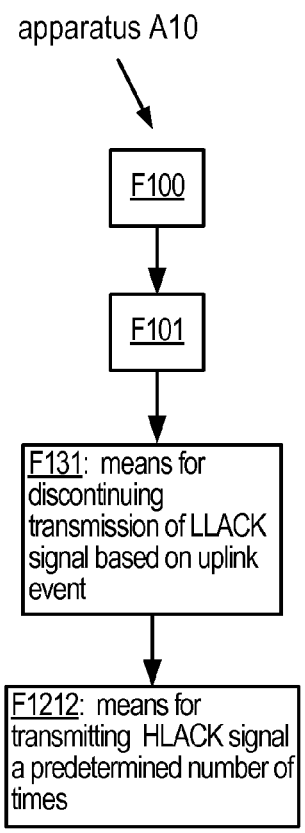
FIG. 19C is a block diagram of an embodiment of an apparatus A10.

FIG. 19C shows a block diagram of an apparatus A10. Apparatus A10 includes means F100, F101, F131, and F1212. Means F100 is shown in FIG. 19A and consists of means for transmitting a start signal F110, means for discontinuing transmission of the start signal based on receiving an indication of a successful reception of the start signal F120, and means for transmitting a negative acknowledgement (NACK) signal F130. Means F101 is shown in FIG. 19B and consists of means for discontinuing transmission of the NACK signal based on successful reception of a source terminal data message F111, and means for transmitting a low layer acknowledgement (LLACK) signal F1211. Means F131 includes means for discontinuing transmission of the LLACK signal when the Destination Terminal 600 receives an event on the uplink. Means F1212 includes means for transmitting a high layer acknowledgement (HLACK) signal a predetermined number of times.

Figure 19D:
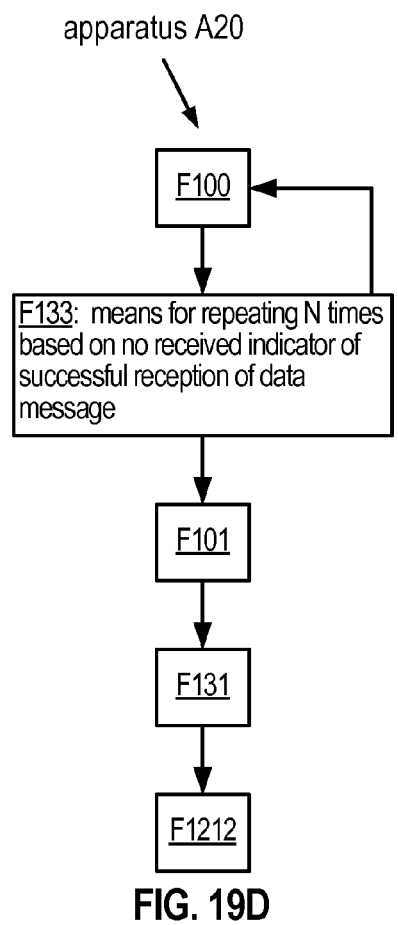
FIG. 19D is a block diagram of an embodiment of an apparatus A20.

FIG. 19D shows a block diagram of an apparatus A20. Apparatus A20 includes means for transmitting a start signal F110, means for discontinuing transmission of the start signal based on receiving an indication of a successful reception of the start signal F120, means for transmitting a negative acknowledgement (NACK) signal F130, means for repeating means F110, F120, and F130 a predetermined number of times if the Destination Terminal 600 fails to successfully receive a source terminal data message, means for discontinuing transmission of the NACK signal based on successful reception of the source terminal data message F111, means for transmitting an LLACK signal F1211, means for discontinuing transmission of the LLACK signal when the Destination Terminal 600 receives an event on the uplink F131, and means for transmitting a high layer acknowledgement (HLACK) signal a predetermined number of times F1212.

Figure 19E:
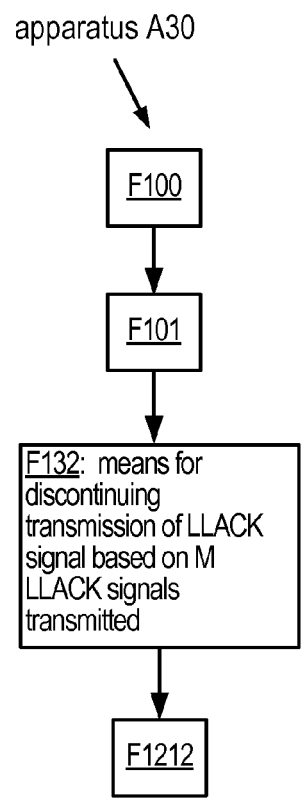
FIG. 19E is a block diagram of an embodiment of an apparatus A30.

FIG. 19E shows a block diagram of an apparatus A30. Apparatus A30 includes means for transmitting a start signal F110, means for discontinuing transmission of the start signal based on receiving an indication of a successful reception of the start signal F120, means for transmitting a negative acknowledgement (NACK) signal F130, means for discontinuing transmission of the NACK signal based on successful reception of a source terminal data message F111, means for transmitting a low layer acknowledgement (LLACK) signal F1211, means for discontinuing transmitting the LLACK signal if a predetermined number of LLACK signals have been transmitted, and means for transmitting a high layer acknowledgement (HLACK) signal a predetermined number of times F1212.

Figure 20B:
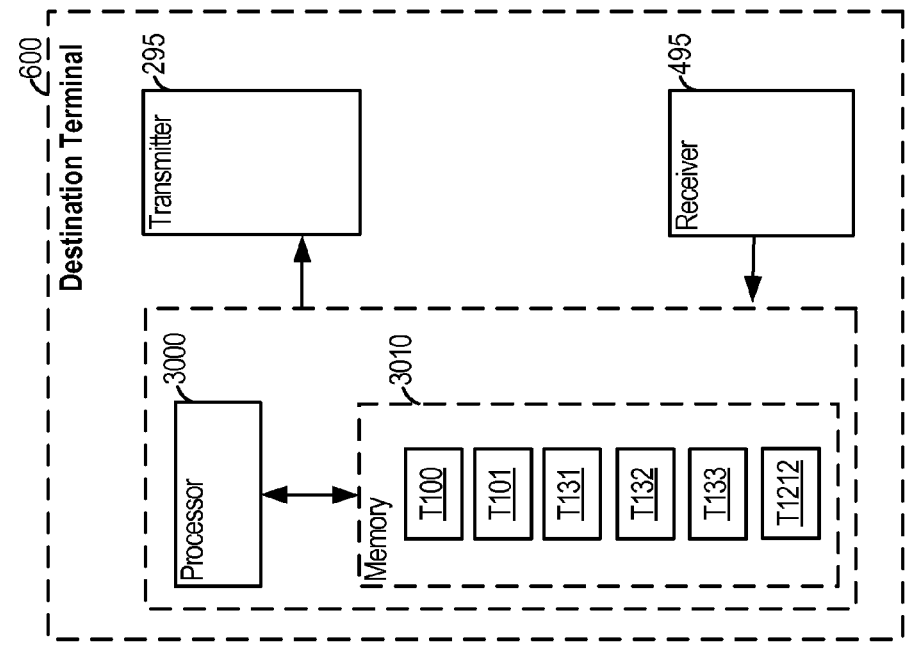
FIG. 20B is a block diagram of an implementation of apparatus A10, A20, and A30 according to a second configuration.
Figure 20A:
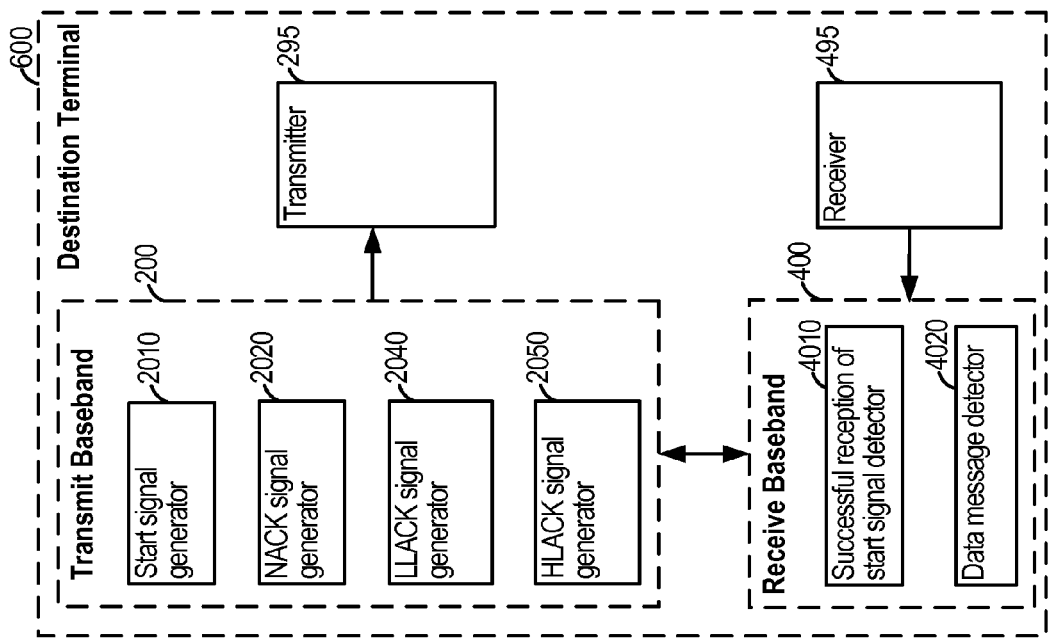
FIG. 20A is a block diagram of an implementation of apparatus A10, A20, and A30 according to a first configuration.

FIG. 20A shows a block diagram of an implementation of apparatus A10, A20, and A30 according to a first configuration. Start signal generator 2010 generates a start signal as described herein with reference to task T110 and is an implementation of means F110. NACK signal generator 2020 generates a negative acknowledgement (NACK) signal as described herein with reference to task T130 and is an implementation of means F130. LLACK generator 2040 generates a low layer acknowledgement signal as described herein with reference to task T1211 and is an implementation of means F1211. HLACK signal generator 2050 generates a high layer acknowledgement signal as described herein with reference to task T1212 and is an implementation of means F1212. Successful reception of start signal detector 4010 detects a signal that indicates a source terminal has successfully received the transmitted start signal as described herein with reference to task T120 and is an implementation of means F120. Data message detector 4020 detects a source terminal data message as described herein with reference to task T111 and is an implementation of means F111.

FIG. 20B shows a block diagram of an implementation of apparatus A10, A20, and A30 according to a second configuration. Processor 3000 is in communication with Memory 3010, Transmitter 295 and Receiver 495. Memory 3010 includes instructions which when executed by Processor 3000: generate start and NACK signals as described herein with reference to task T100 and implementation of means F100, discontinue NACK and generate LLACK signals as described herein with reference to task T101 and implementation of means F101, discontinue transmitting LLACK signal based on an uplink event as described herein with reference to task T131 and implementation of means F131, repeat a sequence of tasks as described herein with reference to task T133 and implementation F133, and transmit a HLACK signal a predetermined number of times as described herein with reference to task T1212 and implementation of means F1212. One skilled in the art will recognize that a subset of tasks may exist in Memory 3010, for example T100, T101, T131, and T1212 corresponding to M100.

FIG. 21A shows a block diagram for a method M400 of a Source Terminal 100 signaling to a Destination Terminal 600 according to a general configuration. Method M400 includes a task T210 that detects a request signal from the Destination Terminal 600, a task T220 that stores a message identifier, a task T230 that transmits a sync signal based on the detection of a request signal, a task T240 that transmits a user data message, a task T2501 that detects an low layer acknowledgement (LLACK) signal, and a task T260 that discontinues transmitting the user data message based on the detection of the LLACK signal. FIG. 21B shows a block diagram for a method M410 of a Source Terminal 100 signaling to a Destination Terminal 600. Method M410 includes a task T210 that detects a request signal from the Destination Terminal 600, a task T220 that stores a message identifier, a task T230 that transmits a sync signal based on the detection of a request signal, a task T240 that transmits a user data message, a task T2502 that detects a high layer acknowledgement (HLACK) signal, and a task T261 that discontinues transmitting the user data message based on the detection of the HLACK signal. Task T2502 contains the subtasks shown in FIG. 21C which includes a task T25021 that regenerates a high layer application acknowledgement message, a task T25022 that forwards a high layer application acknowledgement message to a high layer application, and a task T25023 that receives an indication of successful receipt of a high layer application acknowledgement message from a high layer application. Task T25021 contains the subtasks shown in FIG. 21D which includes a task T250211 that extracts a format field from a received transformed high layer acknowledgement (HLACK) message, a task T250212 that extracts a status field from a received transformed high layer acknowledgement (HLACK) message, a task T250213 that retrieves a stored message identifier, and a task T250214 that forms a high layer application acknowledgement message by combining the extracted fields and the retrieved message identifier. The formed high layer application acknowledgement message may alternatively contain a subset of extracted fields, for example only a status field and not a format field.

FIG. 22A shows a block diagram of an apparatus A40 according to a general configuration. Apparatus A40 includes a means for detecting a request signal F210 from a Destination Terminal 600, a means for storing a message identifier F220, a means for transmitting a sync signal based on the detection of a request signal F230, a means for transmitting a user data message F240, a means for detecting a low layer acknowledgement (LLACK) signal F2501, and a means for discontinuing transmitting the user data message based on the detection of the LLACK signal F260. FIG. 22B shows a block diagram of apparatus A41 and includes a means for detecting a request signal F210 from a Destination Terminal 600, a means for storing a message identifier F220, a means for transmitting a sync signal based on the detection of a request signal F230, a means for transmitting a user data message F240, a means for detecting a high layer acknowledgement (HLACK) signal F2502, and a means for discontinuing transmitting the user data message based on the detection of the HLACK signal F261. FIG. 22C shows a block diagram of means F2502 of apparatus A41 and includes means for regenerating a high layer application acknowledgement message F25021, means for forwarding a high layer application acknowledgement message to a high layer application F25022, and means for receiving an indication of successful receipt of a high layer application acknowledgement message from a high layer application F25023. FIG. 22D shows a block diagram of means F25021 of apparatus A41 and includes means for extracting a format field from a received transformed high layer acknowledgement message F250211, means for extracting a status field from a received transformed high layer acknowledgement message F250212, means for retrieving a locally stored message identifier F250213, and means for forming a high layer application acknowledgement message by combining the extracted fields and the retrieved message identifier F250214.

Figure 24A:
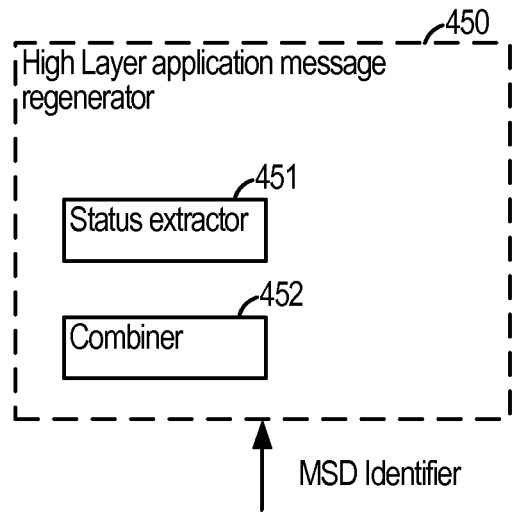
FIG. 24A is a block diagram of an implementation of High layer application message regenerator according to a first configuration.
Figure 24B:
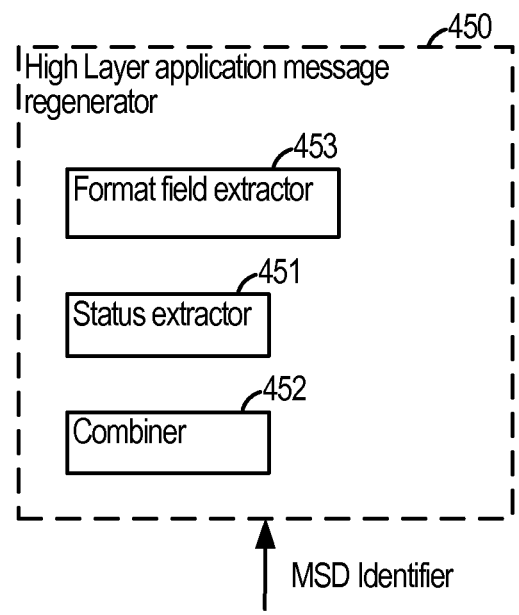
FIG. 24B is a block diagram of an implementation of High layer application message regenerator according to a second configuration.

FIG. 23A shows a block diagram of an implementation of apparatus A40 and A41 according to a first configuration. Request signal detector 430 detects a received request signal as described herein with reference to task T210 and is an implementation of means F210. Storage medium 340 receives a message identifier as described herein with reference to task T220. Sync signal generator 260 generates a sync signal as described herein with reference to task T230 and is an implementation of means F230. User data message generator 270 generates a user data message as described herein with reference to task T240 and is an implementation of means F240. High layer acknowledgement "HLACK" detector 442 detects a high layer acknowledgement signal as described herein with reference to task T2502 and is an implementation of means F2502. High layer application acknowledgement message regenerator 450 constructs a high layer application acknowledgment message as described herein with reference to task T25021 and is an implementation of means F25021. FIG. 24A shows a block diagram of an implementation of high layer application message regenerator 450 according to a first configuration. Status extractor 451 extracts a status field as described herein with reference to task T250212 and is an implementation of means F250212. Combiner 452 combines at least an extracted status field with MSD identifier to form the high layer application acknowledgement message and forwards the message to a high layer application as described in task T250213 and T250214 and is an implementation of means F250213 and F250214. FIG. 24B shows a block diagram of an implementation of high layer application message regenerator 450 according to a second configuration. The High layer application acknowledgement message regenerator 450 includes in addition to Status extractor 451 and Combiner 452, a Format field extractor 453 to extract a format field as described herein with reference to task T250211 and is an implementation of means F250211. In the second configuration, Combiner 452 combines at least an extracted status field with an extracted format field and MSD identifier to form the high layer application acknowledgement message.

FIG. 23B shows a block diagram of an implementation of apparatus A40 and A41 according to a second configuration. Processor 3020 is in communication with Memory 3030, storage medium 340, Transmitter 295 and Receiver 495. Memory 3030 includes instructions which when executed by Processor 3020: detects a request signal as described herein with reference to task T210 and implementation of means F210, stores a message identifier as described herein with reference to task T220 and implementation means F220, transmits a sync signal based on detection of a request signal as described herein with reference to task T230 and implementation means F230, transmits a user data message as described herein with reference to task T240 and implementation means F240, detects a low layer acknowledgement signal as described herein with reference to task T2501 and implementation means F2501, detects a high layer acknowledgement signal as described herein with reference to task T2502 and implementation means F2502, discontinues transmission of the user data message based on detection of the low layer acknowledgement signal as described herein with reference to task T260 and implementation means F260, and discontinues transmission of the user data message based on detection of the high layer acknowledgement signal as described herein with reference to task T261 and implementation means F261. One skilled in the art will recognize that a subset of tasks may exist in Memory 3030.

Figure 25:
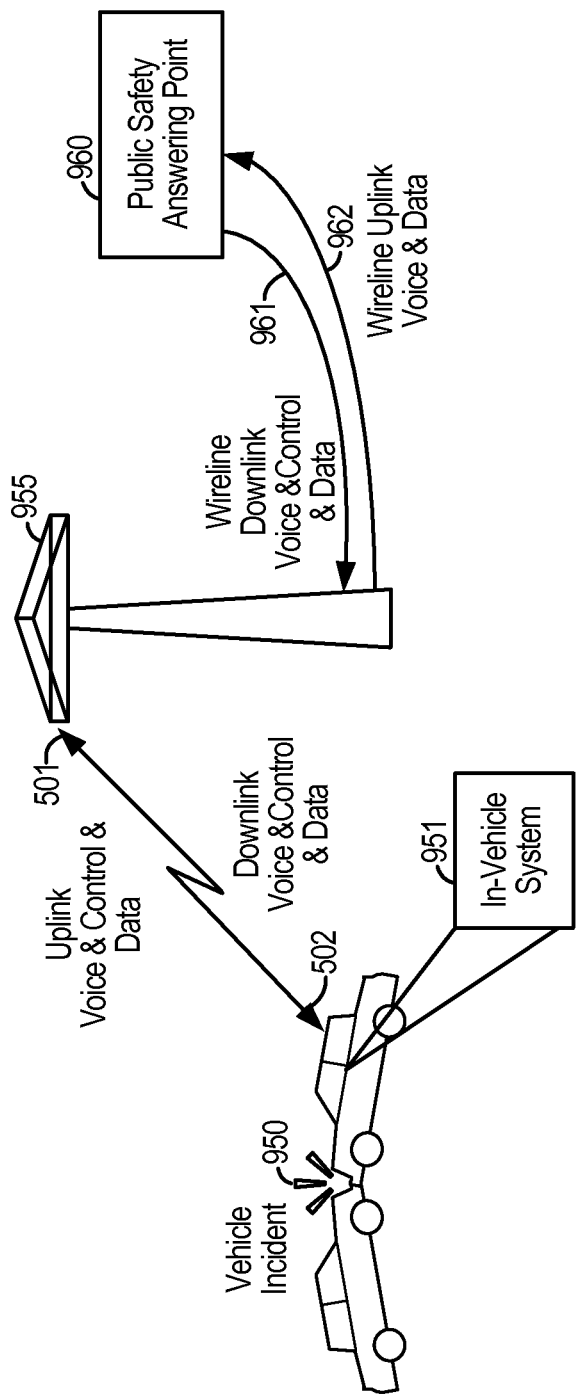
FIG. 25 is a diagram of an embodiment of a telematics emergency call system.

FIG. 25 is a first example use case of the system and methods disclosed herein. The diagram represents a typical example of the emergency call (eCall) system. A vehicle incident 950 is shown as an accident between two vehicles. Other suitable examples for vehicle incident 950 include multiple vehicle accident, single vehicle accident, single vehicle flat tire, single vehicle engine malfunction or other situations where the vehicle malfunctions or the user is in need of assistance. The In-Vehicle System (IVS) 951 is located in one or more of the vehicles involved in the vehicle incident 950 or may be located on the user himself The In-Vehicle System 951 may be comprised of the source terminal 100 described herein. The In-Vehicle System 951 communicates over a wireless channel which may be comprised of an uplink communications channel 501 and downlink communications channel 502. A request for data transmission may be received by the In-Vehicle System through the communications channel or may be automatic or manually generated at the In-Vehicle System. A wireless tower 955 receives the transmission from the In-Vehicle System 951 and interfaces to a wireline network comprised of a wireline uplink 962 and wireline downlink 961. A suitable example of a wireless tower 955 is a cellular telephone communications tower comprised of antennas, transceivers, and backhaul equipment, all well-known in the art, for interfacing to the wireless uplink 501 and downlink 502. The wireline network interfaces to a Public Safety Answering Point (PSAP) 960, where emergency information transmitted by the In-Vehicle System 951 may be received and control and data transmitted. The Public Safety Answering Point 960 may be comprised of the destination terminal 600 described herein. The communication between the In-Vehicle System 951 and the Public Safety Answering Point 960 may be accomplished using the interaction diagrams described herein. Other suitable examples for vehicle incident 950 may also include vehicle inspection, servicing, diagnostic or other situations where in-band data transfer from a vehicle may occur. In this case the Public Safety Answering Point (PSAP) 960 may be replaced by a destination terminal server.

The methods and apparatus disclosed herein may be applied generally in any transceiving and/or audio sensing application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

The foregoing presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various elements of an implementation of an apparatus as disclosed herein may be embodied in any combination of hardware, software, and/or firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a high protocol messaging procedure, such as a task relating to another operation of a device or system in which the processor is embedded. It is also possible for part of a method as disclosed herein to be performed by a first processor and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

An illustrative controlling apparatus is coupled to the controlled system. The controlled system contains modules for instructing the controlled system to perform operations described in connection with the configurations disclosed herein. The modules may be implemented as instruction modules that are encoded into the controlling apparatus. A controlling apparatus may be RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, a CD-ROM, or any other form of storage medium known in the art.

It is noted that the various methods disclosed herein may be performed by an array of logic elements such as a processor, and that the various elements of an apparatus as described herein may be implemented as modules designed to execute on such an array. As used herein, the term "module" or "submodule" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in one or more computer-readable media as listed herein) as one or more sets of instructions readable and/or executable by a machine including an array of logic elements (e.g., a processor, microprocessor, microcontroller, or other finite state machine). The term "computer-readable medium" may include any medium that can store or transfer information, including volatile, nonvolatile, removable and non-removable media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk, a fiber optic medium, a radio frequency (RF) link, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP).

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof If implemented in software, such operations may be stored on or transmitted over a computer-readable medium as one or more instructions or code. The term "computer-readable media" includes both computer storage media and communication media, including any medium that facilitates transfer of a computer program from one place to another. A storage media may be any available media that can be accessed by a computer. By way of example, and not limitation, such computer-readable media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

What is claimed is:

1. A method of acknowledging a source terminal data message from a destination terminal in an in-band communication system, the method comprising:
    transmitting an in-band low layer acknowledgement (LLACK) signal, wherein the LLACK signal is comprised of a first synchronization sequence followed by a LLACK message; and
    transmitting an in-band high layer application (HLMSG) signal, wherein the HLMSG signal is comprised of a second synchronization sequence followed by a transformed HLMSG message,
    wherein the second synchronization sequence is different than the first synchronization sequence sufficient to distinguish the LLACK message from the transformed HLMSG message without acknowledgement identifier bits.

2. The method of claim 1, wherein the transformed HLMSG message is a high layer acknowledgement (HLACK) message comprised of at least a message status identifier.

3. The method of claim 2, wherein the transformed HLMSG further comprises a format identifier.

4. The method of claim 1, further comprising discontinuing transmission of the LLACK signal upon detection of an uplink event.

5. The method of claim 4, wherein the uplink event is a discontinued source terminal data message transmission.

6. The method of claim 4 wherein the uplink event is the transmission of a predetermined number of the LLACK signals.

7. The method of claim 1, further comprising the steps of:
transmitting a start signal from the destination terminal, whereby the source terminal is constrained to respond in a first predetermined manner;
discontinuing transmission of the start signal upon detection of a first received signal, wherein the first received signal indicates a successful reception of the start signal from the source terminal;
transmitting a negative acknowledgement (NACK) signal from the destination terminal, whereby the source terminal is constrained to respond in a second predetermined manner; and
discontinuing transmission of the NACK signal upon successful reception of the source terminal data message.

8. The method of claim 7 wherein the start signal is comprised of a first synchronization signal followed by a start message.

9. The method of claim 7 wherein the NACK signal is comprised of a first synchronization signal followed by a NACK message.

10. The method of claim 7 wherein the successfully received source terminal data message is the data message verified by a cyclic redundancy check.

11. The method of claim 7 further comprising repeating the steps based on the transmission of a predetermined number of the NACK signals without successful reception of the source terminal data message.

12. An apparatus comprising:
a transmitter configured to transmit in-band signals from a destination terminal;
a receiver configured to receive in-band signals from a source terminal at the destination terminal;
a start signal generator coupled to the transmitter and configured to generate a start signal;
a NACK signal generator coupled to the transmitter and configured to generate a NACK signal;
a data message detector coupled to the receiver and configured to detect a source terminal data message;
a LLACK signal generator coupled to the transmitter and configured to generate a first synchronization sequence followed by an LLACK message, the LLACK signal being an in-band signal; and
a HLACK signal generator coupled to the transmitter and configured to generate a second synchronization sequence followed by a transformed HLMSG message, the HLACK signal being an in-band signal,
wherein the second synchronization sequence is different than the first synchronization sequence sufficient to distinguish the LLACK message from the transformed HLMSG message without acknowledgement identifier bits.

13. The apparatus of claim 12 wherein the start signal is comprised of a first synchronization signal followed by a start message.

14. The apparatus of claim 12 wherein the NACK signal is comprised of a first synchronization signal followed by a NACK message.

15. An apparatus comprising:
a processor;
memory in electronic communication with the processor; and
instructions stored in the memory, the instructions being capable of executing the steps of:
transmitting an in-band low layer acknowledgement (LLACK) signal, wherein the LLACK signal is comprised of a first synchronization sequence followed by a LLACK message; and
transmitting an in-band high layer application (HLMSG) signal, wherein the HLMSG signal is comprised of a second synchronization sequence followed by a transformed HLMSG message,
wherein the transformed HLMSG message is a high layer acknowledgement (HLACK) message, and
wherein the second synchronization sequence is different than the first synchronization sequence sufficient to distinguish the LLACK message from the transformed HLMSG message without acknowledgement identifier bits.

16. The apparatus of claim 15 wherein the memory further comprises instructions, the instructions being executable to discontinue transmission of the LLACK signal upon detection of an uplink event.

17. The apparatus of claim 16 wherein the uplink event is a discontinued source terminal data message transmission.

18. The apparatus of claim 16 wherein the uplink event is the transmission of a predetermined number of the LLACK signals.

19. The apparatus of claim 15 wherein the memory further comprises instructions, the instructions being capable of executing the steps of:
transmitting a start signal from the destination terminal;
discontinuing transmission of the start signal upon detection of a first received signal, wherein the first received signal indicates a successful reception of the start signal from a source terminal;
transmitting a NACK signal from the destination terminal; and
discontinuing transmission of the NACK signal upon successful reception of a source terminal data message.

20. The apparatus of claim 19 wherein the start signal is comprised of a first synchronization signal followed by a start message.

21. The apparatus of claim 19 wherein the NACK signal is comprised of a first synchronization signal followed by a NACK message.

22. The apparatus of claim 19 wherein the memory further comprises instructions, the instructions being executable to repeat the steps based on the transmission of a predetermined number of the NACK signals without successful reception of the source terminal data message.

23. An apparatus for acknowledging a source terminal data message from a destination terminal in an in-band communication system comprising:
means for transmitting an in-band low layer acknowledgement (LLACK) signal, wherein the LLACK signal is comprised of a first synchronization sequence followed by a LLACK message; and
means for transmitting an in-band high layer application (HLMSG) signal, wherein the HLMSG signal is comprised of a second synchronization sequence followed by a transformed HLMSG message,
wherein the transformed HLMSG message is a high layer acknowledgement (HLACK) message, and wherein the second synchronization sequence is different than the first synchronization sequence sufficient to distinguish the LLACK message from the transformed HLMSG message without acknowledgement identifier bits.

24. The method of claim 23, further comprising means for discontinuing transmission of the LLACK signal upon detection of an uplink event.

25. The apparatus of claim 23 further comprising:
means for transmitting a start signal from the destination terminal;
means for discontinuing transmission of the start signal upon detection of a first received signal, wherein the first received signal indicates a successful reception of the start signal from a source terminal;
means for transmitting a NACK signal from the destination terminal, whereby the source terminal is constrained to respond in a first predetermined manner; and
means for discontinuing transmission of the NACK signal upon detection of a successfully received source terminal data message.

26. The apparatus of claim 25 wherein the start signal is comprised of a first synchronization signal followed by a start message.

27. The apparatus of claim 25 wherein the NACK signal is comprised of a first synchronization signal followed by a NACK message.

28. A non-transitory processor readable medium for acknowledging a source terminal data message from a destination terminal in an in-band communication system, comprising instructions for:

transmitting a start signal from the destination terminal, whereby the source terminal is constrained to respond in a first predetermined manner;
discontinuing transmission of the start signal upon detection of a first received signal, wherein the first received signal indicates a successful reception of the start signal from the source terminal;
transmitting a negative acknowledgement (NACK) signal from the destination terminal, whereby the source terminal is constrained to respond in a second predetermined manner;
discontinuing transmission of the NACK signal upon successful reception of the source terminal data message;
transmitting an in-band low layer acknowledgement (LLACK) signal, wherein the LLACK signal is comprised of a first synchronization sequence followed by a LLACK message;
transmitting an in-band high layer application (HLMSG) signal, wherein the HLMSG signal is comprised of a second synchronization sequence followed by a transformed HLMSG message, wherein the transformed HLMSG message is a high layer acknowledgement (HLACK) message; and
discontinuing transmission of the LLACK signal upon detection of an uplink event,
wherein the second synchronization sequence is different than the first synchronization sequence sufficient to distinguish the LLACK message from the transformed HLMSG message without acknowledgement identifier bits.

* * * * *